US007452000B2

(12) United States Patent
Winter et al.

(10) Patent No.: US 7,452,000 B2
(45) Date of Patent: Nov. 18, 2008

(54) TRAILER

(75) Inventors: David C. Winter, Layton, UT (US); Brandon Smith, S. Ogden, UT (US); S. Curtis Nye, Clinton, UT (US); Mitch Johnson, S. Weber, UT (US); Jered Larsen, Bountiful, UT (US); Doug Fuller, Ogden, UT (US)

(73) Assignee: Lifetime Products, Inc., Clearfield, UT (US)

( * ) Notice: Subject to any disclaimer, the term of this patent is extended or adjusted under 35 U.S.C. 154(b) by 179 days.

(21) Appl. No.: 11/609,317

(22) Filed: Dec. 11, 2006

(65) Prior Publication Data
US 2007/0262542 A1 Nov. 15, 2007

Related U.S. Application Data

(60) Provisional application No. 60/840,893, filed on Aug. 29, 2006, provisional application No. 60/840,849, filed on Aug. 29, 2006, provisional application No. 60/810,088, filed on Jun. 1, 2006, provisional application No. 60/777,760, filed on Mar. 1, 2006, provisional application No. 60/752,194, filed on Dec. 20, 2005, provisional application No. 60/749,775, filed on Dec. 12, 2005.

(51) Int. Cl.
*B62K 15/00* (2006.01)
(52) U.S. Cl. ............... 280/656; 280/655; 280/655.1; 280/639; 280/638; 280/42; 280/34
(58) Field of Classification Search ............ 280/34, 280/42, 638, 639, 655, 656, 655.1
See application file for complete search history.

(56) References Cited

U.S. PATENT DOCUMENTS 4,119,331 A 10/1978 Jackson
(Continued)

FOREIGN PATENT DOCUMENTS

CA 1221395 5/1987
(Continued)

OTHER PUBLICATIONS

U.S. Appl. No. 11/609,316, filed Dec. 11, 2006, Winter et al.
(Continued)

*Primary Examiner*—Christopher Ellis
*Assistant Examiner*—Cynthia F. Collado
(74) *Attorney, Agent, or Firm*—Workman Nydegger

(57) ABSTRACT

A folding trailer may be selectively moved between an extended or use position and a collapsed or storage position. The folding trailer may include an axle that is capable of being moved between a first position in which the axle is generally aligned along an axis and a second position in which the axle is disposed in a folded configuration. The axle is preferably located in generally the same plane in the first and second positions. In addition, the axle preferably moves in a generally rearward direction when the axle is moved from the first to the second position. The trailer may also include a bed that is capable of being moved between a first position in which first and second portions of the bed are generally aligned with a first plane and a second position in which the first and second portions of the bed are disposed in a folded position and generally aligned with a second plane. The axle and bed are preferably disposed in the first positions when the trailer is in the use position. The axle and bed are preferably disposed in the second positions when the trailer is in the storage position.

19 Claims, 59 Drawing Sheets

U.S. PATENT DOCUMENTS

| | | | |
|---|---|---|---|
| 4,126,324 A | 11/1978 | Browning | |
| 4,208,856 A | 6/1980 | Husky | |
| 4,239,258 A | 12/1980 | Burris | |
| 4,511,181 A | 4/1985 | Schantz | |
| 4,669,743 A * | 6/1987 | Tipke | 280/42 |
| 4,704,807 A | 11/1987 | Ridgway | |
| 4,746,142 A | 5/1988 | Davis | |
| 4,758,008 A | 7/1988 | Moddejonge | |
| 4,768,806 A * | 9/1988 | Tetreault | 280/656 |
| 4,786,073 A | 11/1988 | Harper | |
| 5,228,712 A | 7/1993 | Speier | |
| 5,340,134 A | 8/1994 | Dodson | |
| 5,340,145 A | 8/1994 | Leib et al. | |
| 5,607,176 A | 3/1997 | Leib et al. | |
| 5,613,726 A | 3/1997 | Hobbs et al. | |
| 5,687,980 A | 11/1997 | Eckroth | |
| 5,941,542 A * | 8/1999 | Kalman | 280/38 |
| 6,164,683 A | 12/2000 | Kalman | |
| 6,305,703 B1 | 10/2001 | Quick et al. | |
| 6,409,202 B1 | 6/2002 | Putnam | |
| 6,530,730 B2 | 3/2003 | Swensen | |
| 6,585,285 B2 * | 7/2003 | Koch | 280/656 |
| 6,605,778 B2 | 8/2003 | Dorfler et al. | |
| 6,742,832 B1 | 6/2004 | Miskech et al. | |
| 6,773,025 B1 * | 8/2004 | Zelm | 280/656 |
| 6,814,397 B2 | 11/2004 | Henderson et al. | |
| 6,832,808 B1 | 12/2004 | Bennett | |
| 6,979,051 B2 | 12/2005 | Jones et al. | |
| 6,986,541 B1 | 1/2006 | Haack | |
| 6,988,761 B1 | 1/2006 | Stidham et al. | |
| 7,018,151 B2 | 3/2006 | Bullock | |
| 7,066,529 B2 | 6/2006 | Yurgevich et al. | |
| 7,083,184 B2 * | 8/2006 | Sawyer | 280/656 |
| 2003/0062707 A1 | 4/2003 | Koch | |
| 2004/0217578 A1 | 11/2004 | Sawyer | |
| 2005/0093273 A1 * | 5/2005 | McDonell | 280/656 |

FOREIGN PATENT DOCUMENTS

| | | |
|---|---|---|
| GB | 2132570 | 7/1984 |
| GB | 2253814 | 9/1992 |
| GB | 2279624 | 1/1995 |

OTHER PUBLICATIONS

U.S. Appl. No. 11/609,318, filed Dec. 11, 2006, Winter et al.
U.S. Appl. No. 11/609,319, filed Dec. 11, 2006, Winter et al.

* cited by examiner

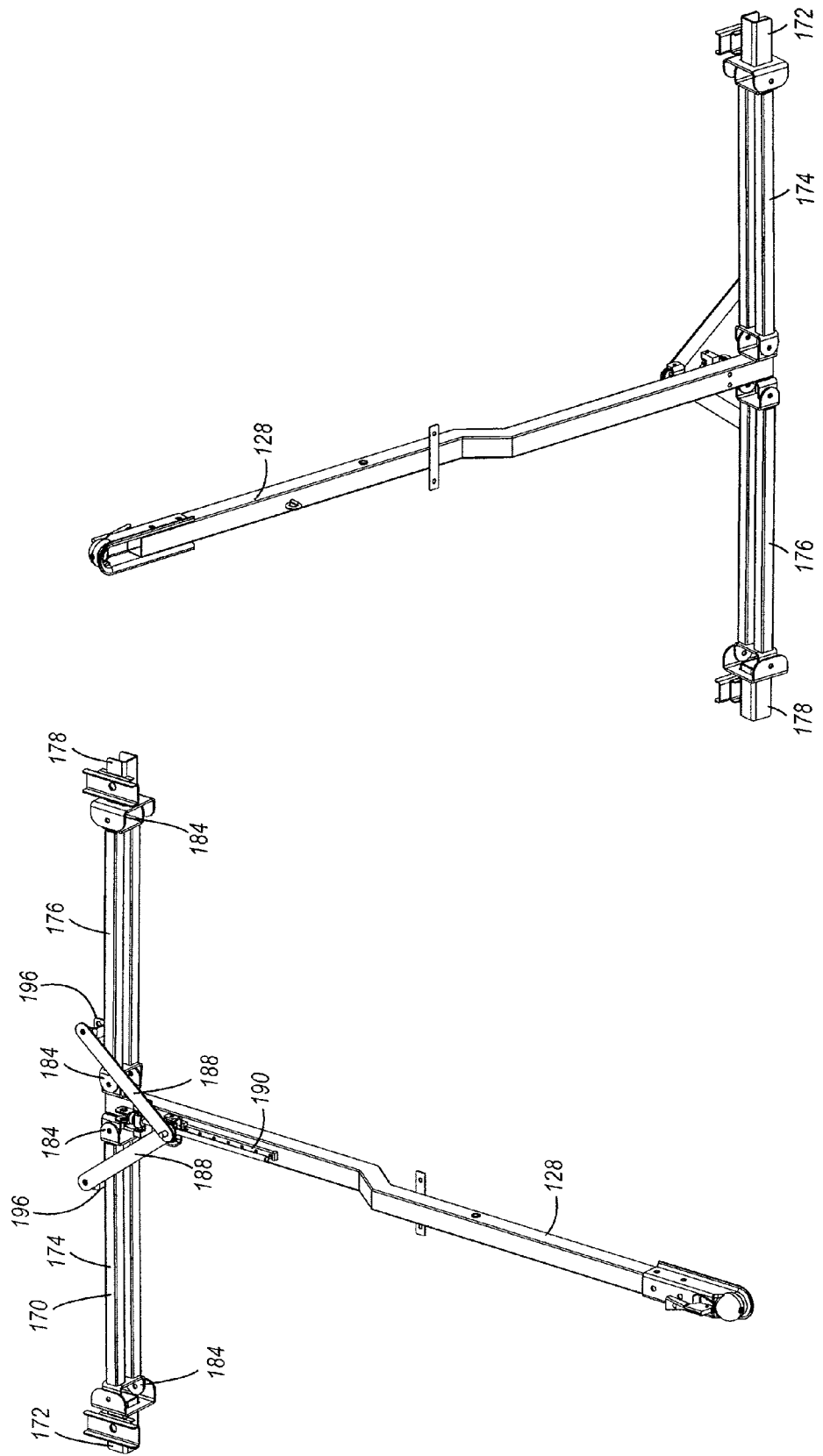

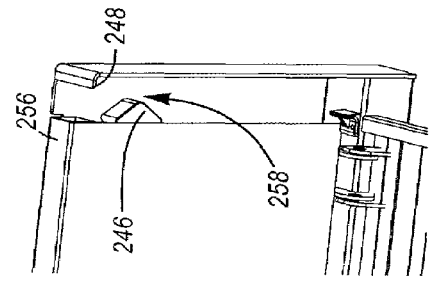
Figure 58
Figure 57
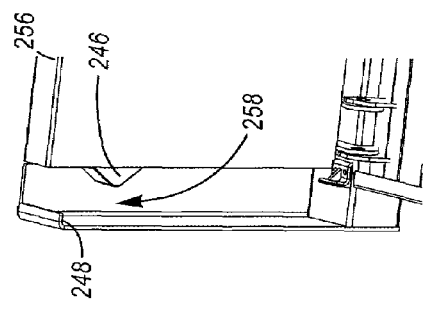
Figure 56
Figure 55
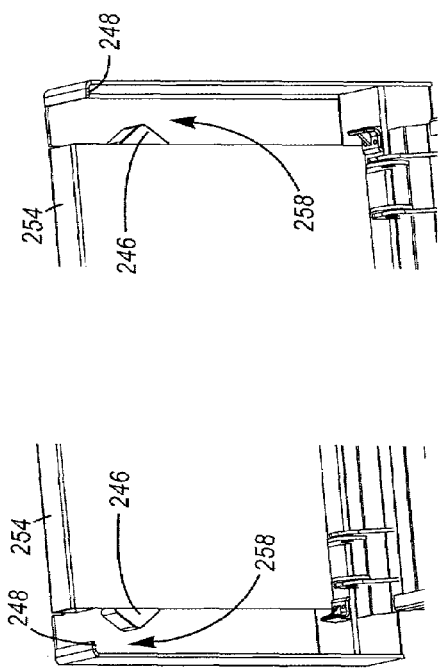
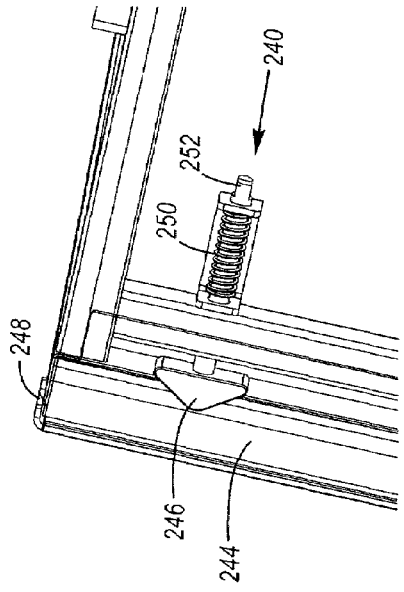
Figure 60
Figure 59

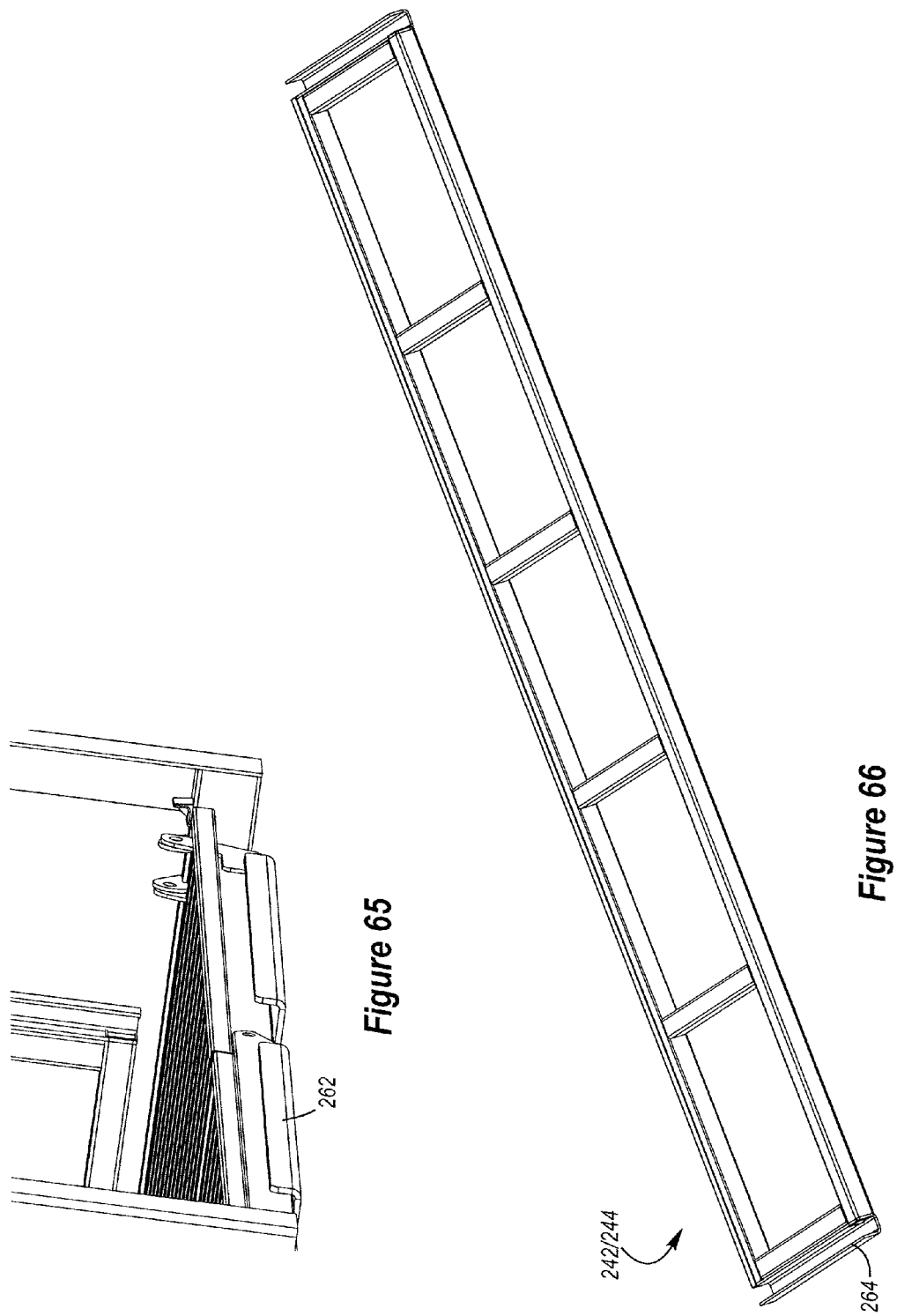

TRAILER

CROSS-REFERENCE TO RELATED APPLICATIONS

This application claims priority to, and the benefit of, U.S. provisional patent application Ser. No. 60/749,775, filed Dec. 12, 2005 and entitled TRAILER.

This application claims priority to, and the benefit of, U.S. provisional patent application Ser. No. 60/752,194, filed Dec. 20, 2005 and entitled TRAILER.

This application claims priority to, and the benefit of, U.S. provisional patent application Ser. No. 60/777,760, filed Mar. 1, 2006 and entitled TRAILER.

This application claims priority to, and the benefit of, U.S. provisional patent application Ser. No. 60/810,088, filed Jun. 1, 2006 and entitled TRAILER.

This application claims priority to, and the benefit of, U.S. provisional patent application Ser. No. 60/840,849, entitled TRAILER and filed Aug. 29, 2006.

This application claims priority to, and the benefit of, U.S. provisional patent application Ser. No. 60/840,893, entitled TRAILER and filed Aug. 29, 2006.

The disclosures of each of these applications are incorporated by reference in their entireties.

BACKGROUND OF THE INVENTION

1. Field of the Invention

The present invention generally relates to storage and/or transportation systems and, in particular, to trailers.

2. Description of Related Art

Conventional trailers may be attached to an automobile to allow the automobile to tow the trailer. Some known trailers have a relatively large size, which may allow the trailer to hold a large number of items or larger items. These relatively large trailers, however, may be difficult to maneuver and store. Other known trailers may have a relatively small size, which may be more easily maneuvered and stored than larger trailers. Disadvantageously, the smaller trailers may not be able to hold as many items and/or as large of items as the larger trailers.

BRIEF SUMMARY OF EMBODIMENTS OF THE INVENTION

A need therefore exists for a trailer that eliminates or diminishes the disadvantages and problems described above.

One aspect is a trailer that may be used to store and/or transport various items. The trailer may be selectively moved between an extended or use position and a collapsed or storage position. Advantageously, the trailer may be efficiently moved and/or stored in the collapsed or storage position.

Another aspect is a trailer that may include a bed and the bed may advantageously be disposed in one or more positions to allow the trailer to be used and stored. For example, the bed may include a plurality of panels that fold together to provide a more compact bed.

Yet another aspect is a trailer that may include a frame and the frame may move among a variety of positions to allow the trailer to be used and stored. For example, the frame may include a plurality of supports and the supports may fold together to provide a more compact frame.

Still another aspect is a trailer that may include an axle, which may be movable between one or more positions to allow the trailer to be disposed in the use and storage positions. For example, the axle may fold together to provide a more compact design.

A further aspect is a trailer that may include a pair of wheels that may be spaced apart a first distance when the trailer is in the extended or use position and a second distance when the trailer is in a collapsed or storage position. Advantageously, when the trailer is in the collapsed or storage position, one or both of the wheels may still be used, which may help in moving the collapsed trailer.

Another aspect is a trailer that may include an apparatus which assists in moving the trailer move between the extended or use position and the collapsed or storage position. The apparatus may include arms, wheels and a handle. The arms may contact or engage one wheel of the trailer and the handle may be used to manipulate the arms to lift the trailer's wheel away from the support surface. The apparatus may then be used to move the trailer between the extended or use position and the collapsed or storage position.

Still another aspect is a trailer that may include a pair of wheels that allow the trailer to be towed. The trailer may also include a separate wheel assembly that is sized and configured to assist in moving the trailer between the use and storage positions. For example, the wheel assembly may be sized and configured to move between a first position in which the wheel assembly engages a support surface and a second position in which the wheel assembly is spaced apart from the support surface. When the wheel assembly engages the support surface, one of the wheels of the trailer may be spaced apart from the support surface. This may allow the trailer to be easily moved between the extended position and the collapsed position.

Yet another aspect is a trailer that may include an arm which is sized and configured to be connected to a vehicle. The arm may be moved between an extended or use position and a collapsed or storage position. The trailer may also include a support assembly that may support the arm. In addition, the support assembly may facilitate moving the arm between the extended or use position and the collapsed or storage position. The support assembly, for example, may include a first support member and a second support member. The first support member may be pivotally connected to a frame of the trailer and pivotally connected to the arm. The second support member may be pivotally connected to a frame of the trailer and pivotally connected to the arm.

A further aspect is a trailer that may be quickly and easily moved between the use and storage positions. In particular, the trailer may be folded into the storage position to create a more compact and easily storable structure. Preferably, the trailer includes a multiple piece axle that is disposed in a generally aligned, straight configuration when the trailer is in the use position. When the trailer is being folded into the collapsed position, the center portion of the axle preferably moves towards the rear of the trailer and the center portion of the axle is folded together. Because the towing arm or tongue may be connected to the axle, the rearward movement of the axle may retract the towing arm while the trailer is being folded into the collapsed position. Advantageously, this may facilitate storage of the trailer because the towing arm may be disposed entirely or substantially beneath the bed or frame of the trailer.

A still further aspect is a trailer that may include components that fold in different planes when the trailer is moved from the use position to the storage position. For example, the axle may fold rearwardly and in a generally horizontal plane while the trailer bed and frame may fold upwardly and in a generally vertical plane. This may create a trailer with increased strength and rigidity because different components fold in different planes. In addition, when the axle is in the folded position, the folded sections of the axle may be disposed proximate or adjacent to each other. Similarly, when the bed and frame are in the folded position, the folded sections of the bed and frame may be disposed proximate or adjacent to each other. Advantageously, this may allow the trailer to be stored in a very compact configuration.

Yet another further aspect is a trailer that may include overlapping and/or interlocking portions. For example, when the trailer is in the use position, portions of the bed, frame and/or side walls may overlap and/or interlock. In particular, the bed may be constructed from two or more corrugated steel sections and these sections may overlap and/or interlock when the bed is in the collapsed position. This may create a bed with increased strength and structural integrity. Additionally, the side walls may be constructed from two or more sections and at least a portion of these sections may overlap and/or interlock to create side walls with increased strength and structural integrity.

Another aspect is a trailer that may include side walls or barriers that may be used for several different purposes. For example, the barriers may be connected to the trailer to create the side walls. The barriers may also be detached from the trailer to allow various sized items to be disposed in the trailer. In addition, the barriers may be used to create ramps to facilitate loading and unloading of the trailer. Further, the barriers may be pivotally connected to the trailer to facilitate folding of the trailer into the storage position. Significantly, one or more of the barriers may be interchangeable, which may make the trailer easier to assemble and use.

Still another aspect is a trailer that may include an actuating member or mechanism to facilitate moving the trailer between the use and storage positions. The actuating member or mechanism may include cables, pulleys, cranks, jacks and the like to help move the trailer between the use and storage positions. For example, the actuating member or mechanism may help pull the trailer into the storage position and push the trailer into the use position. Advantageously, the actuating member or mechanism may provide controlled movement of the trailer between the use and storage positions. Significantly, because the movement of the trailer may always be controlled, the trailer may not inadvertently or unexpectedly move, which may make the trailer easier to use. In addition, the actuating member or mechanism may help maintain the trailer in the use or storage positions, and prevent the trailer suddenly moving from the use or storage position.

Yet another aspect is a trailer that may include an improved suspension system. For example, the trailer may include a leaf spring type suspension system and the axle may be connected to the leaf spring. The bracket or structure used to attach the axle and/or wheel assembly to the leaf spring may help prevent the wheel from undesirably twisting while the trailer is being towed. Thus, the wheel may remain in the desired direction and orientation regardless of the forces applied to the wheel.

Another aspect is a folding trailer that may be capable of moving between a use position and a storage position. The folding trailer may include a frame with a front portion, a rear portion, a right side and a left side; a wheel disposed proximate the frame; an axle connected to the wheel, the axle being movable between a first position in which the axle is generally aligned along an axis and a second position in which the axle is disposed in a folded configuration, the axle being located in generally the same plane in the first position and the second position, the axle moving in a generally rearward direction when the axle is moved from the first position to the second position; and a bed connected to the frame, the bed including a first portion and a second portion, the bed being movable between a first position in which the first and second portions of the bed are generally aligned with a first plane and a second position in which the first and second portions of the bed are disposed in a folded position and generally aligned with a second plane, the first plane and the second plane being disposed at substantially different angles. The axle is preferably disposed in the first position and the bed is disposed in the first position when the trailer is in the use position. In addition, the axle is preferably disposed in the second position and the bed is disposed in the second position when the trailer is in the storage position.

Still another aspect is a folding trailer that may be capable of moving between a use position and a storage position. The folding trailer may include a frame with a front portion, a rear portion, a right side and a left side; a wheel disposed proximate the frame; an axle connected to the wheel, the axle being movable between a first position in which the axle is generally aligned along an axis and a second position in which the axle is disposed in a folded configuration, the axle being located in generally the same plane in the first position and the second position, the axle moving in a generally rearward direction when the axle is moved from the first position to the second position; and a towing arm connected to the axle, the towing arm being positioned in an extended position when the axle is in the first position, the towing arm being positioned in a retracted position when the axle in the second position, the towing arm moving in the generally rearward direction when the axle is moved from the first position to the second position.

These and other aspects, features and advantages of the present invention will become more fully apparent from the following detailed description of preferred embodiments.

BRIEF DESCRIPTION OF THE DRAWINGS

The appended drawings contain figures of preferred embodiments to further illustrate and clarify the above and other aspects, advantages and features of the present invention. It will be appreciated that these drawings depict only preferred embodiments of the invention and are not intended to limit its scope. The invention will be described and explained with additional specificity and detail through the use of the accompanying drawings in which:

FIG. 43 is a top perspective view of a portion of the trailer shown in FIG. 25, illustrating an exemplary arm and axle in an extended position;

FIG. 44 is a bottom perspective view of the arm and axle shown in FIG. 43;

FIG. 55 is an enlarged perspective view of a left rear portion of the trailer shown in FIG. 51;

FIG. 56 is an enlarged perspective view of a left front portion of the trailer shown in FIG. 51;

FIG. 57 is an enlarged perspective view of a right front portion of the trailer shown in FIG. 51;

FIG. 58 is an enlarged perspective view of a right rear portion of the trailer shown in FIG. 51;

FIG. 59 is an enlarged perspective view of a right rear portion of the trailer shown in FIG. 51, illustrating an exemplary biasing member and an exemplary pin;

FIG. 60 is an enlarged perspective view of a right rear portion of the trailer shown in FIG. 51, illustrating an exemplary engaging member coupled to the pin shown in FIG. 59;

FIG. 65 is perspective view of a rear portion of the trailer shown in FIG. 51 illustrating exemplary attachment members;

FIG. 66 is perspective view of an exemplary barrier shown in FIG. 51;

DETAILED DESCRIPTION OF THE PREFERRED EMBODIMENTS

Figure 1:
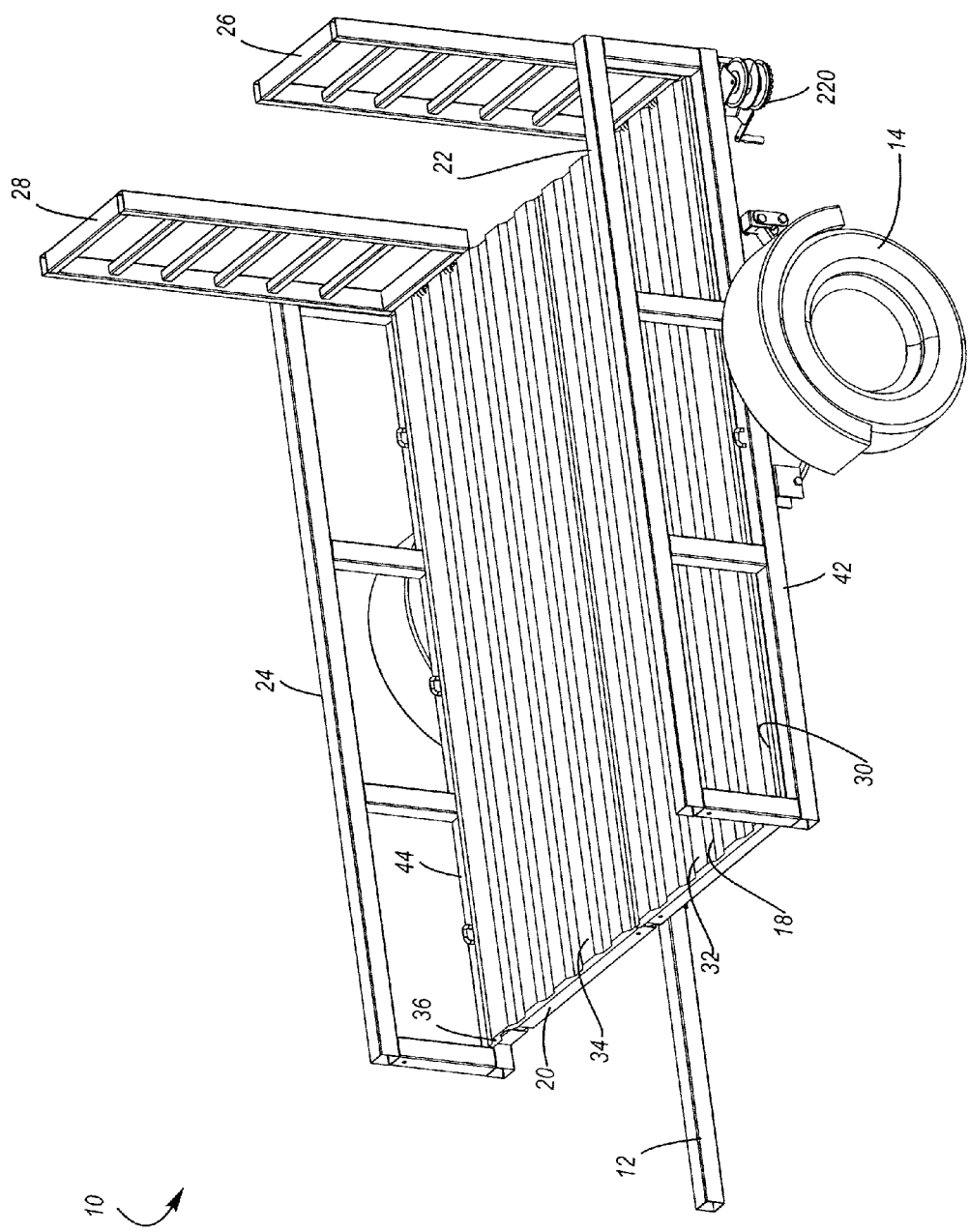
FIG. 1 is a perspective view of an exemplary trailer, illustrating the trailer in an extended or use position.

The present invention is generally directed towards a trailer. The principles of the present invention, however, are not limited to trailers. It will be understood that, in light of the present disclosure, the trailer disclosed herein can be successfully used in connection with other types of storage and/or transportation systems.

Additionally, to assist in the description of the trailer, words such as top, bottom, front, rear, right and left may be used to describe the accompanying figures. These figures may be, but are not necessarily, drawn to scale. It will be appreciated that the trailer and various components can also be located in a variety of desired positions—including various angles, sideways and even upside down. In addition, the trailer and various components of the trailer may have other sizes, shapes, configurations and arrangements that those shown in the drawings. A detailed description of the trailer now follows.

A trailer 10, such as shown in FIG. 1, may be used to store and/or transport various items. An automobile or other motorized vehicle may pull or otherwise move the trailer. Exemplary automobiles typically include, but are not limited to, a car, a truck and a sport utility vehicle (SUV). Other exemplary motorized vehicles include all-terrain vehicles (ATVs) and lawn tractors. Desirably, the trailer 10 may be easily moved and used for various suitable purposes such as camping, landscaping, travelling (such as to the beach or other recreational locations), moving items, and the like.

If desired, while being towed by a first vehicle, the trailer 10 may be used to carry a second vehicle, and the second vehicle may later be used to tow the trailer. For example, the second vehicle may comprise an all-terrain vehicle (ATV), a lawn tractor or the like, which may be sold with and loaded onto the trailer 10. By selling the trailer 10 and the second vehicle together, a store may experience greater sales for both items because the store may offer the items for sale at a discounted price when they are sold together. Moreover, using the trailer 10 to carry the second vehicle may provide some customers the means for transporting the second vehicle home, which may have been otherwise too difficult for the customers. For instance, a customer may purchase the trailer and when the customer arrives home, he or she may remove the lawn tractor from the trailer and use the lawn tractor to move the trailer. It will be appreciated that the lawn tractor and trailer may be purchased together, individually or in other combinations depending, for example, upon the intended use of the trailer 10.

As shown in FIGS. 1-4, the trailer 10 may include a towing arm 12 that may be sized and configured to be connected to a vehicle, which may pull the trailer. For example, the vehicle may include a hitch and the arm 12 may be sized and configured to be attached to the hitch. In particular, the arm 12 may include, or be connected to, a hitch coupler that may be sized and configured to be coupled to the hitch of the vehicle. The hitch coupler may be sized and configured to be coupled to a variety of differently sized and/or configured hitches, if desired. It will be appreciated that the arm 12 of the trailer may be connected to a variety of other suitable vehicles, connectors and/or structures.

Figure 2:
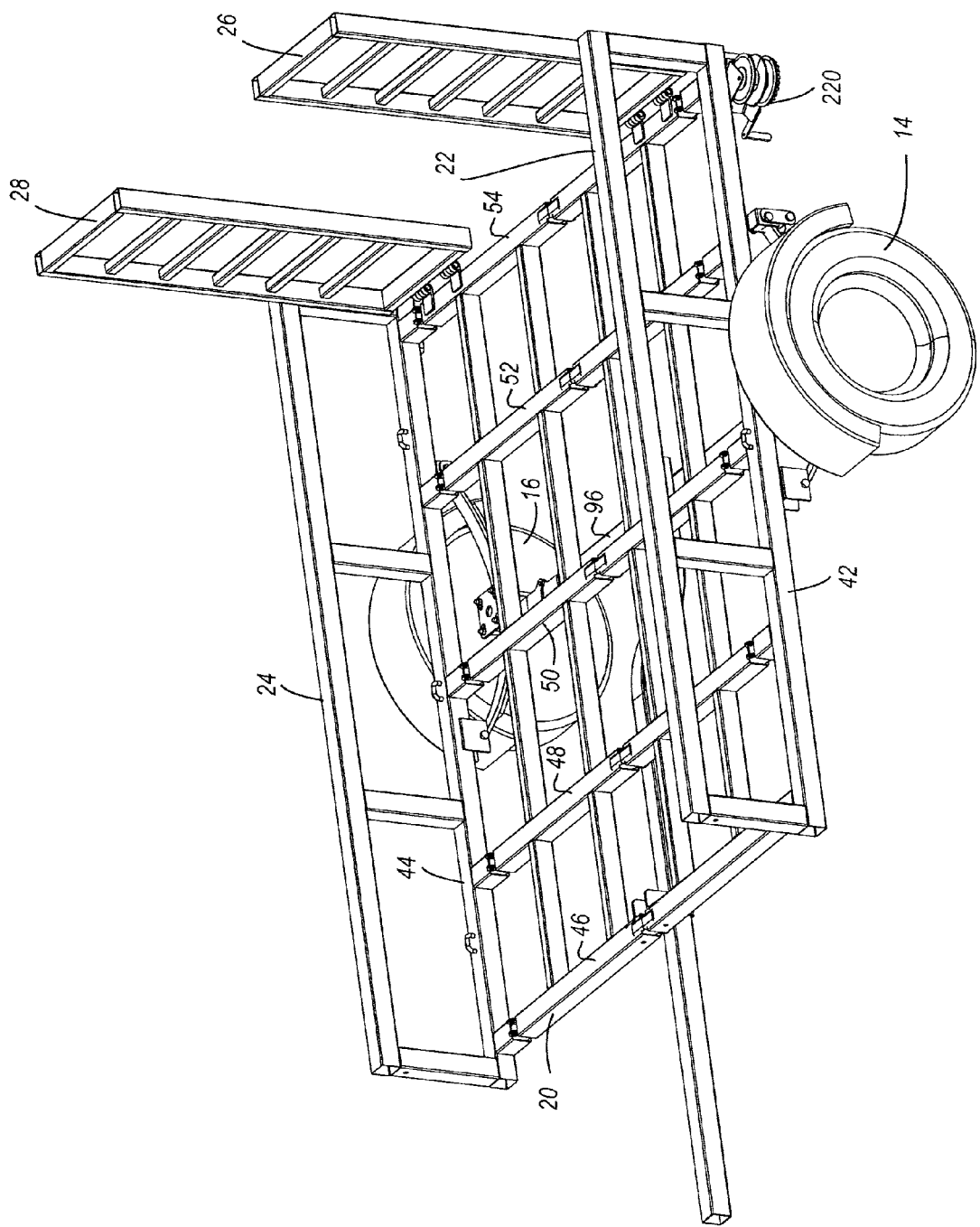
FIG. 2 is a perspective view of a portion of the trailer shown in FIG. 1, illustrating the trailer without the bed.
Figure 3:
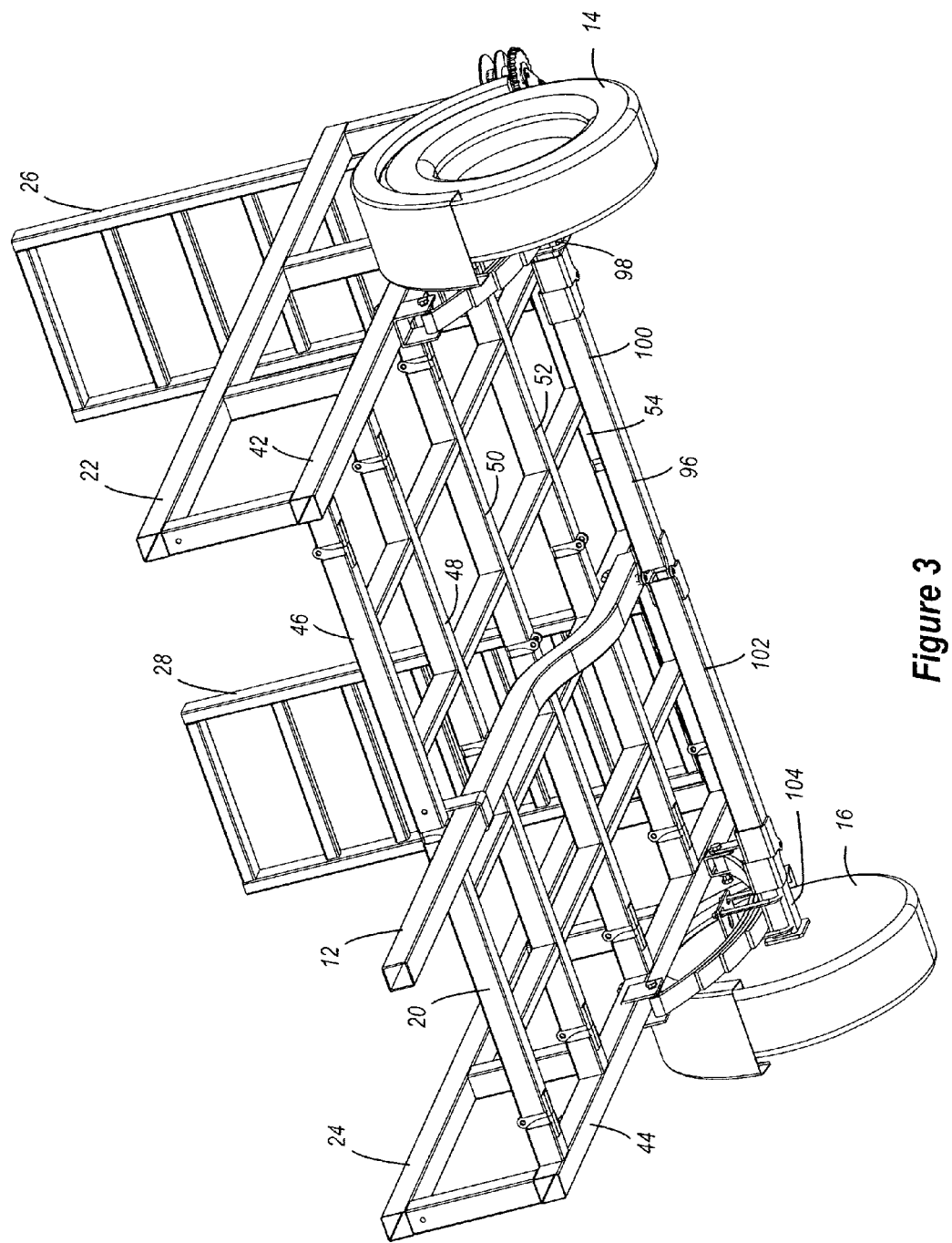
FIG. 3 is a bottom perspective view of a portion of the trailer shown in FIG. 2.

As shown in FIGS. 1-3, the trailer 10 may include one or more wheels 14, 16. The wheels 14, 16 may advantageously help the trailer 10 be pulled or otherwise moved. The wheels 14, 16 may have a variety of suitable shapes, sizes, configurations and arrangements. The trailer 10 may also include any suitable number of wheels. For example, the trailer 10 may have four wheels to enable the trailer, for example, to carry heavier loads.

As shown in FIG. 1, the trailer 10 may include a bed or floor 18 upon which one or more items carried by the trailer may rest. The trailer may also include a frame 20 that may help support and/or strengthen the bed 18. It will be appreciated that the trailer 10 does not require the bed 18 and that one or more items may, for example, rest upon the frame 20 as the trailer carries those items.

The trailer 10 may also include one or more barriers, such as side walls or end walls, and these barriers are preferably disposed about the outer periphery or edges of the bed 18. In greater detail, the trailer may include a front barrier, a rear barrier, a left barrier and/or a right barrier; and the barriers may be connected to, or form part of, the frame 20. Desirably, the front, rear, left, and right barriers may be sized and configured to help prevent items from leaving corresponding front, rear, left and right portions of the bed 18 and/or the trailer 10. The barriers may be connected to the frame using one or more fasteners (such as bolts), but the barriers may also be connected to the frame using other type of fasteners, adhesives, welding and the like. Advantageously, the barriers may be connected to any suitable portions of the trailer 10 and the trailer may be used with or without the barriers.

In further detail, as shown in FIG. 1, the trailer 10 may include barriers 22, 24, 26, 28. The barriers 22, 24 may be positioned on the left and right sides of the bed 18 and, as shown in FIG. 1, the barriers 26, 28 may be positioned at the rear of the trailer 10. The barriers 22, 24, 26, 28 preferably have a generally fence-shaped configuration including at least one generally horizontal railing and/or at least one generally vertical post. The barriers 22, 24, 26, 28, however, could have other suitable sizes, shapes, configurations and the like. For example, the barriers 22, 24, 26, 28 may be solid walls, railings. While the trailer 10 may have any suitable number and type of barriers, the barriers are not required.

The barriers 22, 24, 26, 28 may pivot or move relative to the trailer 10. For example, the rear barriers 26, 28 may pivot, move or be removed to allow for longer items (such as large pieces of plywood or drywall) to extend past the rear edge of the bed 18. Similarly, the side barriers 22, 24 may pivot, move or be removed to allow the items to extend past the sides of the bed 18.

The barriers 22, 24, 26, 28, may also be used for different purposes and functions. For example, as shown in FIG. 1, the barriers 26, 28 may be used as a ramp to facilitate loading and/or unloading of the trailer 10. In particular, one end of the barriers 26, 28 may be attached to the rear portion of the trailer 10 and the other ends of the barriers may rest upon the support surface. This may allow objects to be wheeled or carried into and out of the trailer 10. After using the barriers 26, 28 as a ramp, the barriers may be attached to the trailer 10. For example, the barrier 26 may be attached to the front of the trailer 10 to form a front barrier and the barrier 28 may be connected to the rear of the trailer to form a rear barrier. Advantageously, the barriers 22, 24, 26, 28 may help reinforce and/or strengthen the trailer 10. In addition, the barriers 22, 24, 26, 28 may be interchangeably connected to the trailer 10, which may facilitate manufacturing, assembly and use of the trailer. For instance, the front and rear barriers 26, 28 may be interchangeable, and the side barriers 22 and 24 may be interchangeable.

As shown in FIGS. 1-12, the trailer 10 may be selectively collapsed and/or extended. In particular, the trailer 10 may be selectively moved between an extended or use position and a collapsed or storage position. Advantageously, the trailer 10 may be more efficiently stored when positioned in the storage position, as shown in FIGS. 5-8. As discussed in further detail below, the wheels 14, 16, the bed 18, the frame 20 and/or other portions of the trailer 10 may include one or more components and move among a variety of different positions to facilitate movement of the trailer 10 between the use and storage positions.

Figure 5:
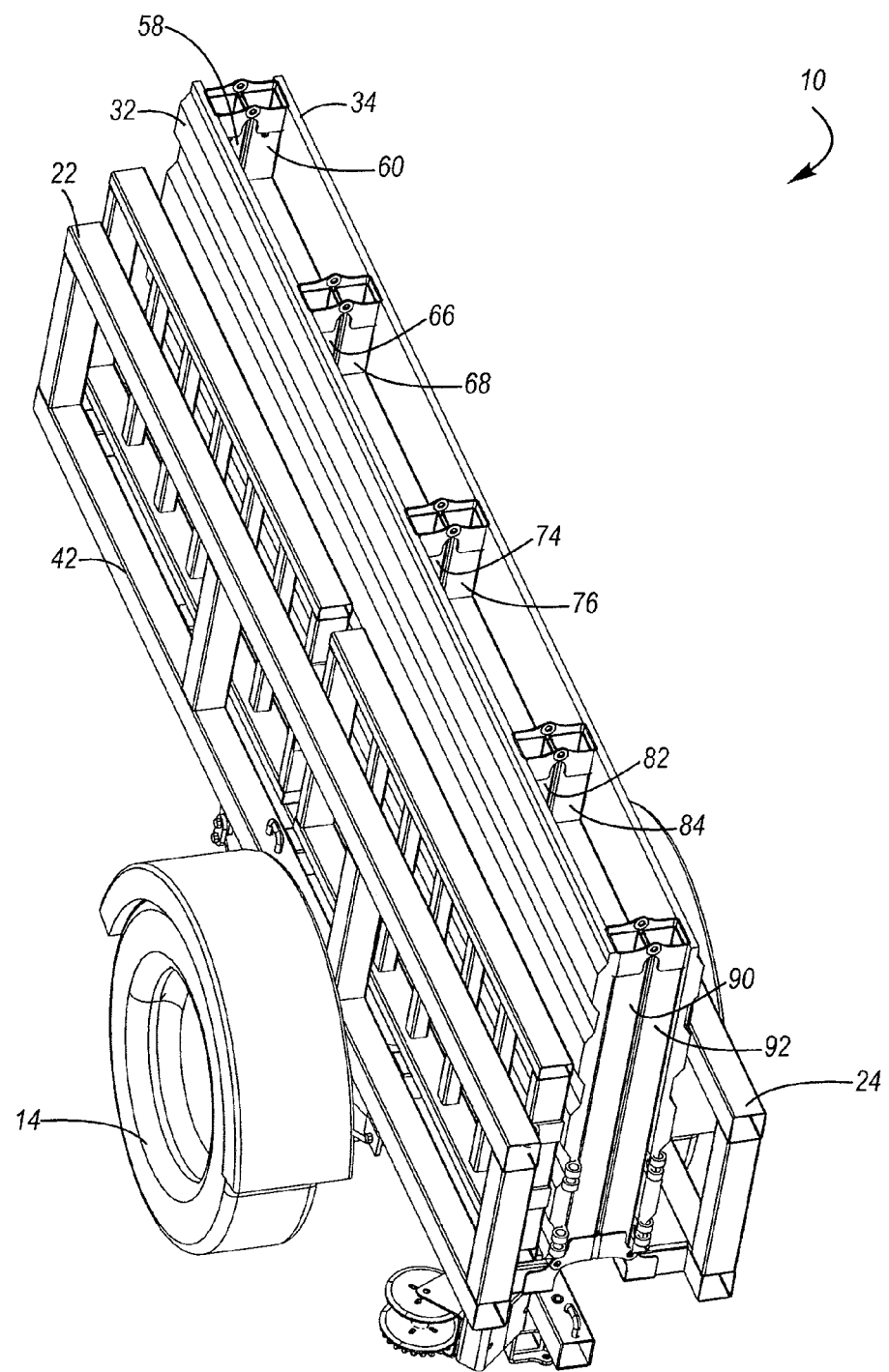
FIG. 5 is a perspective view of the trailer shown in FIG. 1, illustrating the trailer in a collapsed or storage position.
Figure 6:
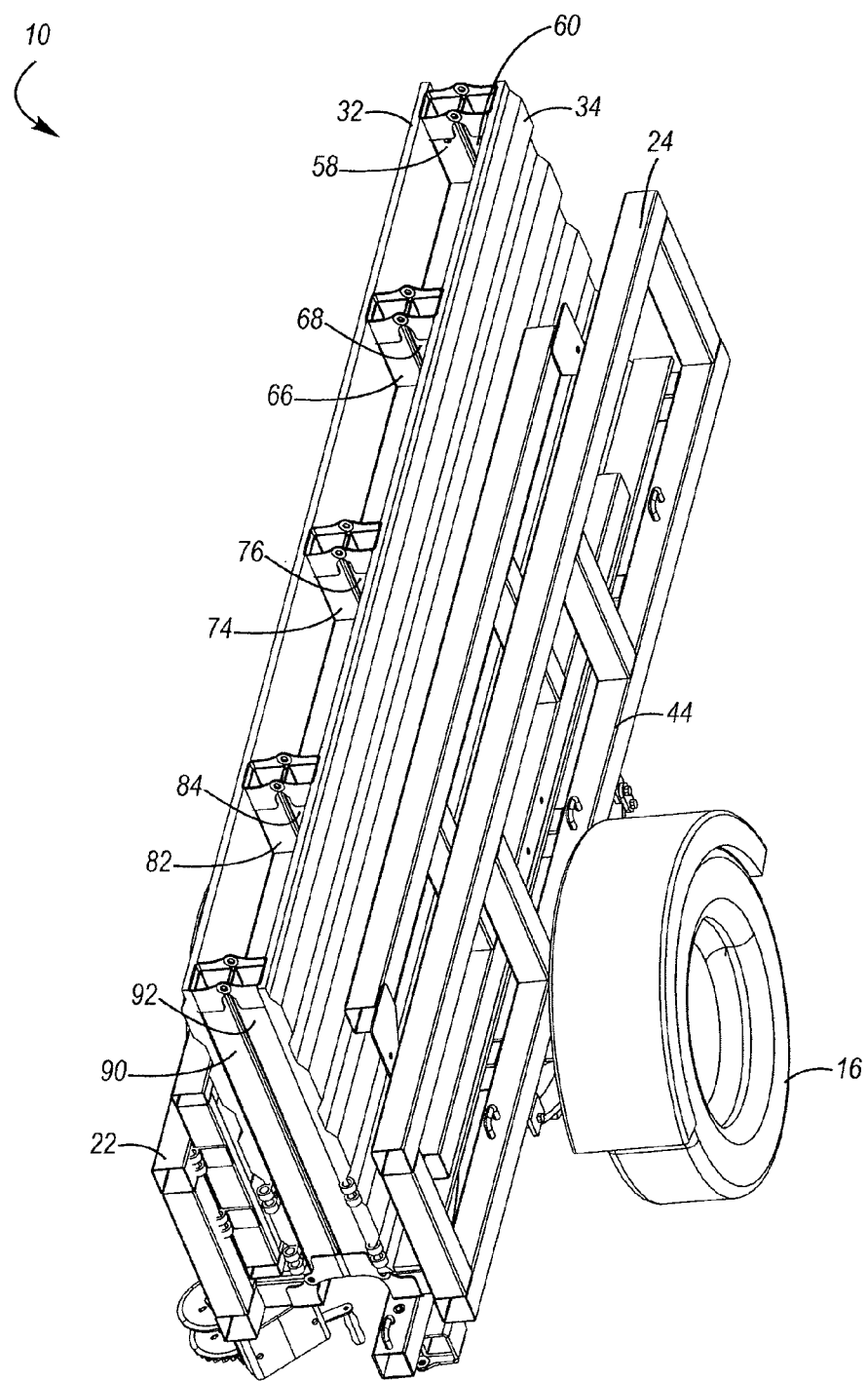
FIG. 6 is another perspective view of the trailer shown in FIG. 1, illustrating the trailer in a collapsed or storage position.

For example, the bed 18 may include two or more sections to facilitate folding of the bed. In particular, as shown in FIGS. 1, 5-6 and 9-10, the bed 18 may include four sections or panels 30, 32, 34, 36. As shown in FIG. 1, the panels 32, 34 may be positioned in a generally horizontal plane and level orientation when the trailer 10 is in the use position. The panels 32, 34, however, may be positioned in a generally vertical plane and upright orientation when the trailer is in the storage position, as shown in FIGS. 5-6. In particular, as the trailer is collapsed, the panels 32, 34 may move towards the generally upright orientation and away from the generally level orientation, and the panels 32, 34 may move towards the generally level orientation and away from the generally upright orientation as the trailer is extended.

The panels 30, 32, 34, 36 may be constructed from blow-molded plastic. The blow-molded plastic panels may include a hollow interior portion formed during the blow-molding process. In addition, the blow-molded plastic panels may include an upper surface or wall and a lower surface or wall that are spaced apart from each other, and the blow-molded plastic panels may include one or more depressions (referred to as "tack offs" or "kiss offs") that are sized and configured to strengthen the blow-molded plastic panels. The blow-molded plastic panels may be relatively lightweight, strong, durable and/or weather resistant. In addition, the blow-molded plastic panels may be interconnected using, for instance, a living hinge that may be integrally formed with the panels as part of a unitary, one-piece structure during the blow-molding process. For example, the panels 30, 32 may be interconnected via a living hinge 38, and the panels 34, 36 may be interconnected via a living hinge 40.

It will be appreciated, however, that the panels 30, 32, 34, 36 may be constructed from other materials, such as wood, metal and the like, and the panels may be constructed using other molding and manufacturing processes. For example, the bed 18 may include panels 30, 32, 34, 36 constructed from metal, such as galvanized steel, and the panels may be corrugated, if desired. Advantageously, the corrugated metal panels may form a strong and sturdy bed 18 for the trailer. In addition, when the trailer 10 is in the use position, at least a portion of the panels may overlap and/or interlock. Significantly, this may increase the strength and/or structural integrity of the trailer 10. In addition, the overlapping and/or interlocking panels 30, 32, 34, 36 may help create a stronger, more rigid bed 18. The panels 30, 32, 34, 36 may also have other suitable shapes, sizes, configuration and arrangements depending, for example, upon the size and shape of the bed 18 and/or the intended use of the trailer 10.

Figure 4:
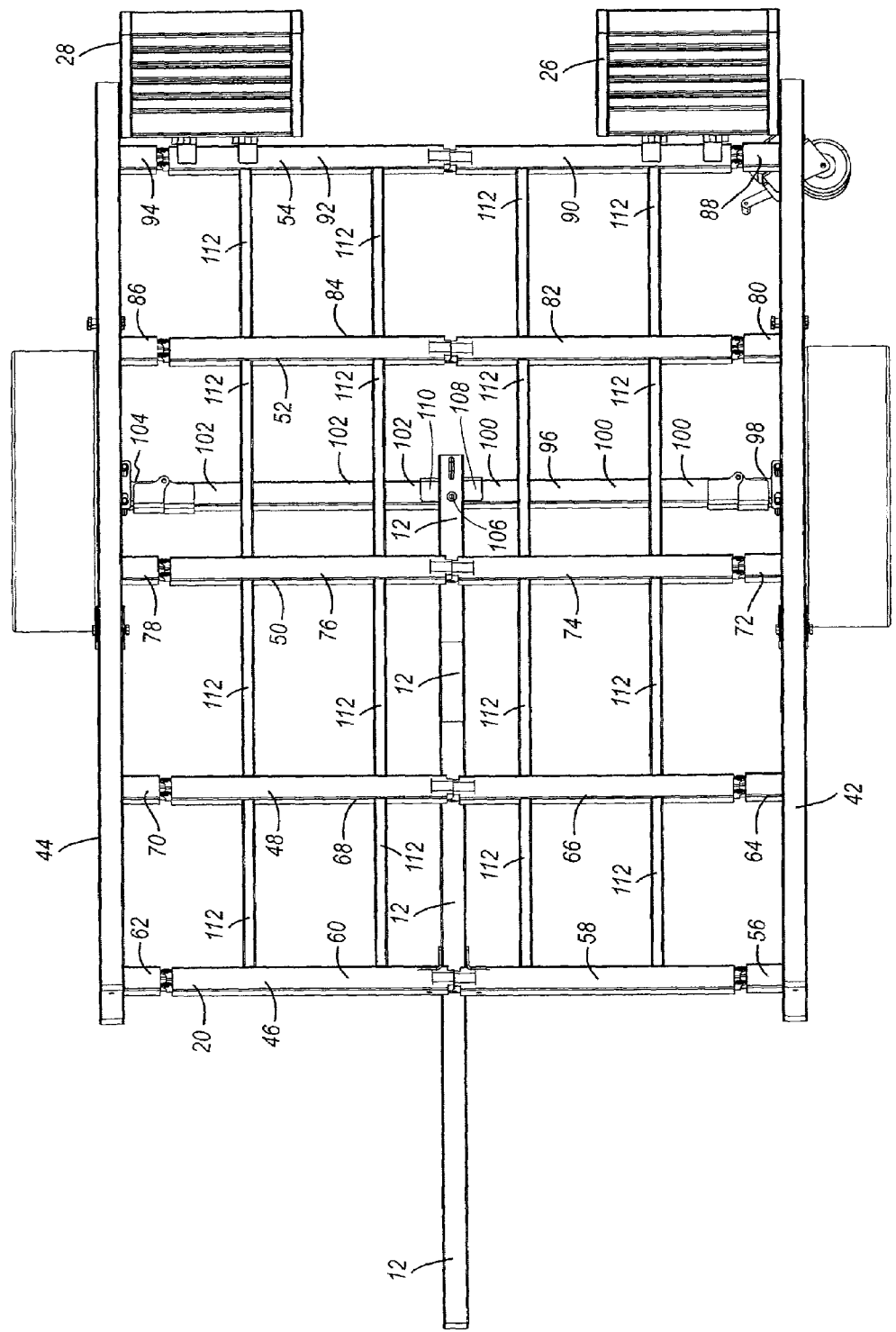
FIG. 4 is a top view of a portion of the trailer shown in FIG. 2.

As shown in FIGS. 2-4, the frame 20 may include one or more supports, such as elongated supports 42, 44, 46, 48, 50, 52, 54. The supports 42, 44 may extend longitudinally along the length of trailer 10 and these supports preferably extend from the front to the rear of the trailer. The supports 46, 48, 50, 52, 54 may extend laterally along the width of the trailer 10 and these supports preferably extend between the left and right sides of the trailer. It will be appreciated that the frame 20 may include any suitable number of supports that extend longitudinally, laterally and/or other suitable orientations and arrangements depending, for example, upon the size, configuration or intended use of the trailer 10.

As best shown in FIG. 4, the supports 46, 48, 50, 52, 54 may be disposed between and connected to the supports 42, 44. In addition, the supports 46, 48, 50, 52, 54 preferably include multiple components or sections to facilitate folding of the trailer 10. For example, the support 46 may include four sections 56, 58, 60, 62. These sections 56, 58, 60, 62 are preferably interconnected by hinges to allow the trailer 10 to fold. Similarly, the support 48 may include portions 64, 66, 68, 70; the support 50 may include portions 72, 74, 76, 78; the support 52 may include portions 80, 82, 84, 86; and the support 54 may include portions 88, 90, 92, 94. As shown in FIG. 4, the end portions 56, 64, 72, 80, 88 may be connected to the support 42 and the end portions 62, 70, 78, 86, 94 may be connected to the support 44. It will be understood that the supports may include any suitable number of sections or components depending, for example, upon the structure and intended use of the trailer 10.

As shown in FIGS. 1, 5 and 6, the bed 18 may be connected to the frame 20. For example, the end portions 56, 64, 72, 80, 88 of the supports of the frame 20 may be connected to the panel 30 of the bed 18. Similarly, the central portions 58, 66, 74, 82, 90 of the supports of the frame 20 may be connected to the panel 32 of the bed 18 and the central portions 60, 68, 76, 84, 92 of the supports of the frame 20 may be connected to the panel 34 of the bed 18. The end portions 62, 70, 78, 86, 94 of the supports of the frame 20 may be connected to the panel 36 of the bed 18.

As mentioned above, the supports 46, 48, 50, 52, 54 may include a plurality of pivotally or movably interconnected components. For example, the center portions 58, 66, 74, 82, 90 may be pivotally connected to the end portions 56, 64, 72, 80, 88, respectively, and pivotally connected to the other center portions 60, 68, 76, 84, 92, respectively. The center portions 60, 68, 76, 84, 92 may also be pivotally connected to the end portions 62, 70, 78, 86, 94, respectively. In addition, the end portions 56, 64, 72, 80, 88 may be connected to the support 42 and the end portions 62, 70, 78, 86, 94 may be connected to the support 44. Thus, the various components may be interconnected to form at least a portion of the frame 20.

Because the supports 46, 48, 50, 52, 54 may include a plurality of pivotally or otherwise movably interconnected components, the supports may move among a variety of positions. Advantageously, this may help the trailer 10 move between the collapsed and extended positions. For example, as shown in FIGS. 2-4 and 15-16, the supports 46, 48, 50, 52, 54 may be positioned in a use or first position when the trailer 10 is in the use position, as shown in FIG. 1. Thus, in the use position, the various components or portions of the supports 46, 48, 50, 52, 54 may be generally aligned and disposed in the same plane. In addition, the supports 46, 48, 50, 52, 54 may be aligned in a generally parallel configuration and disposed in the same plane. The supports 46, 48, 50, 52, 54 may be disposed in a collapsed or second position when the trailer 10 is in the collapsed or storage position as shown in FIGS. 5-8, 11-14 and 17-20. As the trailer 10 is collapsed, the supports 46, 48, 50, 52, 54 may move towards the second position and away from the first position.

Figure 21:
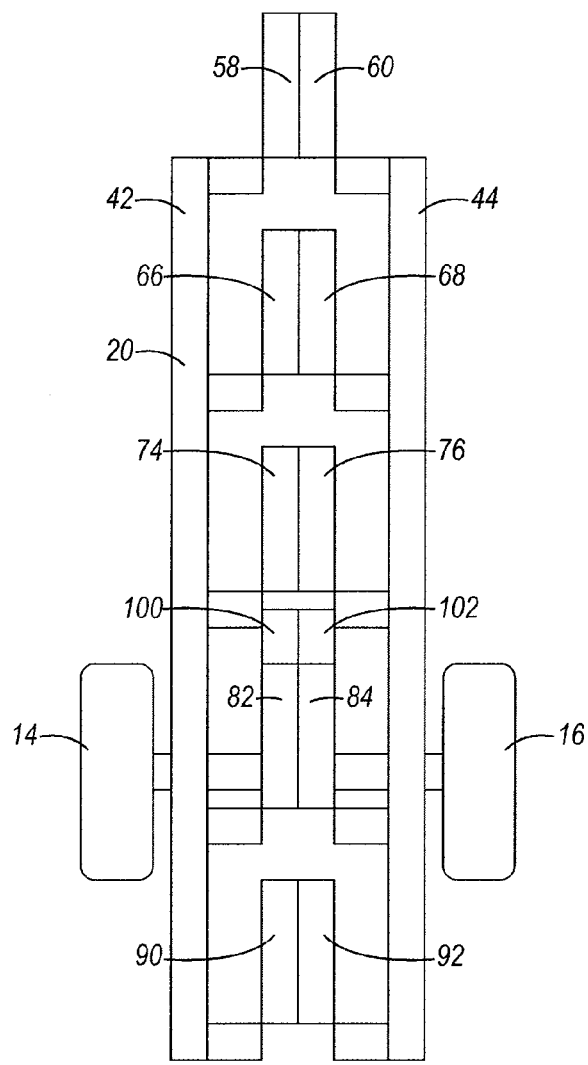
FIG. 21 is a diagram of a top view of a portion of the trailer shown in FIG. 1, illustrating the frame and axle in still another exemplary collapsed position.
Figure 22:
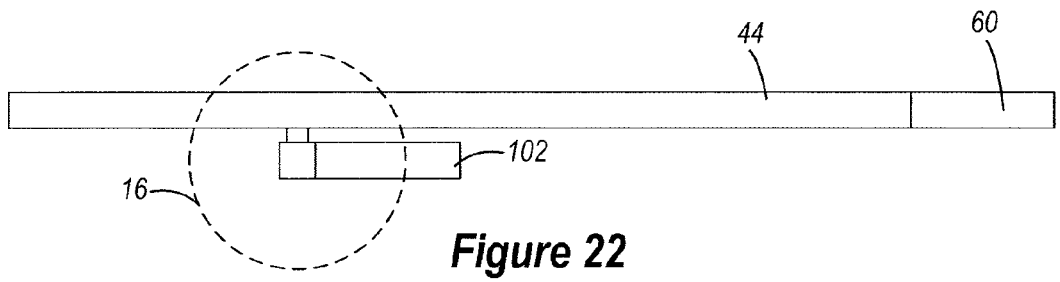
FIG. 22 is a diagram of a side view of the trailer shown in FIG. 21.
Figure 23:
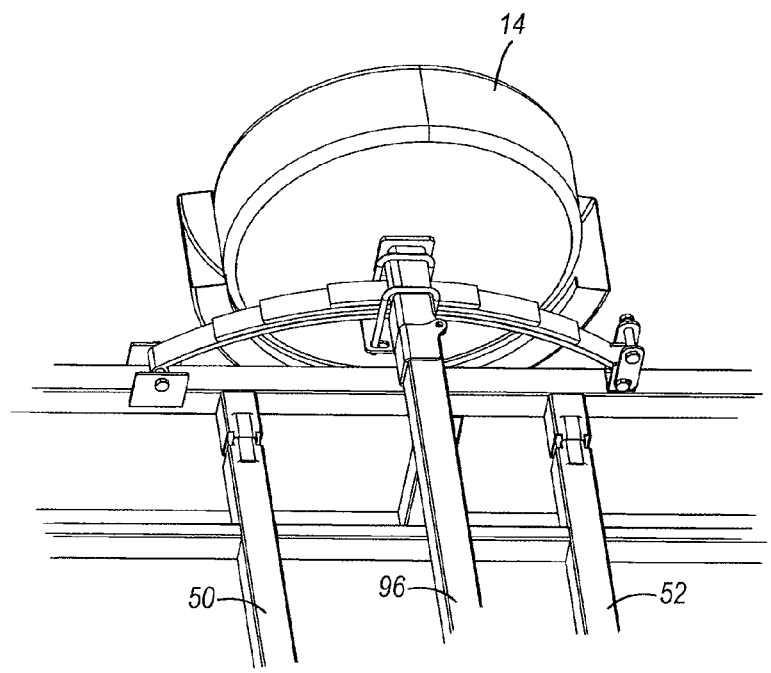
FIG. 23 is a bottom perspective view of a portion of the trailer shown in FIG. 1.
Figure 24:
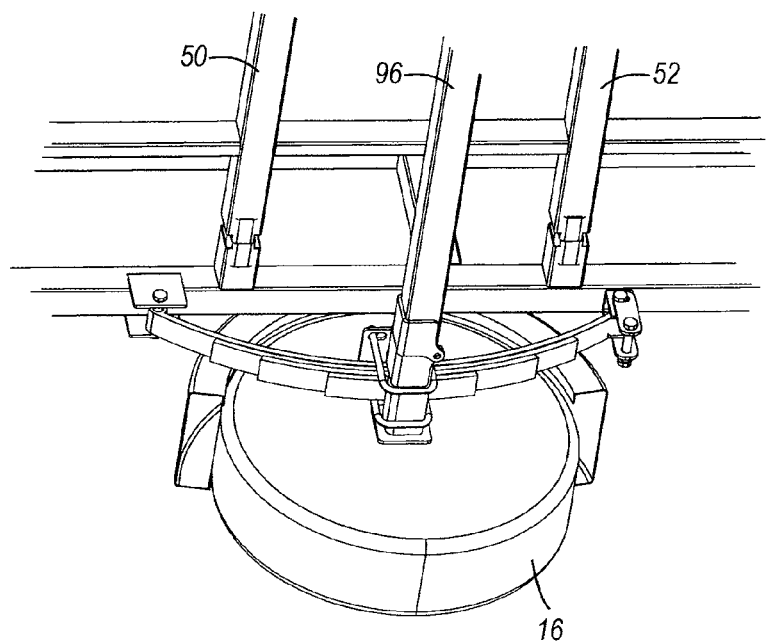
FIG. 24 is another bottom perspective view of a portion of the trailer shown in FIG. 1.

In greater detail, when the supports 46, 48, 50, 52, 54 are in the collapsed position shown in FIGS. 5-8, 11-14 and 17-18, the center portions of the supports are preferably disposed proximate or adjacent to each other and disposed in a generally upright configuration. In particular, the center portions 58, 60; the portions 66, 68; the portions 74, 76; the portions 82, 84; and the portions 90, 92 may be folded together in a generally upright orientation. On the other hand, when the supports 46, 48, 50, 52, 54 are in the collapsed position, as shown in FIGS. 21-22, the center portions 58, 60; the portions 66, 68; the portions 74, 76; the portions 82, 84; and the portions 90, 92 may be folded together in a generally level orientation and may extend forwardly. It will be appreciated that the supports 46, 48, 50, 52, 54 may have other suitable arrangements and configuration in the use and storage positions. It will also be appreciated that the frame 20 may have other suitable arrangements and configurations depending, for example, upon the size and/or intended use of the trailer 10.

Figure 15:
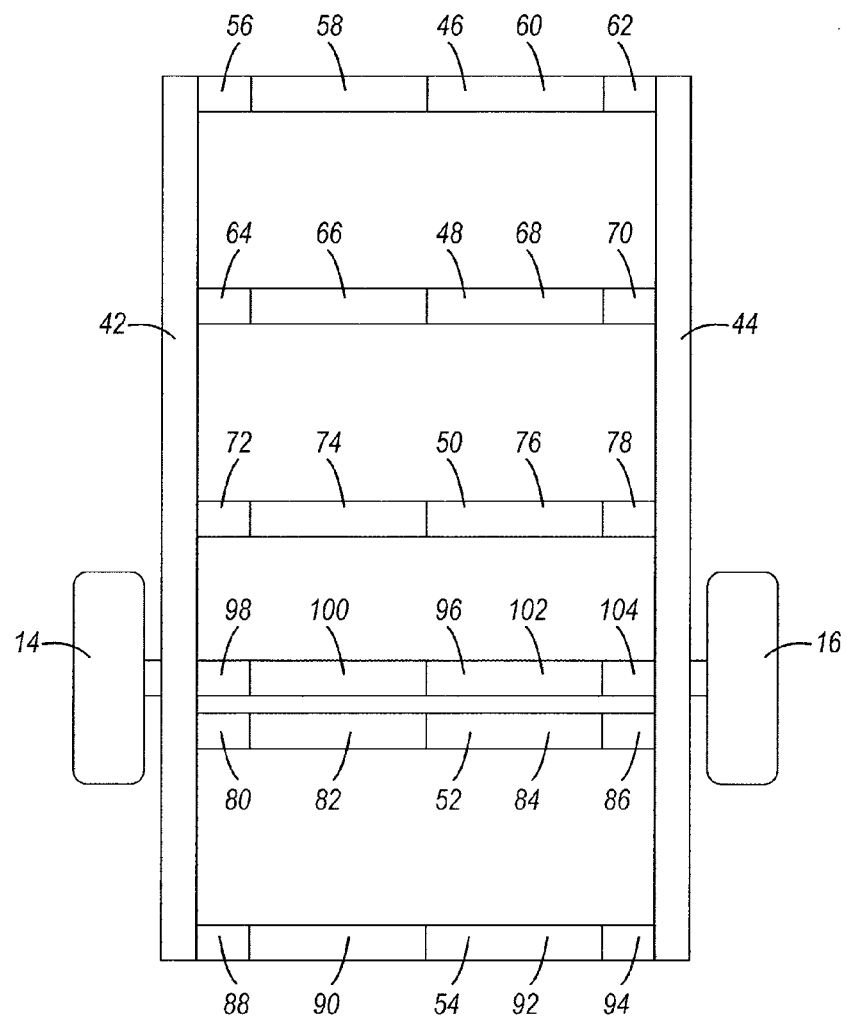
FIG. 15 is a diagram of a top view of a portion of the trailer shown in FIG. 1, illustrating the frame and axle in the extended position.
Figure 16:
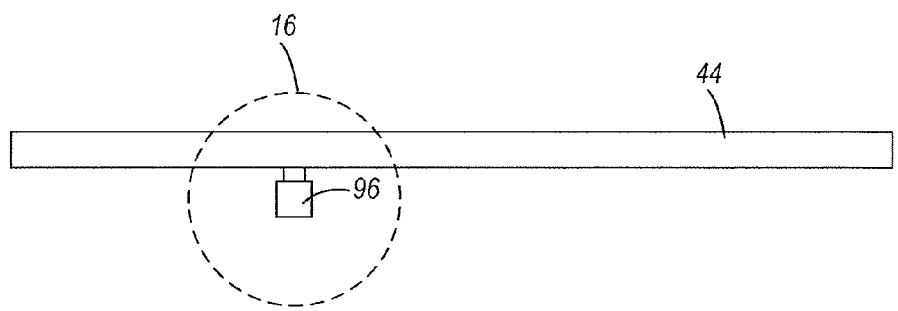
FIG. 16 is a diagram of a side view of the trailer shown in FIG. 15.
Figure 17:
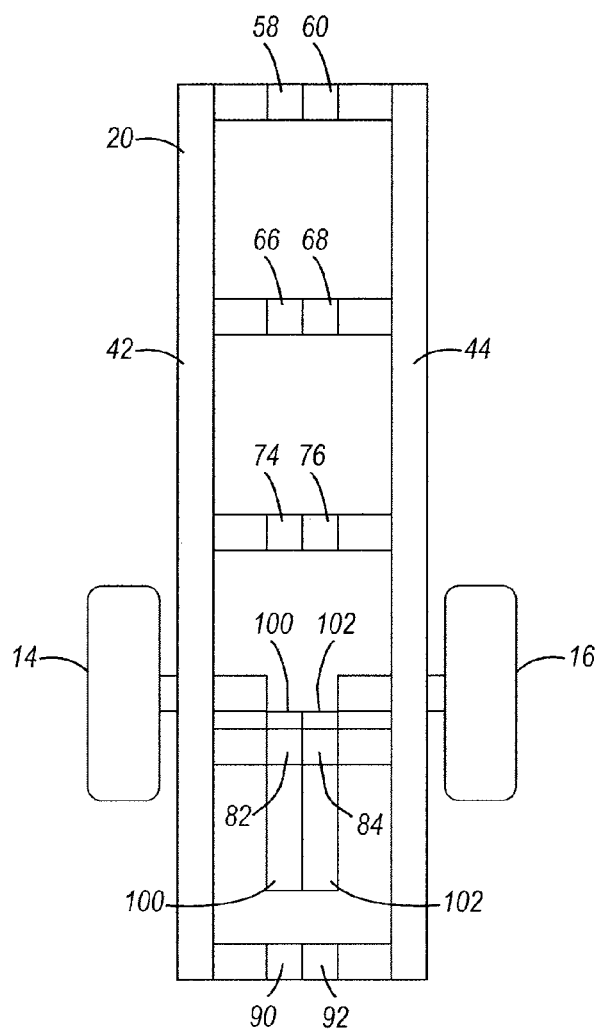
FIG. 17 is a diagram of a top view of a portion of the trailer shown in FIG. 1, illustrating the frame and axle in an exemplary collapsed positions.
Figure 18:
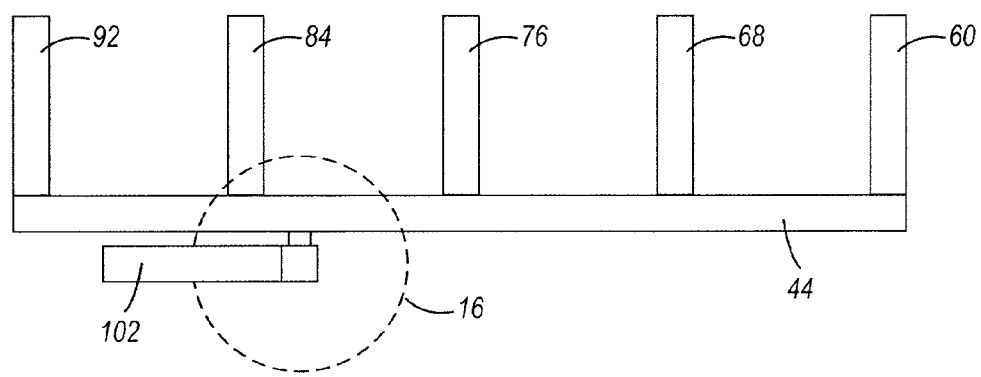
FIG. 18 is a diagram of a side view of the trailer shown in FIG. 17.

As shown in FIGS. 2-3 and 15, the trailer 10 may include an axle 96. The axle 96 may extend between and interconnect the wheels 14, 16. To facilitate folding of the trailer 10 into the storage position, the axle 96 preferably includes pivotally or otherwise movably connected portions. In particular, the axle 96 may include four sections or portions 98, 100, 102, 104 that are interconnected. For example, one end portion 98 may be connected to the wheel 14 and the other end portion 104 may be connected to the wheel 16. The first center portion 100 may be pivotally or otherwise movably connected to the end portion 98 and the second center portion 102; and the second center portion 102 may be pivotally or otherwise movably connected to the end portion 104 and the second center portion 100.

Advantageously, by including a plurality of pivotally or otherwise movably interconnected components, the axle 96 may allow the trailer 10 to be moved between the use and storage positions. For example, as shown in FIGS. 2-4 and 15-16, the axle 96 may be positioned in an extended or first position when the trailer 10 is in the use position, as shown in FIG. 1, and in a collapsed or second position when the trailer is in the storage position as shown in FIGS. 5-8, 11-14 and 17-22. As the trailer 10 is collapsed, the axle 96 may move towards the second position and away from the first position, and the axle may move towards the first position and away from the second position as the trailer is extended.

In greater detail, when the axle 96 is in the collapsed position as shown in FIGS. 5-8, 11-14 and 17-22, the center portions 100, 102 may be folded together. Specifically, the center portions 100, 102 of the axle 96 may be folded in a generally level orientation and the portions may be folded rearwardly as shown in FIGS. 5-8, 11-14 and 17-18, or forwardly as shown in FIGS. 21-22. Advantageously, the various portions 98, 100, 102, 104 of the axle 96 may remain in generally the same plane in both the extended and storage positions. It will be appreciated, however, that the axle 96 may be folded or disposed in other suitable directions, planes, positions and the like.

Figure 19:
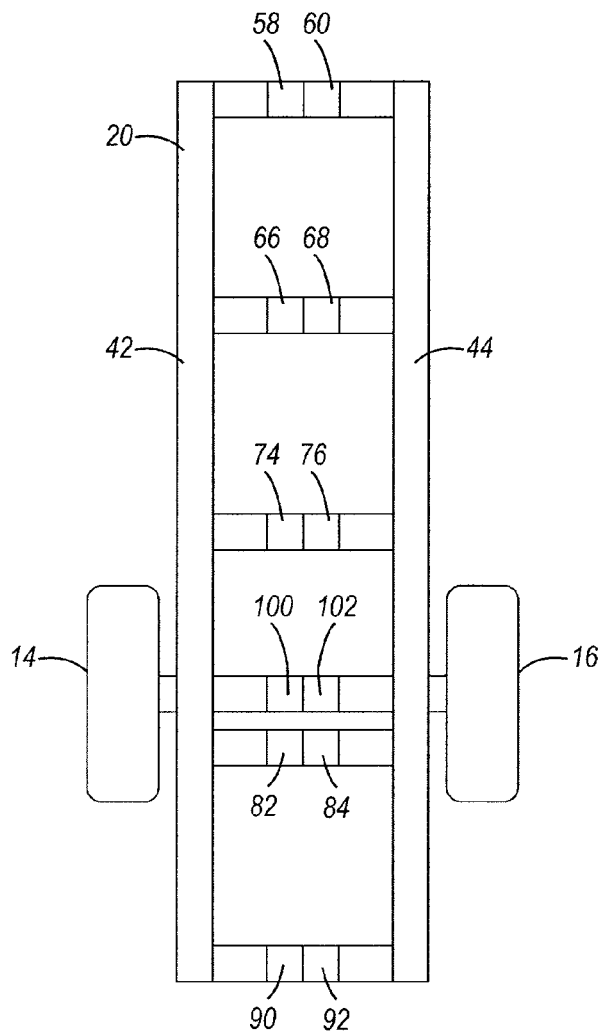
FIG. 19 is a diagram of a top view of a portion of the trailer shown in FIG. 1, illustrating the frame and axle in exemplary collapsed position.
Figure 20:
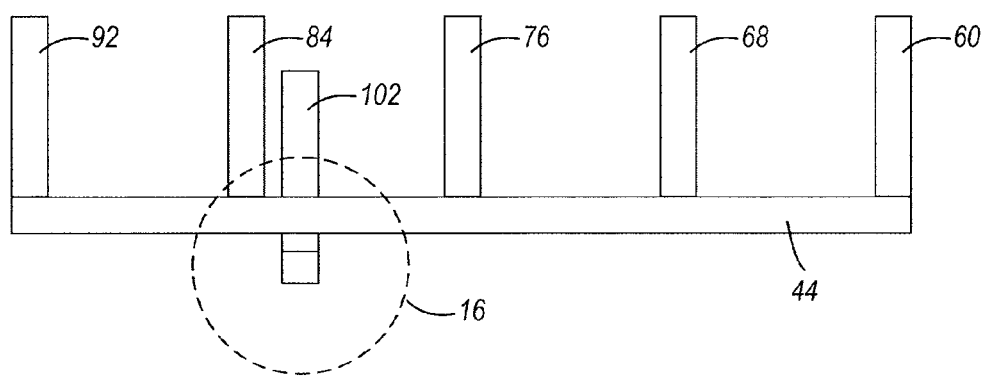
FIG. 20 is a diagram of a side view of the trailer shown in FIG. 19.

In addition, when the axle 96 in the collapsed position shown in FIGS. 19-20, the center portions 100, 102 may be folded together in a generally upright orientation. When folded in a generally upright orientation, the center portions 100, 102 may be folded upwardly as shown in 19-20, downwardly, or in other suitable directions.

Preferably, when the trailer 10 is in the use or extended position, the portions of the axle 96 are generally aligned. In particular, if the axle 96 includes four portions 98, 100, 102, 104, then these portions are preferably generally aligned along an axis. Advantageously, this may help create a strong and rigid axle 96 for the trailer 10. The portions of the axle 96, however, do not have to be aligned in a straight line and one or more portions of the axle may be disposed at an angle when the trailer 10 is in the collapsed position. For example, the center portions 100, 102 may be slightly angled rearwardly to facilitate moving the center portions of the axle rearwardly. For instance, the center portions 100, 102 may be angled rearwardly between about one and about five degrees to facilitate folding of the trailer 10. On the other hand, the center portions 100, 102 may be angled forwardly, such as between about one and about five degrees, to help prevent the axle 96 from inadvertently moving rearwardly.

While the axle 96 is shown in the accompanying figures as having four sections or portions that are pivotally connected, it will be appreciated that the axle could have any suitable number of sections. Additionally, it will be appreciated that the axle 96 could other suitable shapes, sizes, arrangements and configurations depending, for example, upon the specific configuration of the trailer 10 or intended use of the trailer.

Figure 7:
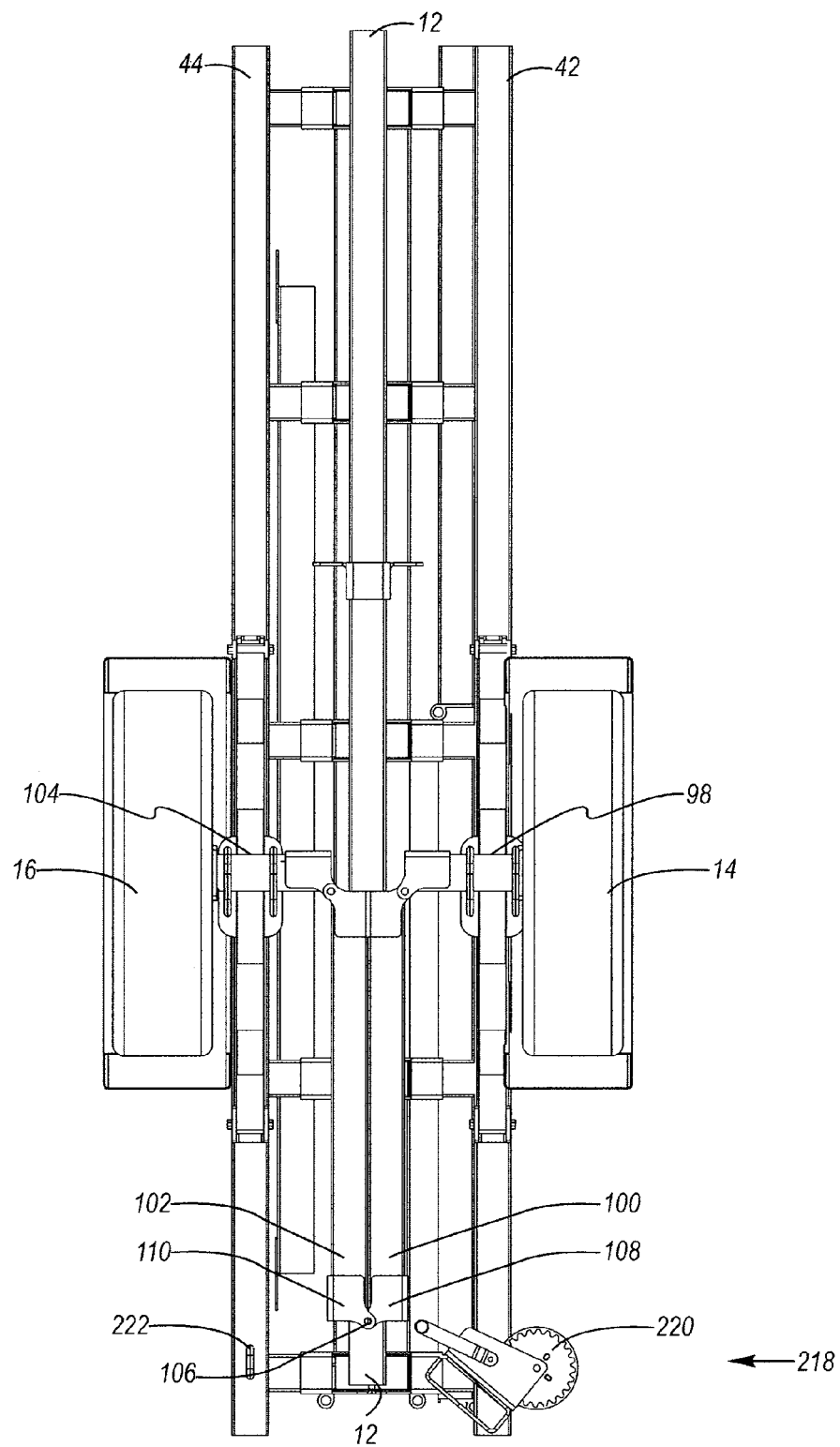
FIG. 7 is a bottom view of a portion of the trailer shown in FIG. 6.
Figure 8:
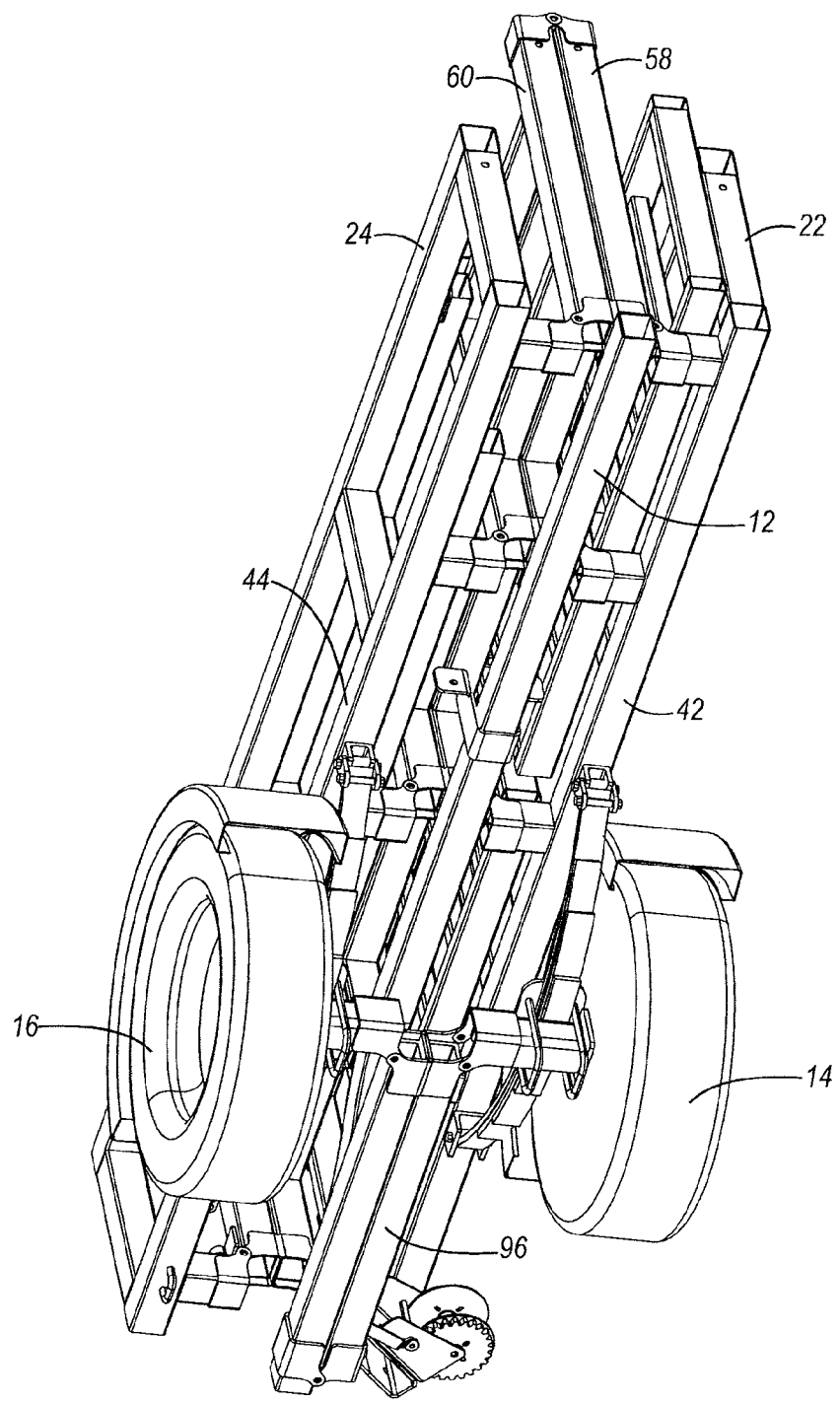
FIG. 8 is a bottom perspective view of the portion of the trailer shown in FIG. 7.
Figure 9:
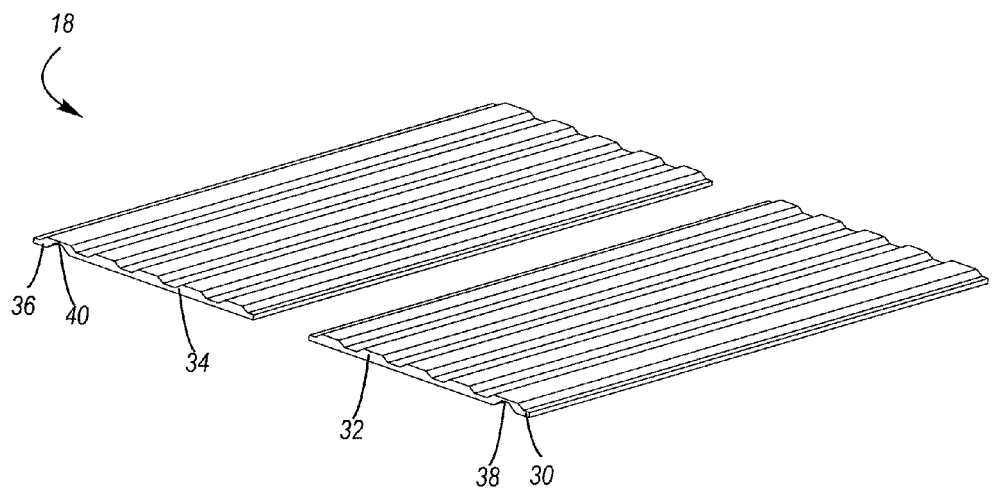
FIG. 9 is a perspective view of an exemplary bed that may be used in connection with the trailer shown in FIG. 1.
Figure 10:
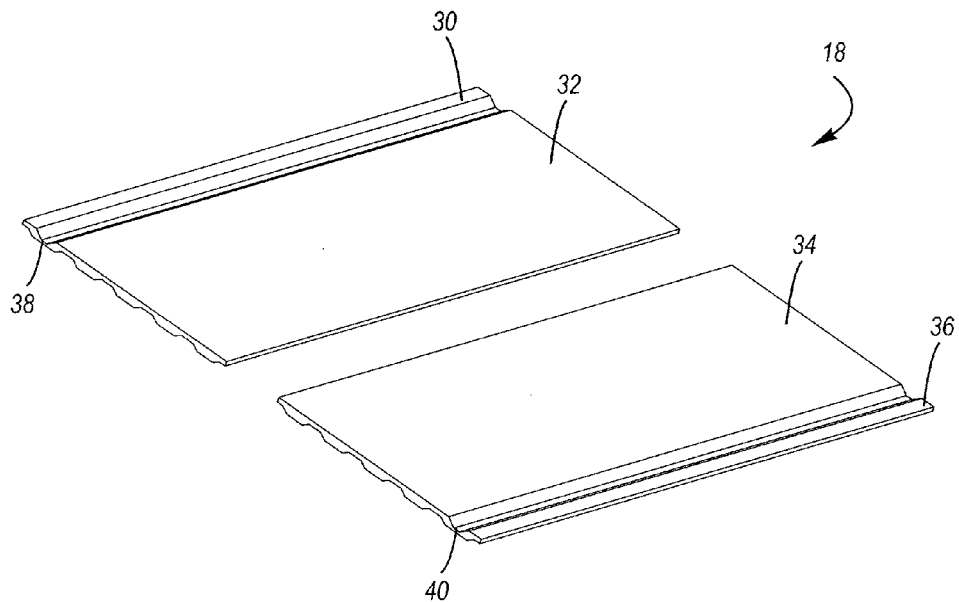
FIG. 10 is a bottom view of the bed shown in FIG. 9.
Figure 11:
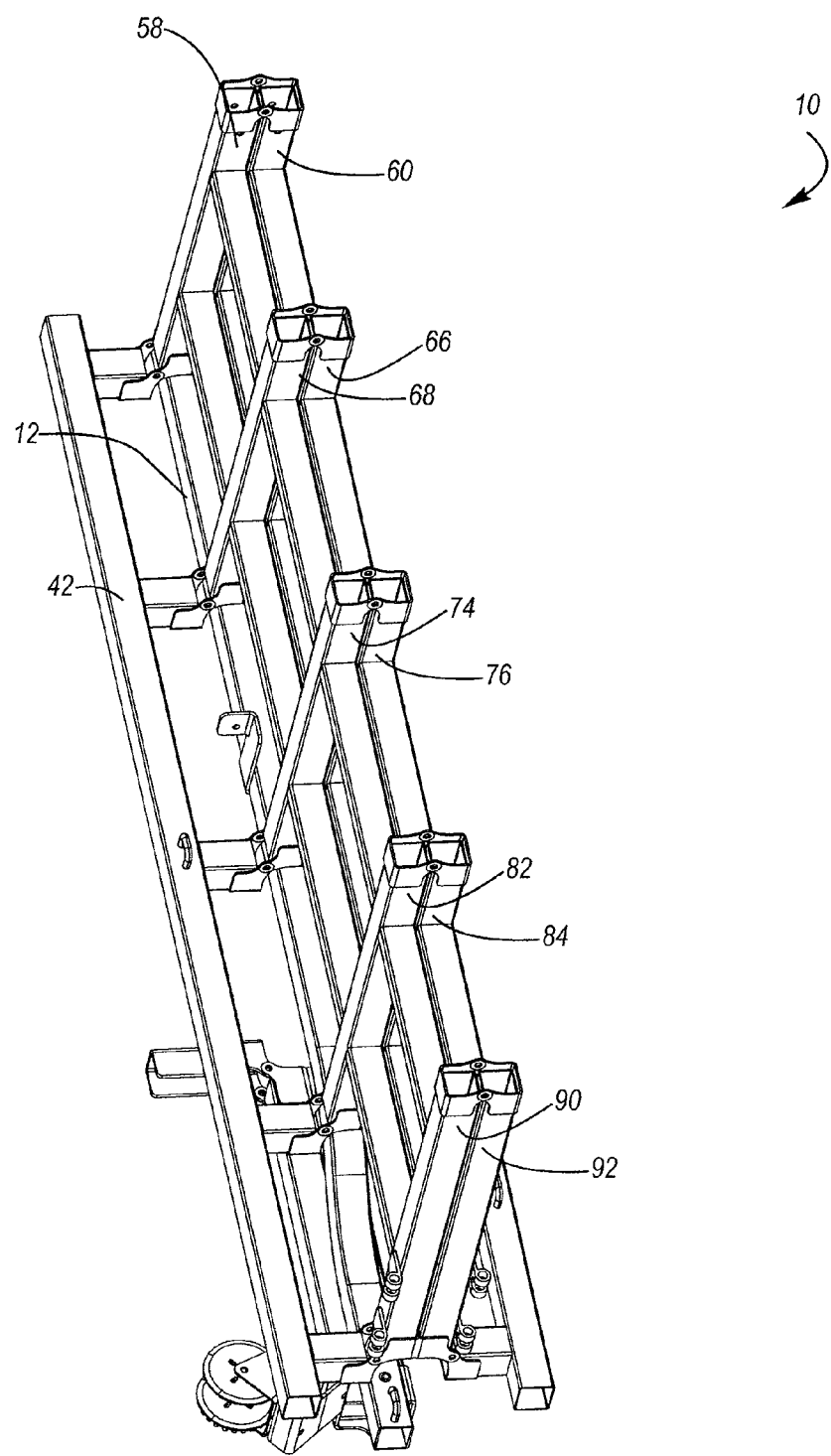
FIG. 11 is a perspective view of a portion of the trailer shown in FIG. 1, illustrating the frame in a collapsed position.
Figure 12:
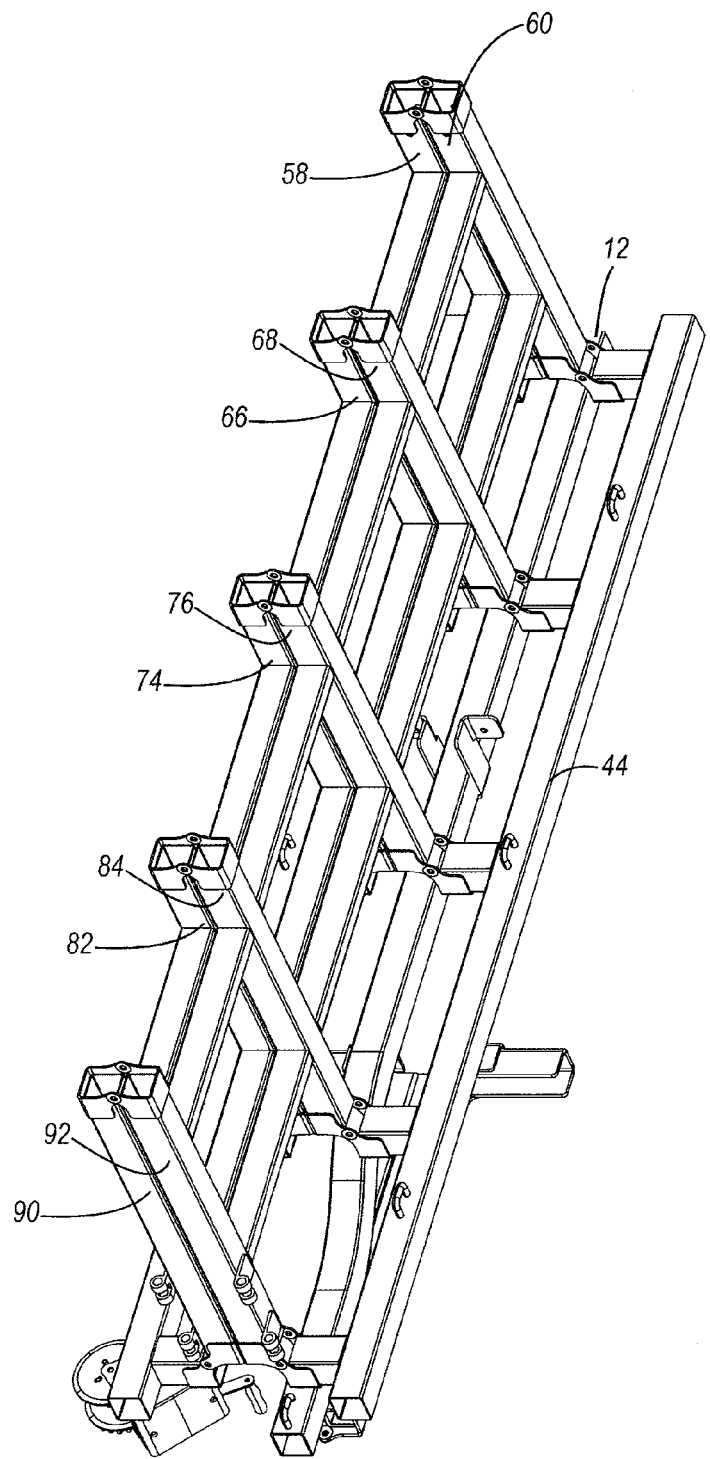
FIG. 12 is another perspective view of the portion of the trailer shown in FIG. 11.
Figure 13:
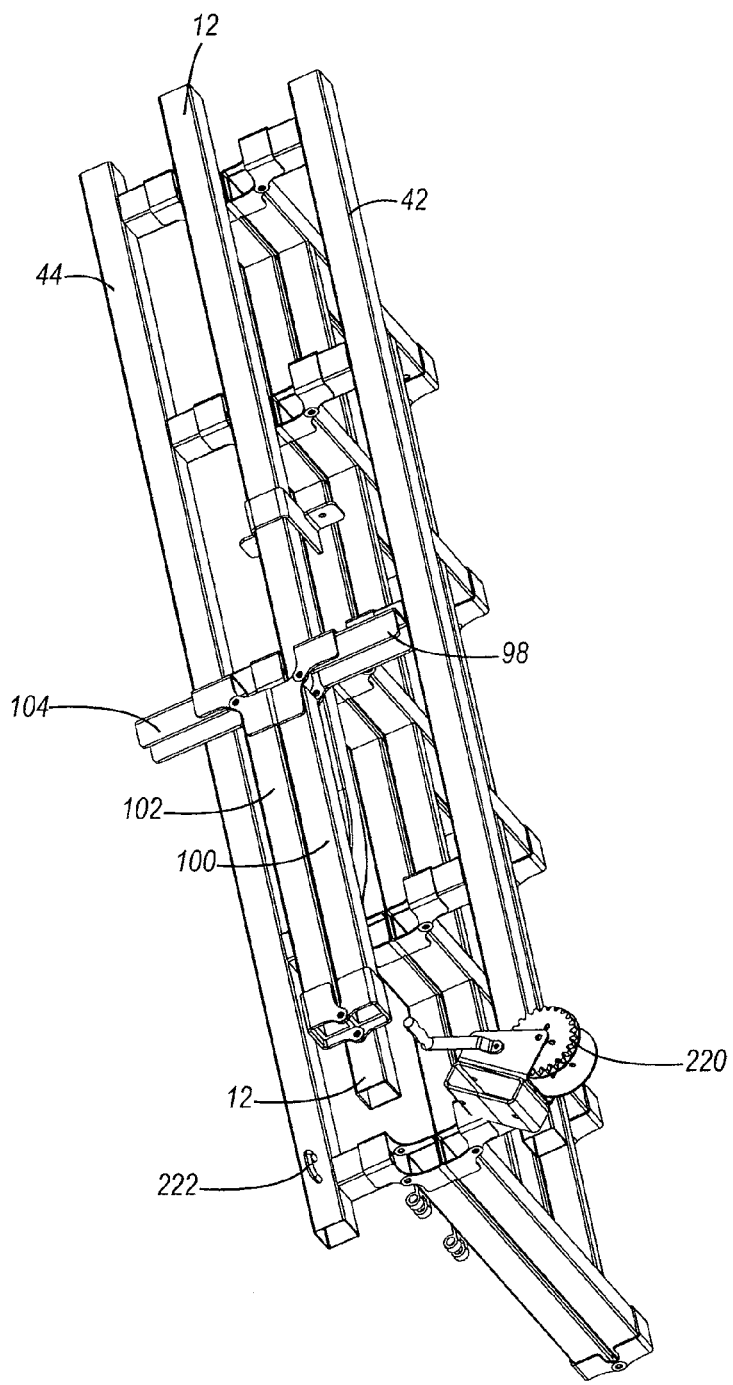
FIG. 13 is a bottom perspective view of the portion of the trailer shown in FIG. 11.
Figure 14:
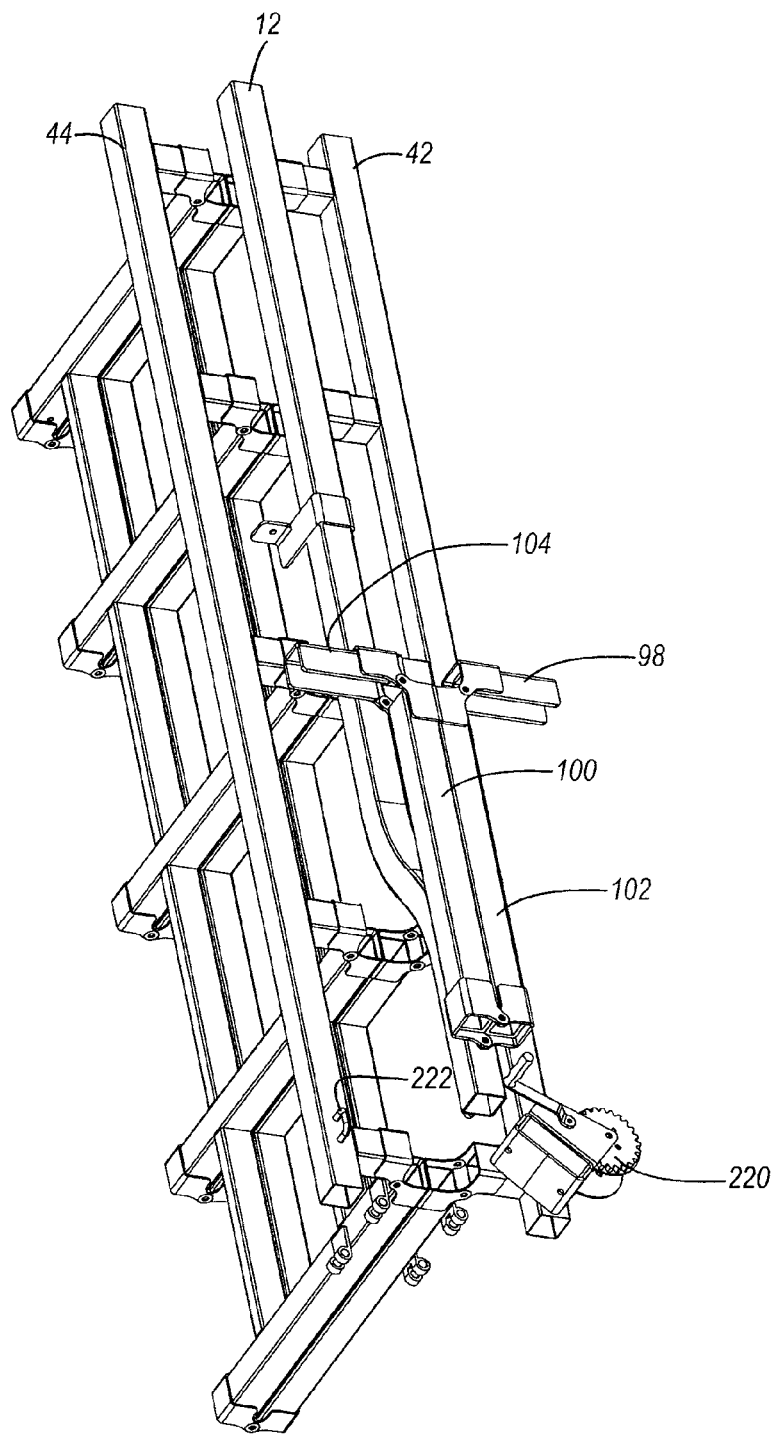
FIG. 14 is another bottom perspective view of the portion of the trailer shown in FIG. 11.

As shown in FIGS. 3-4, the arm 12 may be connected to a portion of the axle 96, such as the center portion 100 and/or the center portion 102. Advantageously, if the center portions 100, 102 are folded rearwardly and the arm 12 is connected to the center portions, then the arm may also move rearwardly. Significantly, this may create a more compact trailer 10 that is easier to store when the trailer 10 is in the collapsed position. As shown in FIGS. 4 and 7, the center portions 100, 102 and the arm 12 may be pivotally or movably interconnected using, for example, a suitable fastener or pivot pin 106; one or more brackets or connectors 108, 110; and/or other suitable means.

The brackets or connectors 108, 110 may help maintain the axle 96 in the desired position when the trailer 10 is in the extended or use position. For example, the brackets 108, 110 may help maintain the axle 96 in a generally aligned configuration. In addition, the brackets 108, 110 may help prevent the axle 96 from moving forwardly, upwardly and/or downwardly when the trailer 10 is in the use position. In particular, the brackets 108, 110 may include upper, lower and/or rear portions that contact corresponding upper, lower and/or rear portions of the center portions 100, 102 of the axle 96 to maintain the axle in the desired positions. Thus, the brackets 108, 110 may be sized and configured to maintain at least a portion of the axle 96 in the desired position when the trailer 10 is in the use position, and the brackets may allow the trailer to be quickly and easily moved in to the collapsed position.

In addition the brackets 108, 110 may help position the center portions 100, 102 of the axle 96 at a slight angle when the trailer 10 is in the use position. For example, as mentioned above, the brackets 108, 100 may position the center portions 100, 102 of the axle 96 at a slight rearward angle, such as less than about five or ten degrees, so that when the trailer 10 is moved from the use position to the collapsed position, the axle may quickly and easily move rearwardly. However, the brackets 108, 100 may position the center portions 100, 102 of the axle 96 at a slight forward angle, such as less than about five or ten degrees, to help prevent the axle from unintentionally moving rearwardly. It will be appreciated that the brackets 108, 100 could have other suitable configurations depending, for example, upon the size and configuration of the axle 96 and/or trailer 10.

As shown in FIG. 4, the frame 20 may also include one or more connecting members 112, which may be connected to the supports 46, 48, 50, 52, and 54. The connecting members 112 may advantageously help reinforce, strengthen and maintain the frame 20 and/or the supports 46, 48, 50, 52, 54 in the desired positions. In addition, the connecting members 112 may help the supports 46, 48, 50, 52 move collectively between the use and storage positions. It will be appreciated, however, that the frame 20 does not require connecting members 112 and that the supports may move independently between the use and storage positions, if desired.

As shown in FIGS. 1-4 and 15, the wheels 14, 16 may be spaced apart at a first distance when the trailer 10 is in the use position, and the wheels may be spaced apart at a second, smaller distance when the trailer is in the storage position as shown in FIGS. 5-8, 17, 19, 21. In particular, the wheels 14, 16 may move generally towards each other as the trailer is collapsed and may move generally away from each other as the trailer is extended. Advantageously, when the trailer 10 is in the collapsed or storage position, the wheels 14, 16 may be positioned for use, which may help in moving the collapsed trailer. Because the wheels 14, 16 may move along the same axis between the use and storage positions, this may allow the trailer 10 to be moved on its wheels in the use position, storage position and intermediate positions, if desired.

In greater detail, when the trailer 10 is in the use position, the wheels 14, 16 are preferably spaced apart approximately the length of the axle 96. Thus, if the axle 96 has a length of about five feet in the extended position, then the wheels 14, 16 are preferably spaced apart about the same distance. On the other hand, when the trailer 10 is in the collapsed position, then the wheels 14, 16 are preferably aligned in the same direction and in a generally parallel configuration as when the trailer is in the use position, but the wheels are spaced much closer together. For example, the wheels 14, 16 may be spaced apart generally equal to or less than one-half, one-quarter or one-eighth the overall length of the axle 96 when the trailer 10 is in the storage position.

When the trailer 10 is in the storage position, the ends 98, 104 of the axles 96 connected to the wheels 14, 16 may be disposed proximate or adjacent to each other. Further, as discussed above, the center portions 100, 102 of the axle 96 may be disposed proximate or adjacent to each other. In addition, because the center portions 100, 102 of the axle 96 preferably move rearwardly, the arm 12 may also be drawn rearwardly and at least a portion of the arm may be disposed between the center portions of the axle The arm 12 may also be at least partially disposed between the ends 98, 104 of the axle 96 and the wheels 14, 16 when the trailer 10 is in the collapsed position. Thus, the axle 96 and the arm 12 may move rearwardly while the wheels 14, 16 are moved towards each other when the trailer 10 is moved into the storage position. Additionally, the various portions of the axle 96 and the arm 12 preferably remain in generally the same plane when the trailer 10 is in the collapsed and extended positions.

As discussed above, portions of the bed 18 and frame 20 are preferably disposed in different planes when the trailer 10 is in the collapsed end use positions. For example, the bed 18 and frame 20 are preferably aligned in a generally horizontal plane when the trailer 10 is in the use position. However, when the trailer 10 is in the collapsed position, at least the center portions of the bed 18 and the frame 20 are disposed in an upright or vertical configuration. In particular, the center portions of the bed 18 and the frame 20 may be disposed in a generally upright configuration and in generally aligned planes. Therefore, when the trailer 10 is in the use position, the arm 12, bed 18 frame 20 and the axle 96 may be disposed in generally parallel, horizontal planes. When the trailer 10 is in the collapsed position, the arm 12 and axle 96 preferably move in one direction and remain in generally the same horizontal plane while the center portions of the bed 18 and frame 20 move in a different direction and into different planes. Advantageously, this may help create a trailer 10 with increased rigidity and strength. It may also create a more compact trailer 10 in the collapsed position.

The trailer 10 is preferably constructed from relatively strong and durable materials. For example, the frame 20, barriers 22, 24, 26, 28, axle 96 and other portions of the trailer 10 may be constructed from metal (such as steel) or other relatively strong and durable materials. It will be appreciated that the trailer 10 and any portions thereof may be constructed from other suitable materials.

Advantageously, the trailer may have a variety of suitable arrangements and configurations. For example, as shown in FIGS. 25-49, another exemplary trailer 114 may include parts, features and aspects similar to that described above. The trailer 114 may also have a size, shape, configuration and arrangement similar to that described above. The trailer 114, however, could also have different parts, features, aspects, sizes, shapes, configurations and arrangements depending, for example, upon the intended use of the trailer.

As shown in FIGS. 25-30, the trailer 114 may include a bed 116 with two or more components that may have interlocking and/or overlapping portions. For example, the bed 116 may include a pair of corrugated portions 118, 120 that may interlock and/or overlap to help construct the bed. The corrugated portions 118, 120 preferably interlock and/or overlap when the bed 116 is in the use position, and the corrugated portions are preferably spaced apart when the bed is in the storage position. The corrugated portions 118, 120 are desirably formed of steel sheet metal and/or other suitable materials. Advantageously, the corrugated portions 118, 120 may help disperse impacts and forces applied to the bed 116. Further, the overlapping and/or interlocking portions 118, 120 may help reinforce each other. It will be appreciated, that the bed 116 may include any suitable number of portions which interlock and/or overlap. It will also be appreciated that the bed 116 may consist of a single, unitary structure and the portions, if any, need not be corrugated, interlock or overlap. If desired, the upper surface of the bed 116 may be treated with a rubberized surface finish, which may reduce slippage and may reduce damage from impact when compared to other materials and finishes.

Figure 31:
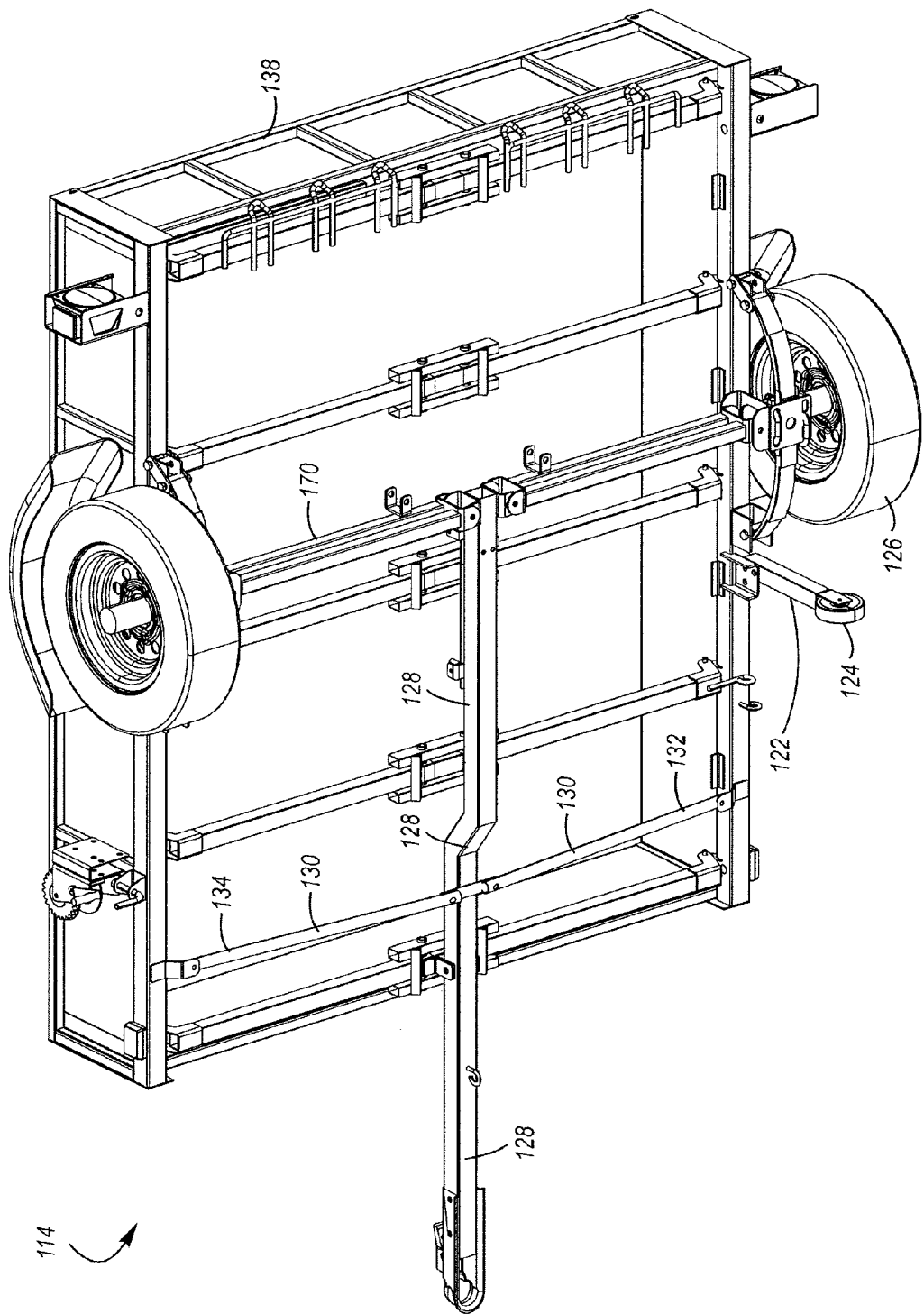
FIG. 31 is a bottom perspective view of a portion of the trailer shown in FIG. 25.

As shown in FIG. 31, the trailer 114 may include a wheel assembly 122 that includes at least one wheel 124. The wheel assembly 122 may be sized and configured to help move the trailer 114 between the use position and the storage position. In particular, the wheel assembly 122 may be sized and configured to pivot or move between a first position in which the wheel 124 engages a support surface and a second position in which the wheel is spaced apart from the support surface. When the wheel 124 of the wheel assembly 122 engages the support surface, the trailer 114 may be more easily moved between the use position and the storage position. For example, when the wheel 124 of the wheel assembly 122 engages the support surface, the wheel 126 of the trailer 114 is preferably spaced apart from the support surface to allow the trailer to more readily moved between the use and storage positions.

In greater detail, when the wheel assembly 122 is in the first position, the wheel 124 preferably supports at least a portion of the load on the trailer wheel 126. Thus, when the trailer 114 is moved from the use to the collapsed position, the trailer wheel 126 can be more easily moved relative to the support surface. It will be appreciated that the wheel assembly 122 could have a variety of suitable arrangements, configurations and components depending, for example, upon the intended use of the trailer 114.

The wheel assembly 122 may be lockable and unlockable in the first and second positions. For example, the trailer may include a locking hinge, locking pin or other structure to lock the wheel assembly 122 in a desired position. Exemplary locking hinges which may be used in connection with the wheel assembly 122 are disclosed in U.S. patent application Ser. No. 10/843,037, filed May 10, 2004 and entitled PORTABLE FOLDING TABLE WITH LOCKING HINGE, the disclosure of which is incorporated by reference.

Figure 39:
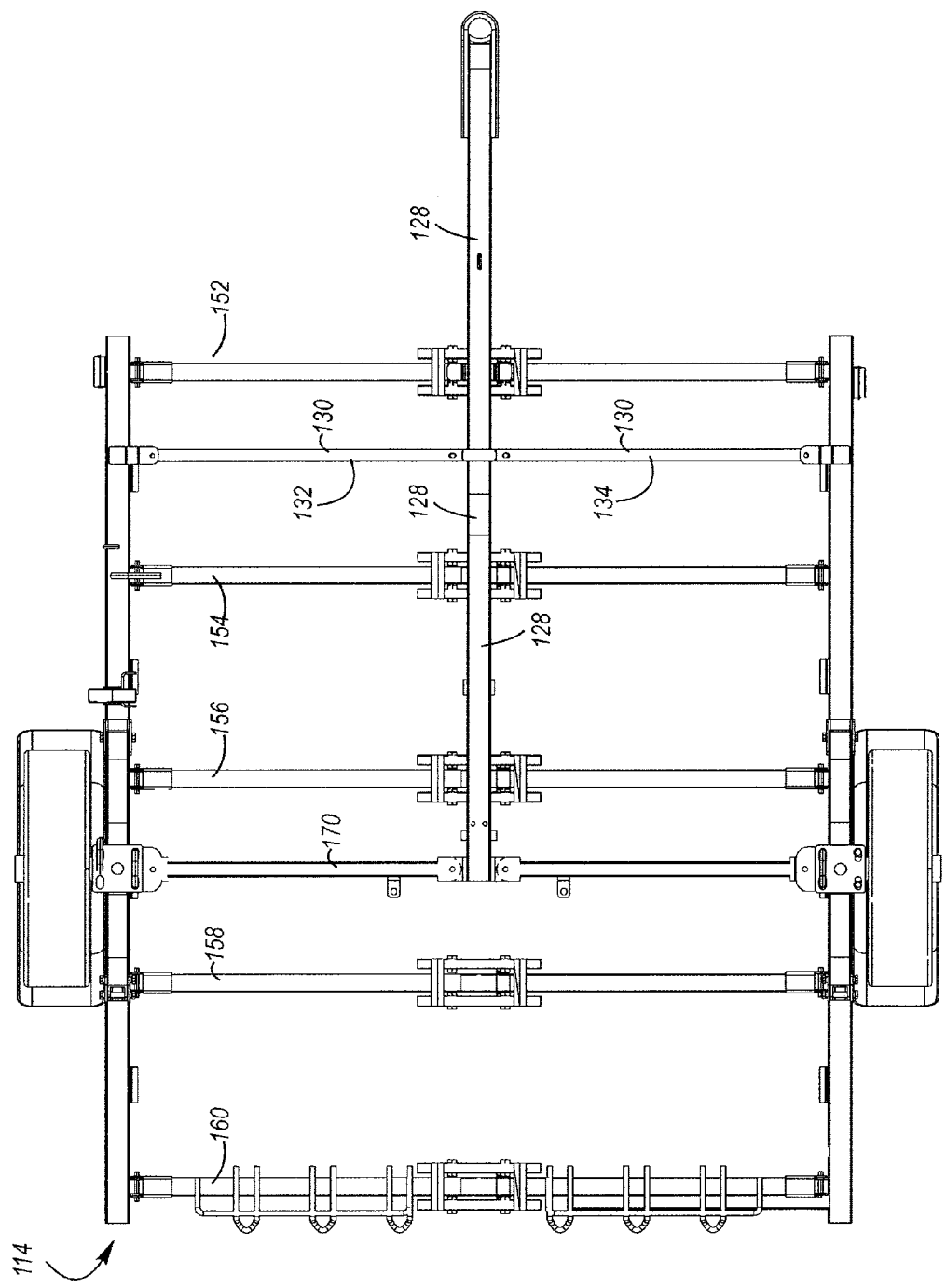
FIG. 39 is a bottom view of a portion of the trailer shown in FIG. 25.

As shown in FIGS. 31-32, 37-39 and 41-44, the trailer 114 may include an arm 128 that is sized and configured to move between an extended or use position and a collapsed or storage position. As discussed below, the arm 128 preferably moves between the use and storage positions when the trailer 114 moves between the use and storage positions. The trailer 114 may also include a support assembly 130 that supports the arm 128 and facilitates movement of the arm between the extended and collapsed positions. As shown in FIGS. 31 and 39, the support assembly 130 may include a first support member 132 and a second support member 134. Each of the support members 132, 134 may include a first portion that is pivotally or otherwise movably connected to the trailer 114 and a second portion that is pivotally or otherwise movably connected to the arm 128. It will be appreciated that the support assembly 130 may include a variety of the suitable components arranged in various suitable configurations.

Figure 25:
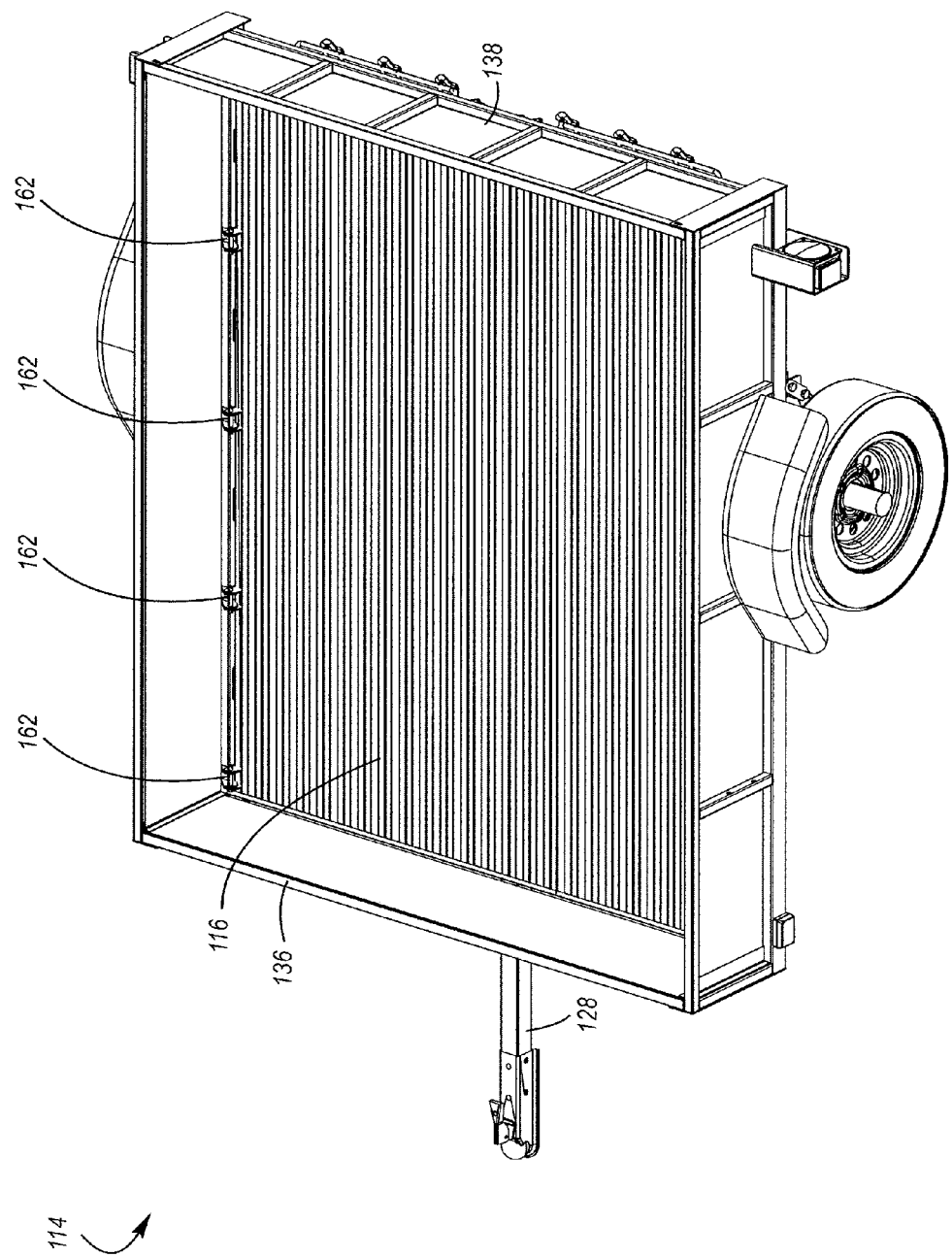
FIG. 25 is a perspective view of another exemplary trailer, illustrating the trailer in an extended or use position.
Figure 26:
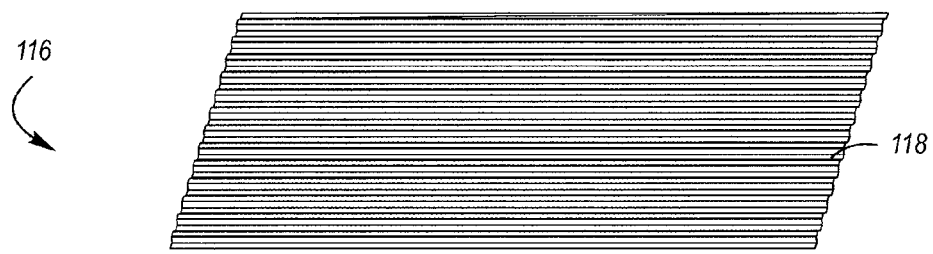
FIG. 26 is a perspective view of another exemplary bed that may be used in connection with the trailer.
Figure 27:
FIG. 27 is a front view of the bed shown in FIG. 26.
Figure 28:
FIG. 28 is an enlarged front view of a portion of the bed shown in FIG. 27, illustrating exemplary components of the bed overlapping.
Figure 29:
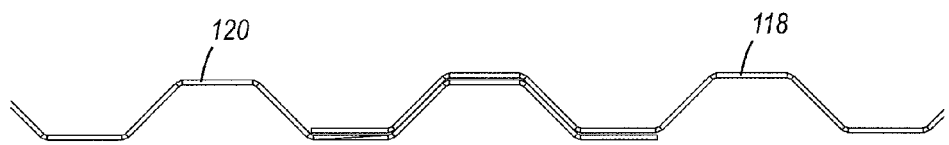
FIG. 29 is a front view of the bed shown in FIG. 26, illustrating exemplary components of the bed being spaced apart.
Figure 30:
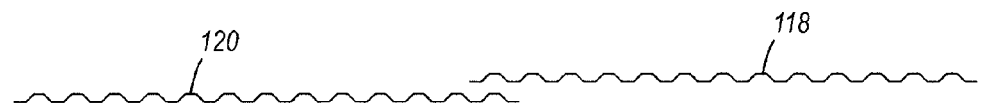
FIG. 30 is an enlarged front view of the portion of the bed shown in FIG. 29.
Figure 32:
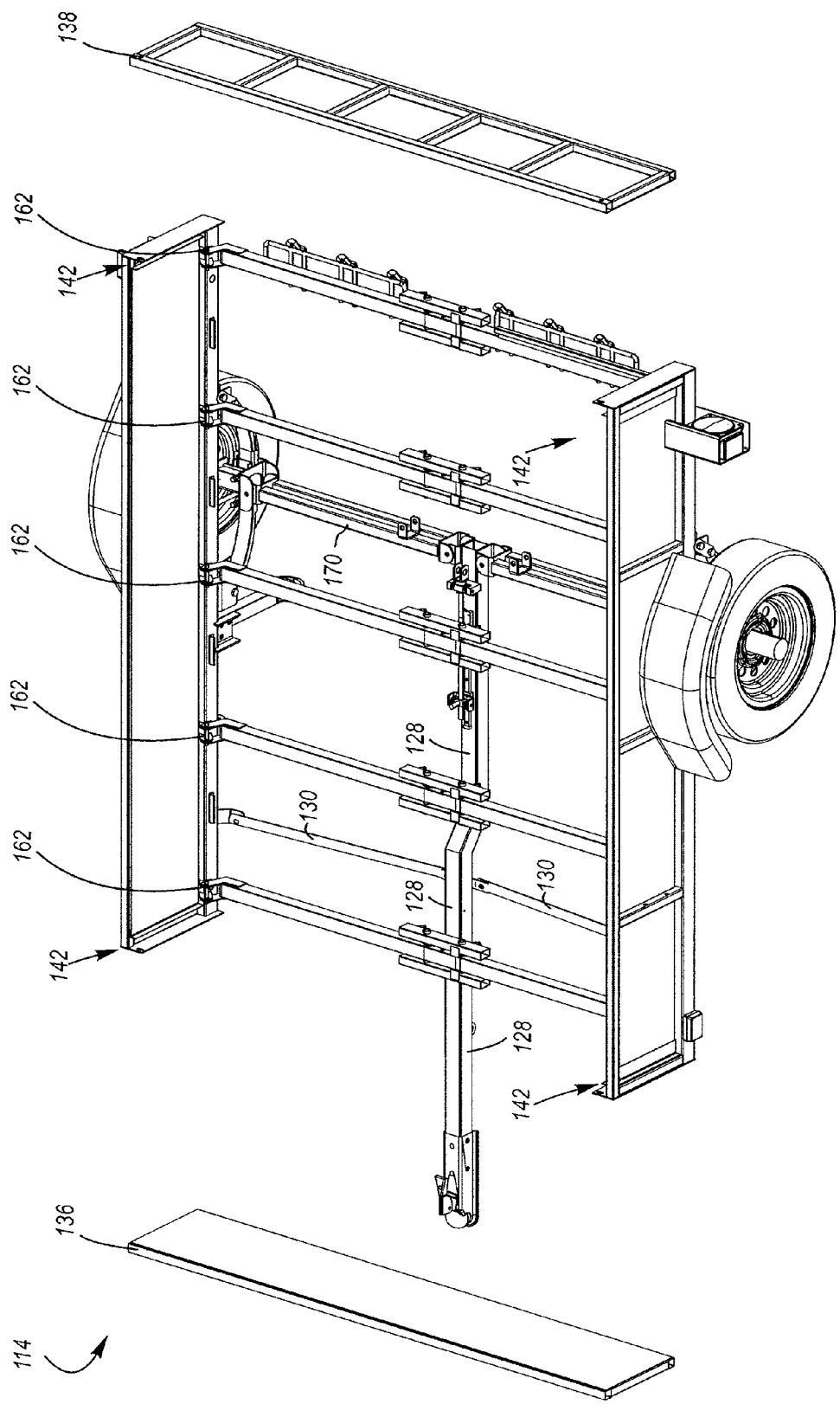
FIG. 32 is a top, partially exploded view of a portion of the trailer shown in FIG. 25.

As shown in FIGS. 25 and 31-32, the trailer 114 may include a front barrier 136 and a rear barrier 138 that are selectively attached to the trailer. Advantageously, the front and rear barriers 136, 138 may be used as a ramp to facilitate loading and/or unloading of the trailer. For instance one end of the front barrier 136 and one end of the rear barrier 138 may be attached to the rear portion of the trailer 114 and the other ends of the barriers may rest upon the support surface. This may allow objects to be wheeled or carried into and out of the trailer 114. After using the front and rear barriers 136, 138 as a ramp, the front and rear barriers may be selectively reattached to the front and rear of the trailer 10, which may help reinforce and/or strengthen the side barriers of the trailer. Advantageously, the front and rear barriers 136, 138 may be interchangeable, which may make the trailer easier to manufacture, assemble and use.

Figure 34:
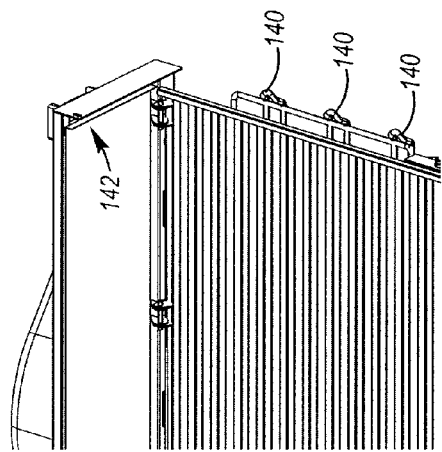
FIG. 34 is an enlarged perspective view of another portion of the trailer shown in FIG. 25.
Figure 36:
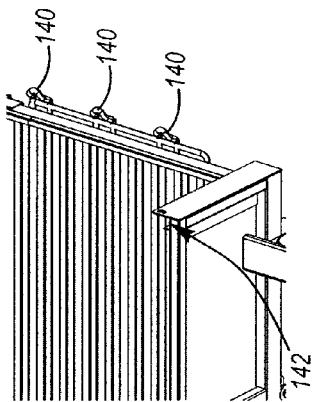
FIG. 36 is an enlarged perspective view of still another portion of the trailer shown in FIG. 25.
Figure 33:
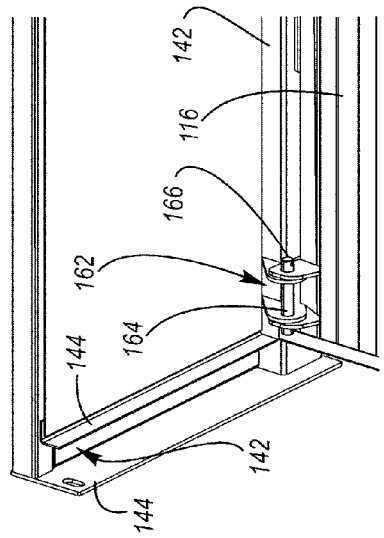
FIG. 33 is an enlarged perspective view of a portion of the trailer shown in FIG. 32.
Figure 35:
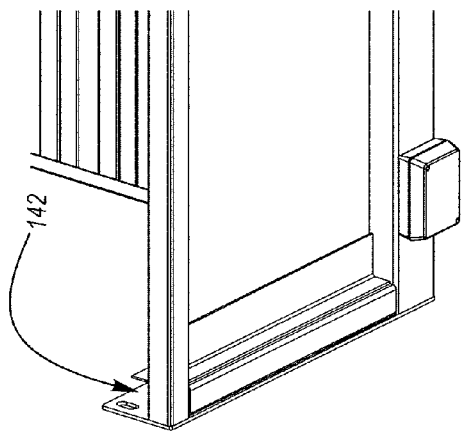
FIG. 35 is an enlarged perspective view of yet another portion of the trailer shown in FIG. 25.

As shown in FIGS. 34 and 36, the rear portion of the trailer 114 may include one or more attachment members 140 that are sized and configured to attach the barriers 136, 138 to the rear portion of the trailer for use as a ramp. In addition, as shown in FIGS. 32-36, the trailer 114 may include slots 142 that are sized and configured to receive a portion of either of the barriers 136, 138 to connect the barriers to the trailer in a generally upright position as shown in FIG. 25. The slots 142 may be sized and configured to connect the barriers 136, 138 to the trailer using a snap fit, a friction fit and/or an interference fit. As best seen in FIG. 33, the slots 142 may be formed by a pair of flanges 144 or other suitable structures.

Figure 37:
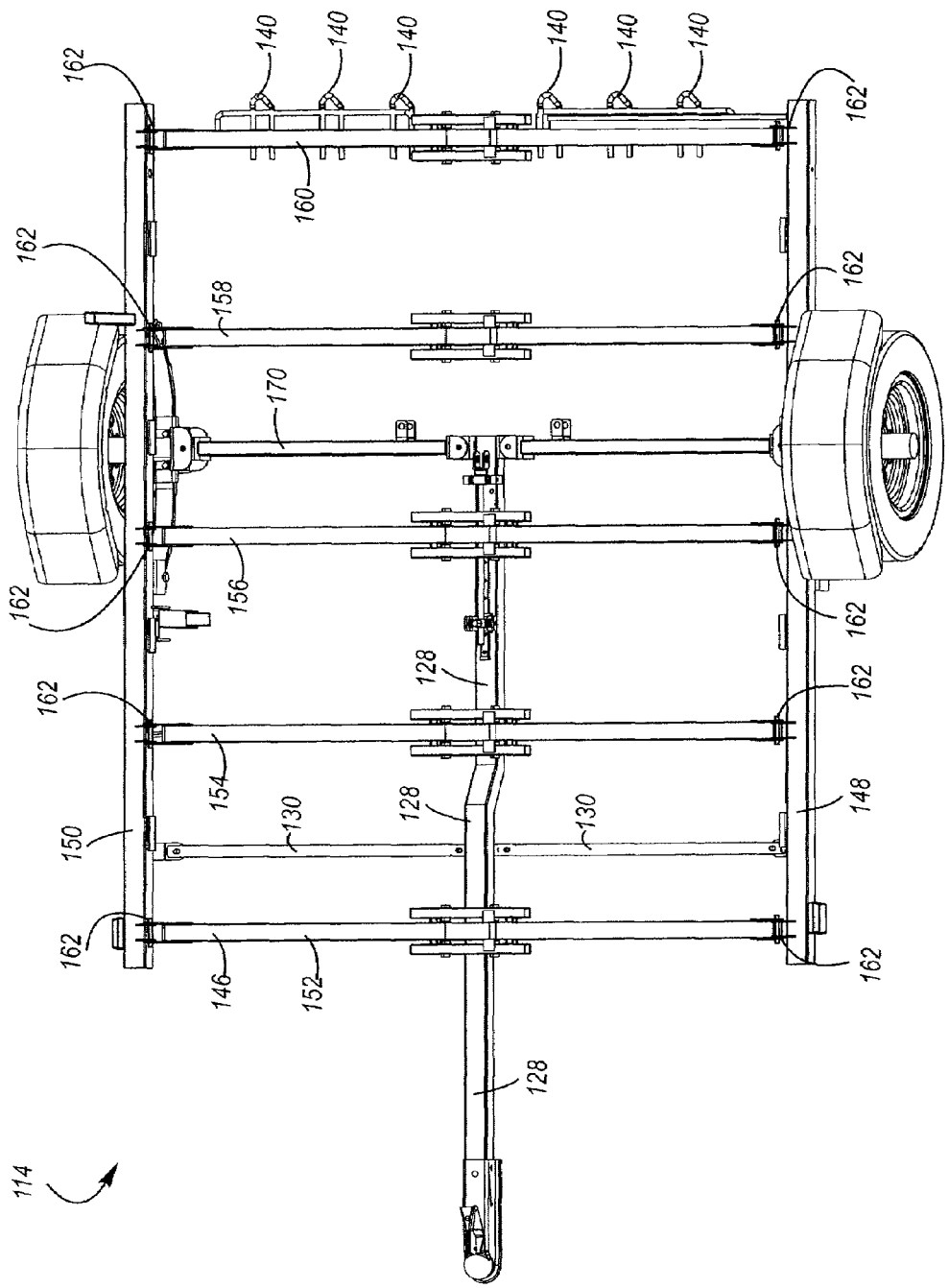
FIG. 37 is a top perspective view of a portion of the trailer shown in FIG. 25.
Figure 38:
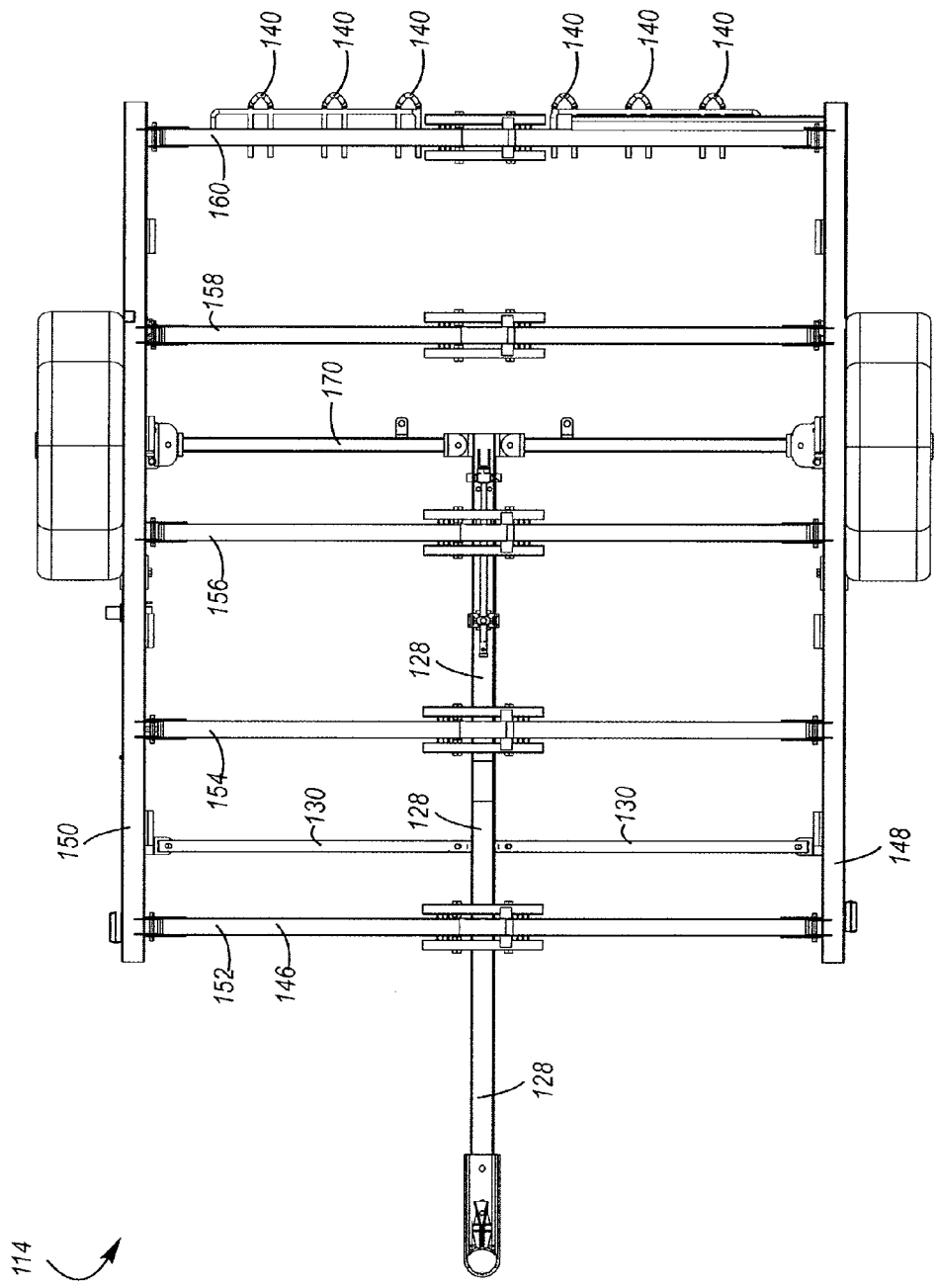
FIG. 38 is a top view of a portion of the trailer shown in FIG. 25.

As shown in FIG. 37, the trailer 114 may include a frame 146, which may be connected to the bed 116. The frame 146 may include one or more supports, such as elongated supports 148, 150, 152, 154, 156, 158, 160. The supports 148, 150 preferably extend longitudinally along the length of trailer 114 between the trailer's front and rear; and the supports 152, 154, 156, 158, 160 preferably extend laterally along the width of the trailer between the trailer's left and right sides. The supports 152, 154, 156, 158, 160 may extend between and interconnect the supports 148, 150; and the supports 152, 154, 156, 158, 160 may include a plurality of pivotally or otherwise movably interconnected components. For example, as shown in FIGS. 25, 32-33 and 37, the supports 152, 154, 156, 158, 160 may be connected to the supports 148, 150 using one or more hinges 162.

As best seen in FIGS. 25 and 33, a portion of the hinges 162 may be sized and configured to provide a tie-down 164 when, for example, the trailer 114 is in the extended or use position. The tie-down 164 may advantageously be used to "tie down" or otherwise secure items to the trailer 114 using ropes, chains, cables, elastic cords, and the like. In further detail, the hinges 162 may include a pivot pin 166. As shown in FIG. 33, the pivot pin 166 may be spaced apart from the bed 116 and/or the frame 146, which may facilitate the attachment of ropes, chains, cables, elastic cords, and the like to the pivot pin. Because the hinges 162 may be used to provide tie-downs 164, the trailer 114 does not require any additional tie-downs, which may be time consuming to manufacture and/or may increase the cost of the trailer 114.

As shown in FIGS. 42-49, the trailer 114 may include an axle 170 that extends between and interconnect the wheels 14, 16. The axle 170 preferably includes pivotally or otherwise movably connected portions. In particular, the axle 170 may include four portions 172, 174, 176, 178. For example, the first portion 172 may be connected to a first wheel 180 and the fourth portion 178 may be connected to a second wheel 182. The second portion 174 may be pivotally or otherwise movably connected to the first portion 172 and the arm 128 using, for example, a suitable fastener or pivot pin; one or more brackets or connectors 184; and/or other suitable means. The third portion 176 may be pivotally or otherwise movably connected to the fourth portion 178 and the arm 128 using, for example, a suitable fastener or pivot pin; one or more brackets or connectors 184; and/or other suitable means.

Figure 48:
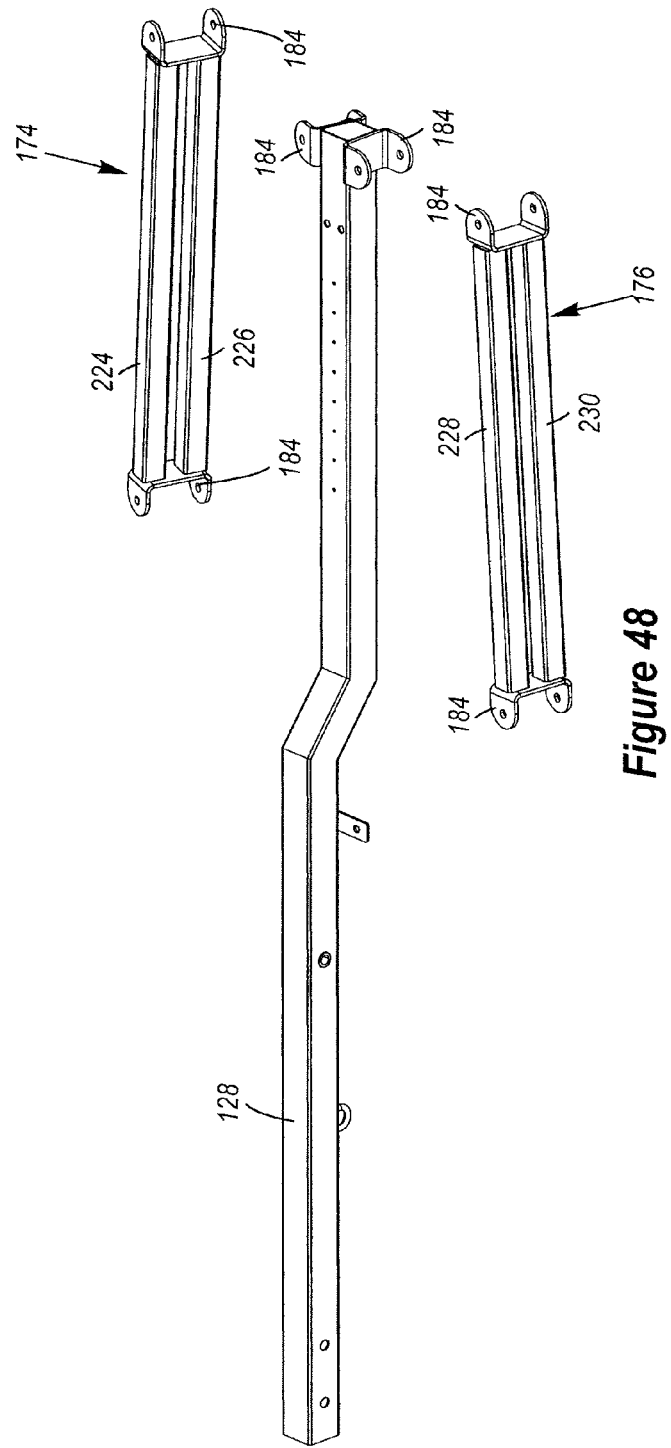
FIG. 48 is an exploded view of the portion of the trailer shown in FIG. 47.

It will be understood that the axle 170 may have a variety of different configurations and arrangements depending, for example, upon the intended use of the trailer 114. For example, as shown in FIG. 48, the center portions 174, 176 of the axle 170 may be constructed from elongated supports. Specifically, the center portion 174 may be constructed from elongated supports 224, 226; and the center portion 176 may be constructed from elongated supports 228, 230. The elongated supports may, for example, help prevent twisting or torque of the axle 170. The elongated supports may also increase the strength of the axle 170 and/or facilitate connection of the axle to the arm 128 and/or the wheels. It will be appreciated, however, that the center portions 174, 176 of the axle 170 may have a variety of others suitable components and configurations. In addition, it will be appreciated that the axle 170 may have other suitable components and configurations depending, for example, upon the intended use of the trailer 114.

Figure 40:
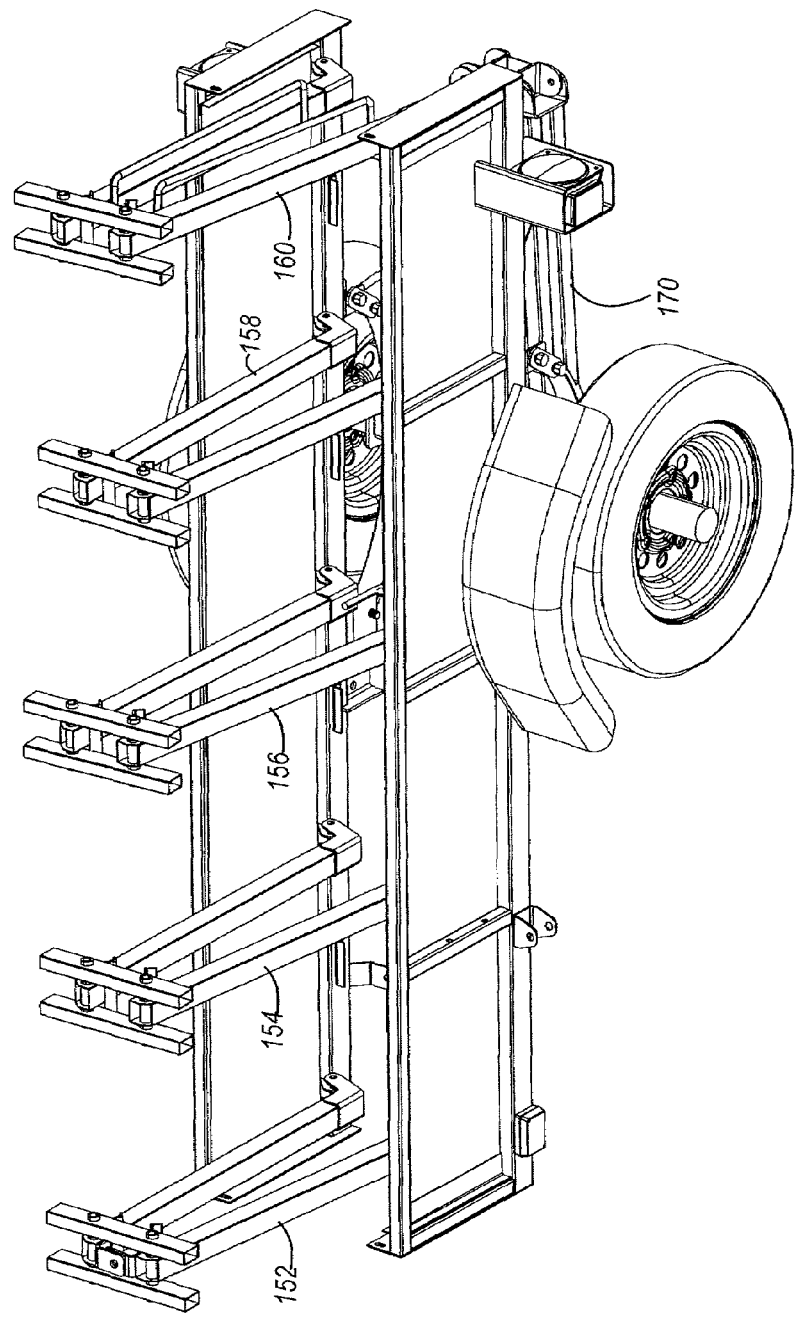
FIG. 40 is a perspective view of a portion of the trailer shown in FIG. 25, illustrating the trailer in an exemplary collapsed or storage position.
Figure 41:
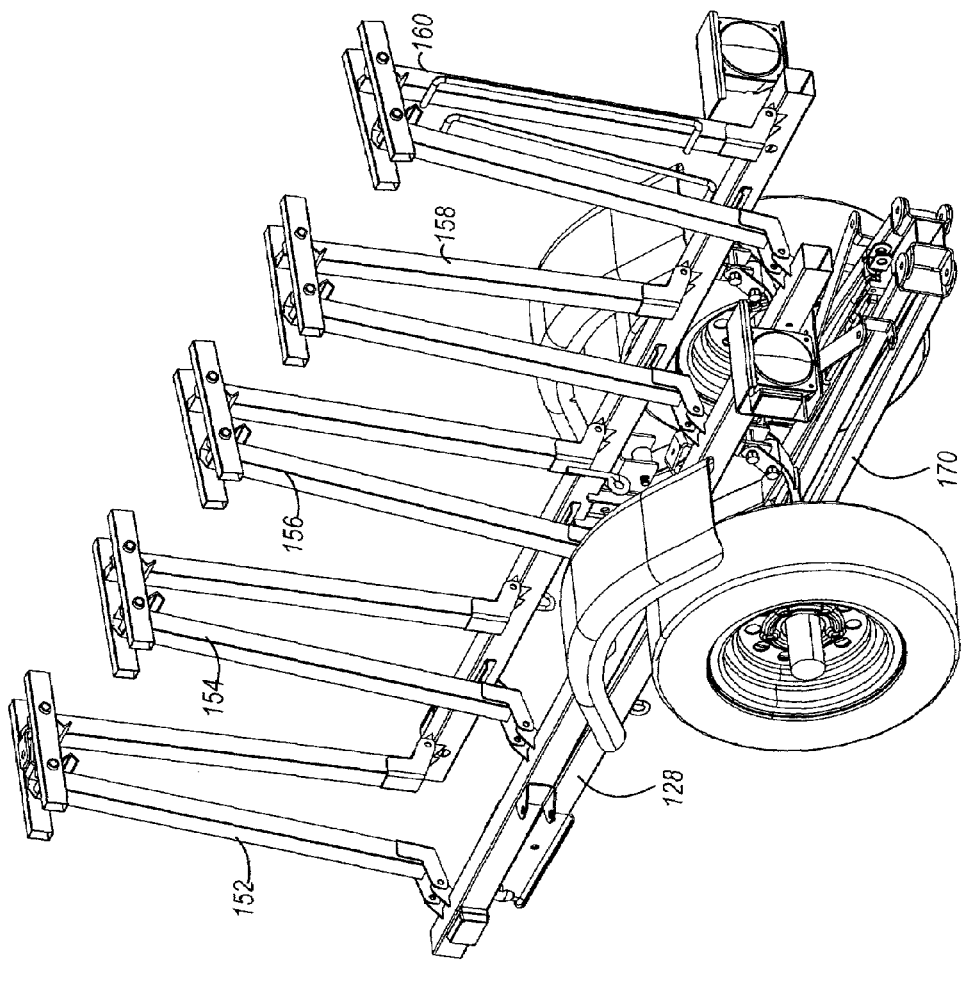
FIG. 41 is another perspective view of a portion of the trailer shown in FIG. 25, illustrating the trailer in an exemplary collapsed or storage position.
Figure 42:
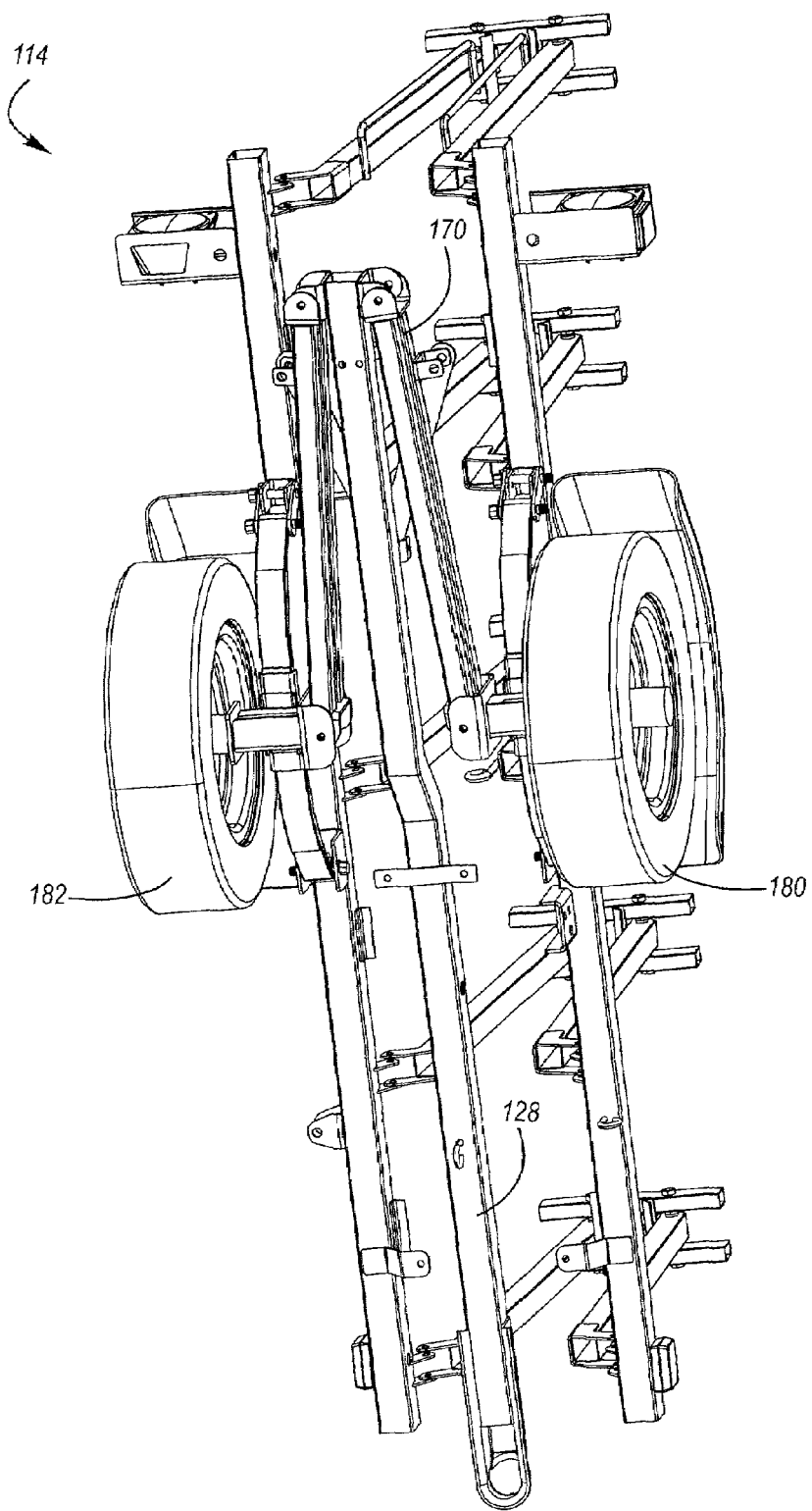
FIG. 42 is a bottom perspective view of a portion of the trailer shown in FIG. 25, illustrating the trailer in an exemplary collapsed or storage position.
Figure 46:
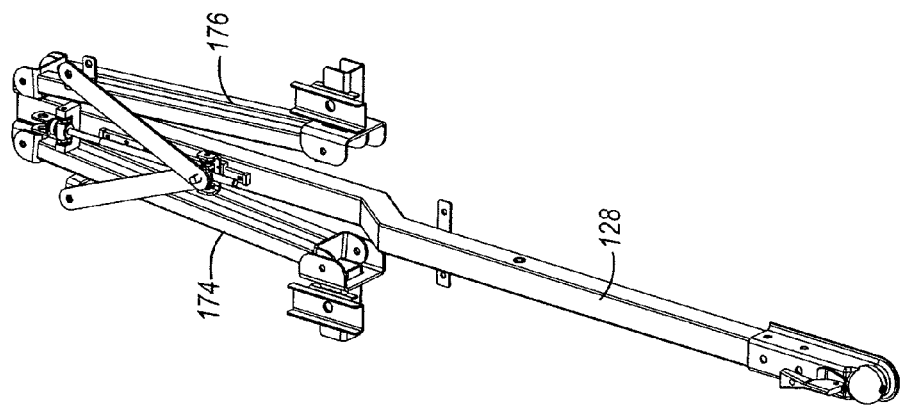
FIG. 46 is a top perspective view of the arm and axle shown in FIG. 43, illustrating the arm and axle in an exemplary collapsed position.
Figure 45:
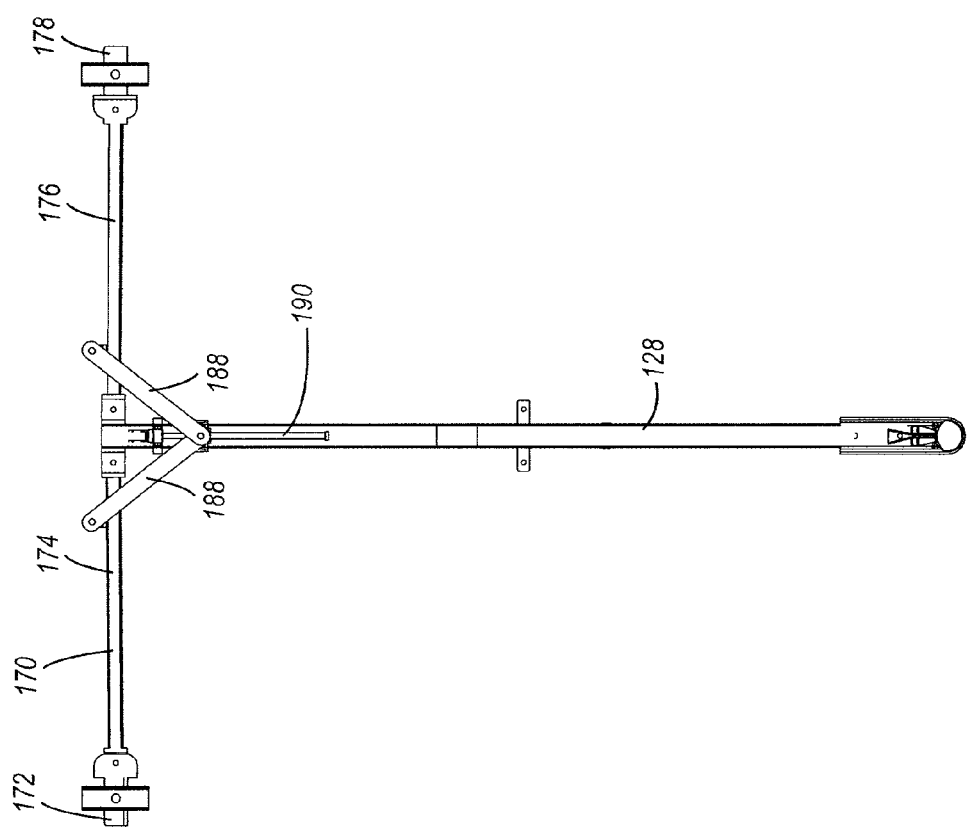
FIG. 45 is a top view of the arm and axle shown in FIG. 43.
Figure 47:
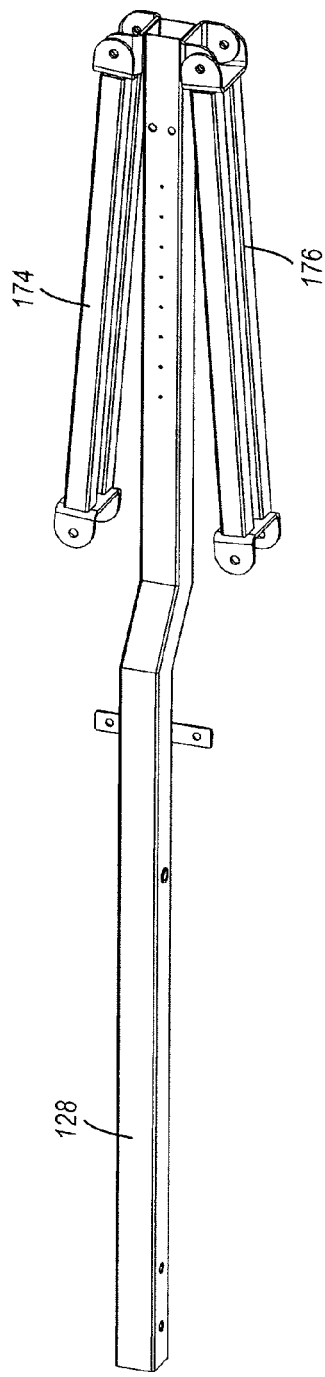
FIG. 47 is a perspective view of a portion of the trailer shown in FIG. 25, illustrating an exemplary arm and axle.

Advantageously, by including a plurality of pivotally or movably interconnected components, the axle 170 may move among a variety of positions to allow the trailer 114 to move between the use and storage positions. For example, as shown in FIGS. 31-32 and 37-39, the axle 170 may be positioned in a first or extended position when the trailer 114 is in the use position, as shown in FIG. 25, and in a second or collapsed position when the trailer is in the storage position as shown in FIGS. 40-42. As the trailer 114 is collapsed, the axle 170 may move towards the second position and away from the first position, and the axle may move towards the first position and away from the second position as the trailer is extended.

As shown in FIGS. 42-49, the arm 128 may be connected to a portion of the axle 170, such as the second portion 174 and/or the third portion 176. Advantageously, if the second and third portions 174, 176 are folded rearwardly and the arm 128 is connected to the second portion 174 or the third portion 178, then the arm may also move rearwardly. Significantly, this may create a more compact trailer 114, which may be easier to store. The second portion 174, the third portion 176 and the arm 128 may be pivotally or otherwise movably interconnected using, for example, a suitable fastener or pivot pin; one or more brackets or connectors 184; and/or other suitable means.

Figure 49:
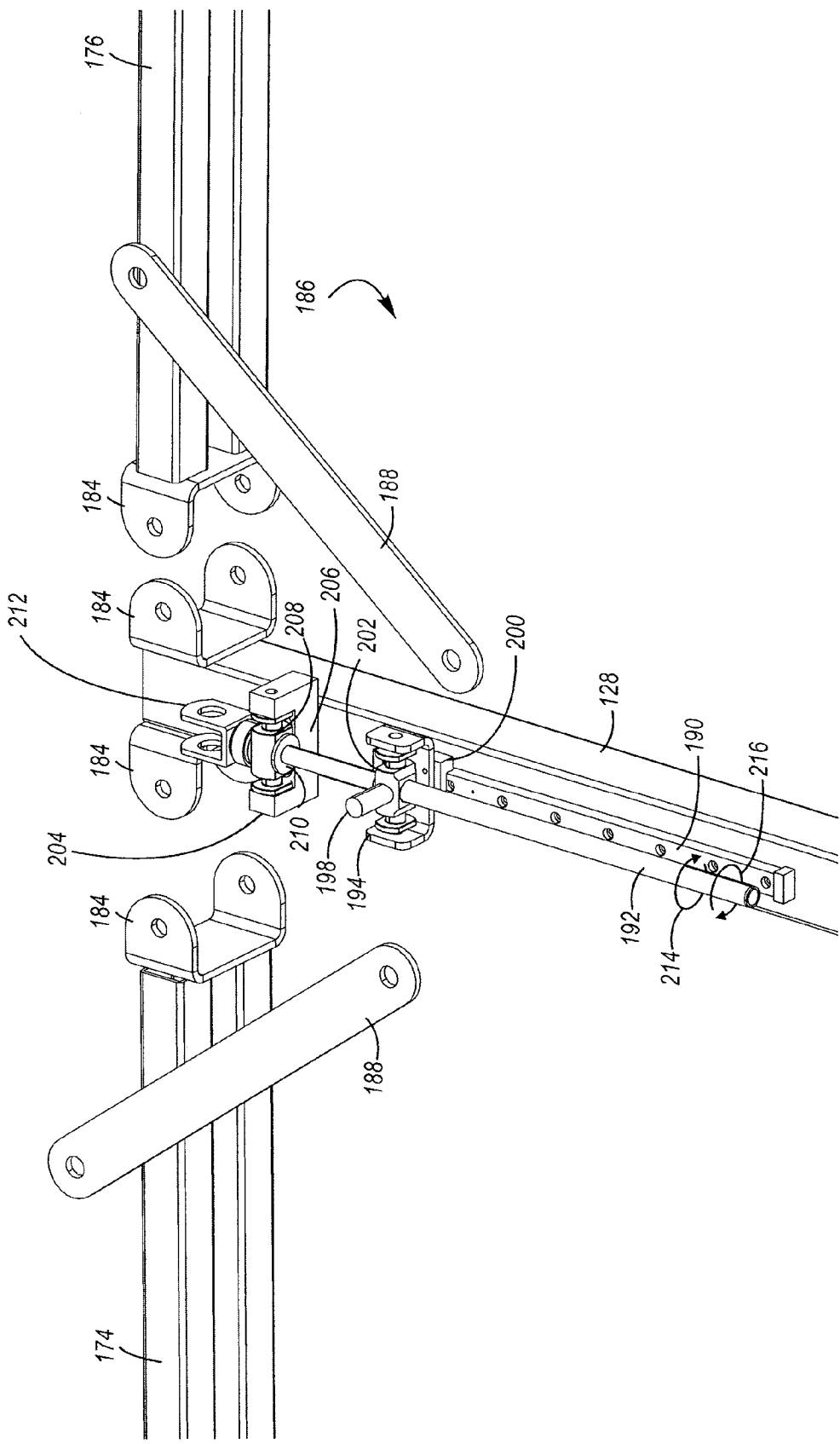
FIG. 49 is an enlarged exploded view of a portion of the trailer shown in FIG. 43, illustrating an exemplary connection of the arm and axle.

As shown in FIG. 49, the trailer 114 may include an actuating member, actuating mechanism or adjustment assembly 186 that is sized and configured to adjust the position of the arm 128 and the axle 170 when the trailer 10 is moved between the extended and collapsed positions. In addition, the adjustment assembly 186 may be sized and configured to secure or lock the arm 128 and/or the axle 170 in a desired position, such as the use or storage positions. Further, the adjustment assembly 186 may be sized and configured to move the trailer 114 between the collapsed and extended positions. For example, as discussed in more detail below, the adjustment assembly 186 may help pull the trailer into the storage position and push the trailer into the use position. The adjustment assembly 186 may also provide controlled movement of the trailer 114 between the use and storage positions. Significantly, because the movement of the trailer 114 may always be controlled, the trailer may not inadvertently or unexpectedly move, which may make the trailer easier to use. In addition, the adjustment assembly 186 may help maintain the trailer 114 in the use or storage positions, and prevent the trailer suddenly moving from the use or storage position. If desired, one or more latches and/or other suitable means may be used to secure the trailer 114 in the collapsed or extended positions.

Advantageously, the adjustment assembly 186 may allow the trailer 114 to be quickly and easily moved between the use and storage positions. In addition, the adjustment assembly 186 may allow the trailer 114 to be automatically and/or mechanically moved between the use and storage positions. This may increase the potential users of the trailer because relatively little energy, effort and/or labor may be required to move the trailer 114 between the use and storage positions.

The adjustment assembly 186, as shown in the accompanying figures, may include connecting members 188, a track 190, a shaft 192 and a movable carriage assembly or slider 194. For example, as shown in FIG. 43, the connecting members 188 may be pivotally or otherwise movably connected to the central portions 174, 176 of the axle 170 using, for example, a suitable fastener or pivot pin, brackets or connectors 196, and/or other suitable means. As shown in FIG. 49, the connecting members 188 may also be pivotally or otherwise movably connected to the carriage assembly 194. For example, the connecting members 188 may be pivotally connected to a pivot pin 198 of the carriage assembly 194.

As best seen in FIG. 49, the carriage assembly 194 may include a first portion 200 that is sized and configured to engage the track 190 and a second portion 202 that is sized and configured to be connected to the shaft 192. For example, the first portion 200 of the carriage assembly 194 preferably slides relative to the track 190 and the second portion 202 is preferably threadably connected to the shaft 192.

The shaft 192 may be connected to the arm 128 by a mount 204. For example, the mount 204 may include a first portion 206 connected to the arm 128 and a second portion 208 connected to the shaft 192. The shaft 192 is preferably inserted through an opening in the second portion 208 and the shaft is preferably held in a fixed position relative to the second portion using, for example, one or more plates 210. The shaft 192 may also be connected to a connector 212, which may be used to connect a crank, handle and/or other device that may be used to rotate the shaft.

Rotating the shaft 192 may be used to help adjust the position of the arm 128 and the axle 170 between the extended and collapsed positions. For example, as the shaft 192 is rotated in a first direction 214, the threads of the shaft may engage the threads of the carriage assembly 194 to move the carriage assembly along the track 190 in a direction away from the mount 204. As the carriage assembly 194 moves away from the mount 204, the pin 198 may move the connecting members 188, which may move the axle 170 and the arm 128 toward the collapsed position and away from the extended position. As the shaft 192 is rotated in an opposing second direction 216, the threads of the shaft may engage the threads of the carriage assembly 194 to move the carriage assembly along the track 190 in a direction towards the mount 204. As the carriage assembly 194 moves towards the mount 204, the pin 198 may move the connecting members 188, which may move the axle 170 and the arm 128 toward the extended position and away from the collapsed position.

As shown in FIGS. 31-32, 37-39 and 43-45, the axle 170 may be arranged in a generally straight configuration when the axle is in the extended position. For example, the portions 174, 176 of the axle 170 are preferably aligned along substantially the same plane, which may help provide a stronger, more stable and/or more secure axle. In addition, the axle 170 is preferably disposed in generally the same plane. As discussed above, it will be appreciated that the axle 170 need not having a generally straight configuration when the axle is in the extended position and the axle could be disposed at a forward or rearward angle, such as a forward angle that is between about one and five degrees or a rearward angle that is between about one and five degrees, if desired.

Desirably, unless a force is applied to the shaft 192, the carriage assembly 194 remains in a generally fixed position and that may prevent the trailer 114, the axle 170 and/or the arm 128 from moving between the use and storage positions. In greater detail, the carriage assembly 194 may be sized and configured to only move if the shaft 192 is rotated. Thus, if a rotational force is not applied to the shaft 192, then the carriage assembly may remain in a fixed position and that may prevent the trailer 114, the axle 170 and/or the arm 128 from moving between the use and storage positions. Therefore, the carriage assembly 194 may be used to lock the trailer 114, the axle 170 and/or the arm 128 in the use and storage positions. Moreover, the carriage assembly 194 may be further sized and configured to lock the trailer 114, the axle 170 and/or the arm 128 in a continuous or at least substantially continuous range of positions between and including the use and storage positions, if desired. It will be appreciated that the carriage assembly 194 may also be used to lock the trailer 114, the axle 170 and/or the arm 128 in other suitable positions and other portions of the adjustment assembly 186, if desired, may be used to lock the trailer, the axle and/or the arm in a desired position.

The trailer 114, however, does not require the adjustment assembly 186 be used to move the trailer between the use and storage positions. For example, the wheel assembly 122 could be used to help move the trailer 114 between the collapsed and use positions. It will be appreciated that other suitable adjustment assemblies and/or structures or devices could be used to move the trailer between the use and storage positions. In particular, the trailer 114 may include other assemblies that are sized and configured to move the arm 128, the frame 146, the axle 170 and/or other portions of the trailer between the use and storage positions.

For example, as shown in FIGS. 1-2, 7 and 13-14, the trailer 10 may include an adjustment assembly 218 that includes a winch 220. The adjustment assembly 218 may also include a cable coupled to the winch and to one or more portions of the trailer 10. The cable may be coupled to these portions of the trailer 10 using, for example, brackets 222 that are sized and configured to receive a portion of the cable and/or guide the cable into the desired position. The adjustment assembly 218 may also include one or more pulleys that may be connected to any desired portions of the trailer 10. Thus, the cable may be attached to various portions of the trailer 10 by the brackets 222 and pulleys, and the adjustment assembly 218 may be sized and configured to facilitate moving the trailer 10 from the use position to the storage position.

In greater detail, the winch 220 may be used to tighten the cable and move the trailer 10 from the use position to the collapsed position. In particular, the cable may be attached to various portions of the trailer 10 so that the cable may pull the sides of the trailer together when the winch is turned and the cable is tightened. Thus, the adjustment assembly 218 may be used to move the trailer 10 from the use to the storage position.

Figure 50:
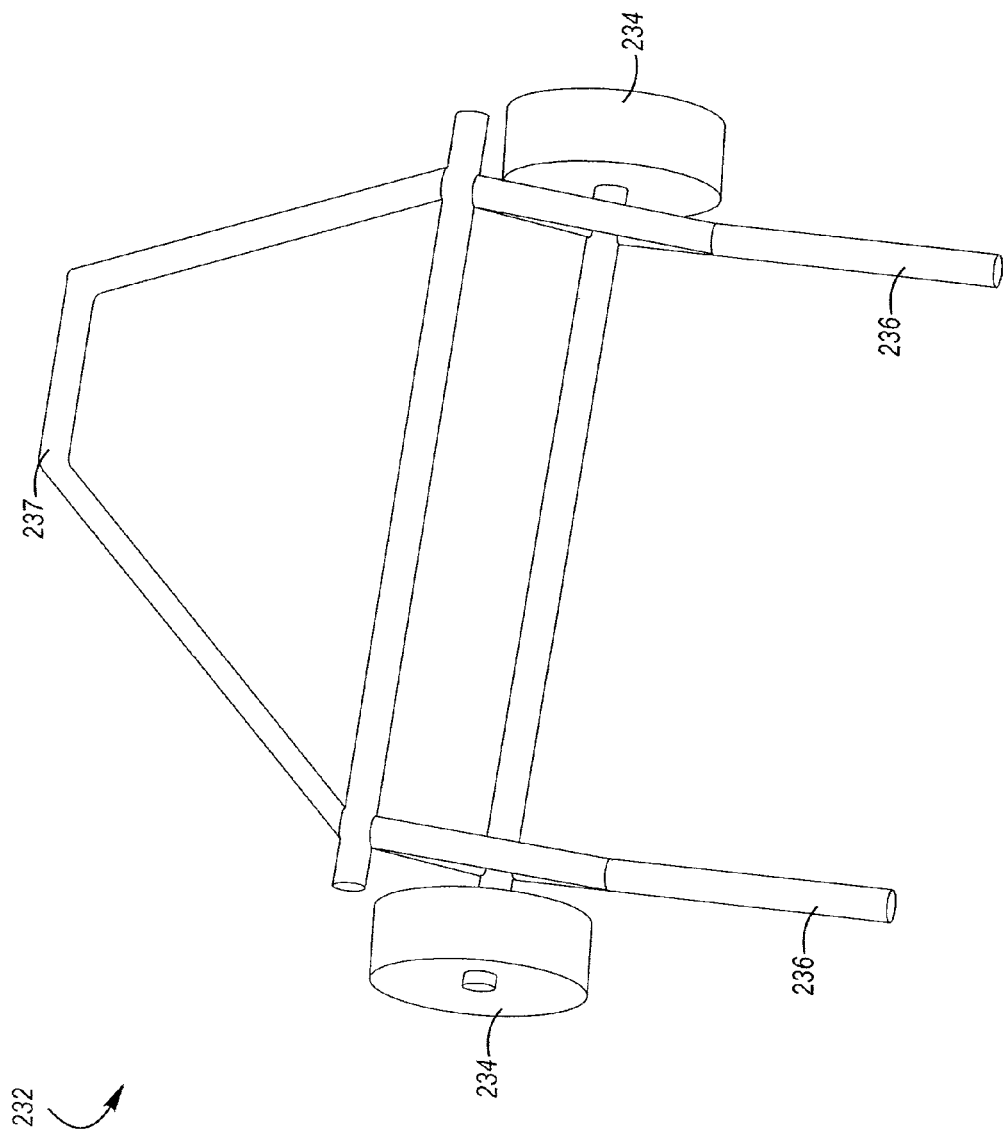
FIG. 50 is a perspective view of an exemplary apparatus that may be used to move the trailer between the extended and collapsed positions.
Figure 51:
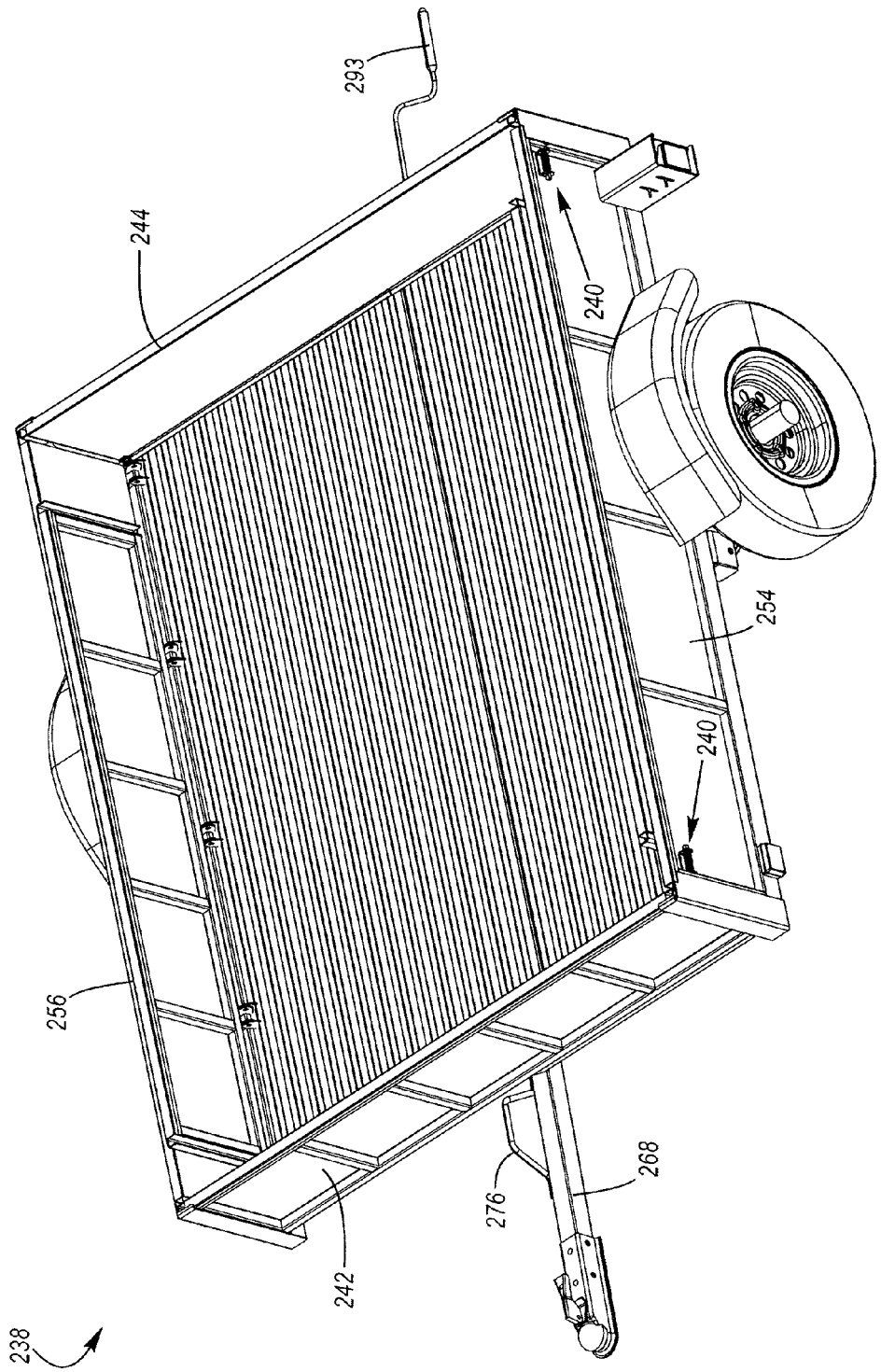
FIG. 51 is a perspective view of yet another exemplary trailer, illustrating the trailer in an extended or use position.
Figure 52:
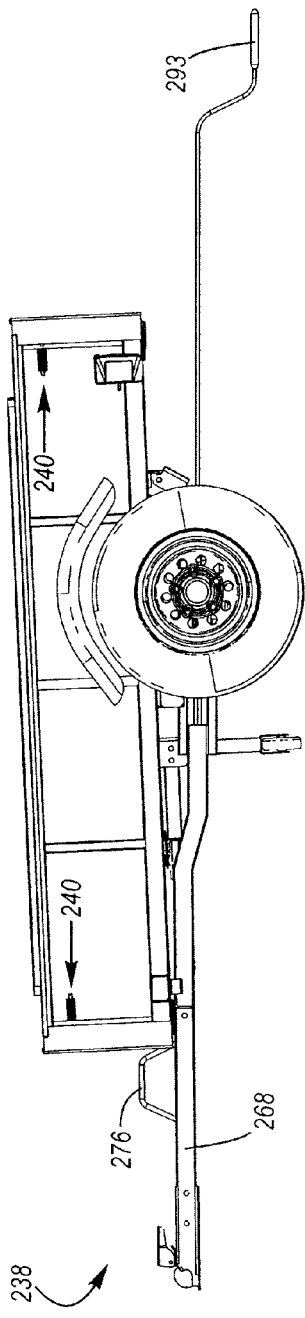
FIG. 52 is a left side view of the trailer shown in FIG. 51.
Figure 53:
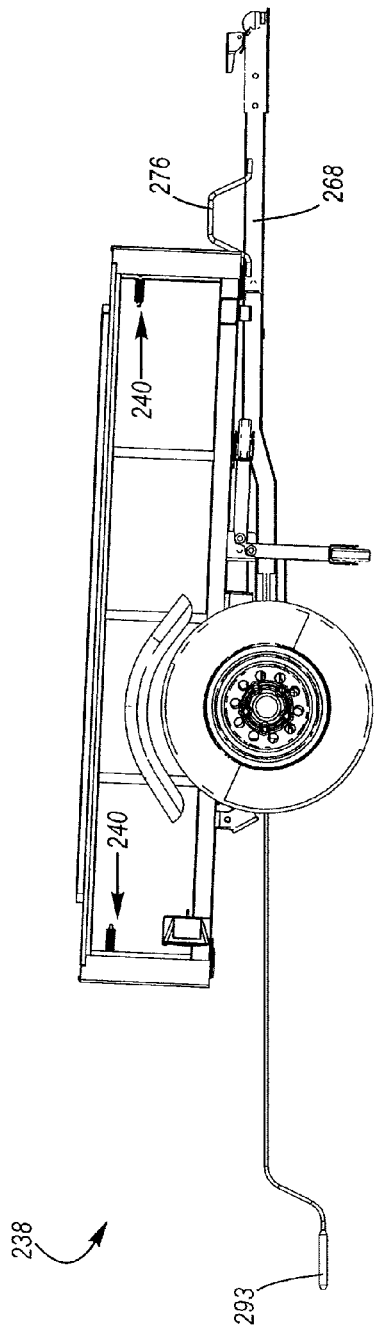
FIG. 53 is a right side view of the trailer shown in FIG. 51.

The trailer may also be moved between the use and collapsed positions by using other structures, such as the positioning apparatus 232 shown in FIG. 50. The positioning apparatus 232 may include two wheels 234 and two arms 236 that are interconnected by a frame. The arms 236 of the positioning apparatus 232 may be used to lift a wheel of the trailer away from a support surface, such as the floor of a garage, the ground, a driveway, etc. The positioning apparatus 232 may include a handle 237 that can be used may manipulate the arms 236 to lift the trailer's wheel. When the trailer's wheel is spaced apart from the support surface, the trailer may be more easily moved between the use and collapsed positions. In particular, when the trailer's wheel engages the support surface, the friction between the trailer's wheel and the support surface may resist or prevent the movement of the trailer between the use and collapsed positions. However, with the trailer's wheel spaced apart from the support surface, the wheels 234 of the positioning apparatus 232 may engage the support surface to allow the trailer to be readily moved between the use and collapsed positions.

It will be appreciated, therefore, that various suitable structures and apparatuses may be used to facilitate movement of the trailer between the use and storage positions. Advantageously, when the trailer is in the storage position, it may be much more compact and require much less storage space. This may allow the trailer to be used and stored in many different environments. For example, in the use position, the trailer may have a width of about five feet (1.52 meters) or about six feet (1.83 meters). When the trailer is in the collapsed position, however, the trailer may have a much smaller width. In particular, the trailer may have a width that is less than about 36 inches (91 centimeters) and/or less than about 30 inches (76 centimeters), which may allow the trailers to pass through many conventional doorways. It will be appreciated, however, that the trailer may have larger or smaller widths in the use and/or collapsed positions depending, for example, upon the particular configuration of the trailer.

When the trailer is in the collapsed position, the trailer preferably can be quickly and easily moved on its wheels to allow it to be positioned in the desired location. This may allow, for example, the user to quickly and easily store the trailer in a garage, shed and the like. The trailer, however, preferably cannot be towed or moved by a motor vehicle when the trailer is in the collapsed position. For example, the towing arm of the trailer (such as the arms 12, 128 discussed above) may be positioned to prevent towing of the trailer when the trailer is in the collapsed position. In particular, the towing arm may be positioned to make it difficult or impossible to use the towing arm. For example, the towing arm may be positioned in a retracted position behind the front end of the trailer. This may ensure that the trailer is towed only when the trailer is in the extended or use position.

As discussed above, the trailers can have different shapes, sizes, configurations and arrangements depending, for example, upon the intended use of the trailer. For example, as shown in FIGS. 51-89, another exemplary trailer 238 may include parts, features and aspects similar to those described above. The trailer 238, however, may also include other parts, features and aspects. Advantageously, many of these different parts, features and aspects may be combined, interchanged and the like depending, for example, upon the intended use of the trailer. Thus, while the trailers may be described as having particular parts, features, aspects, sizes, shapes, configurations, arrangements and the like, it will be understood that any given trailer may have any suitable mixture of parts, features, aspects, sizes, shapes, configurations, arrangements and the like.

Figure 54:
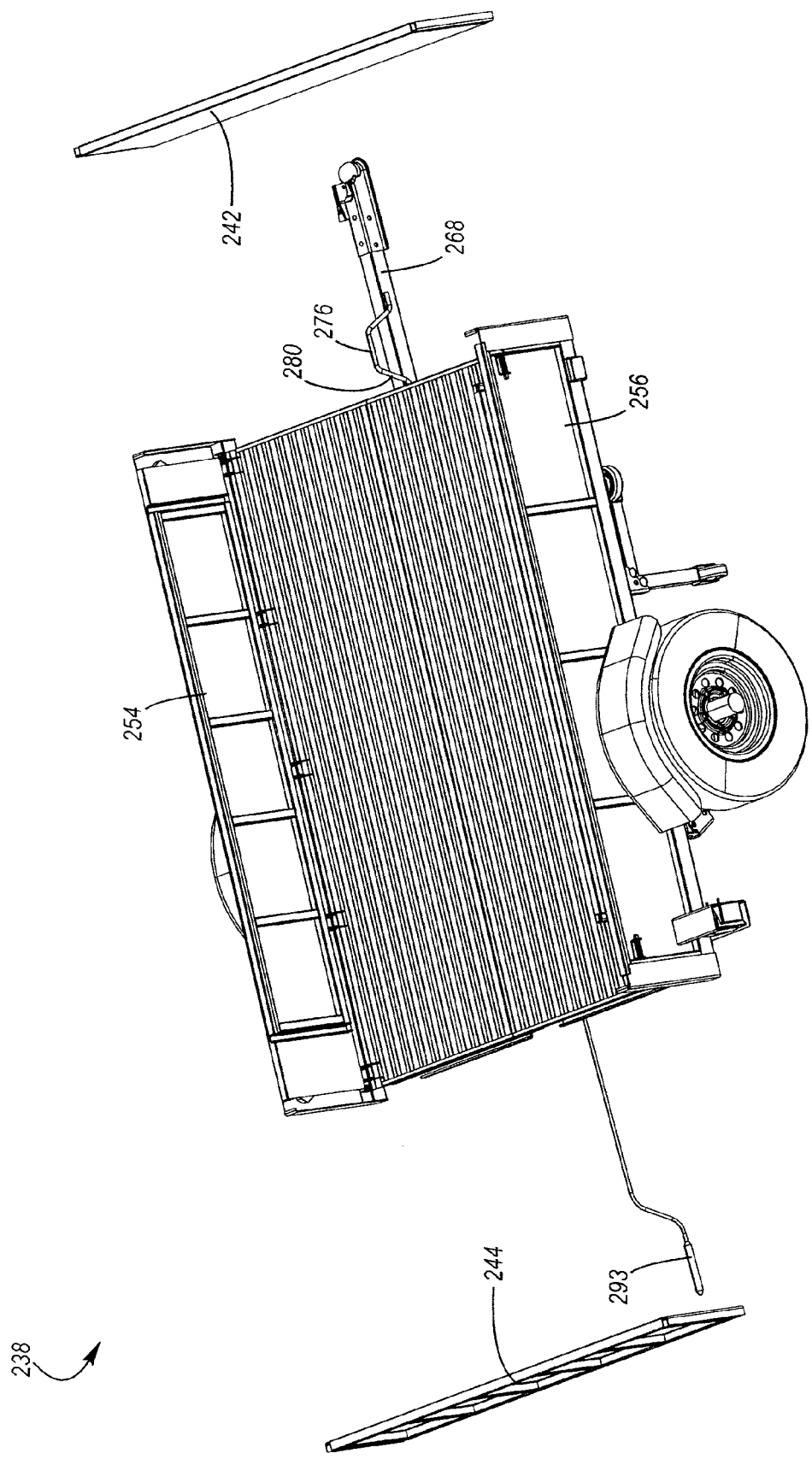
FIG. 54 is a partially exploded view of the trailer shown in FIG. 51.
Figure 63:
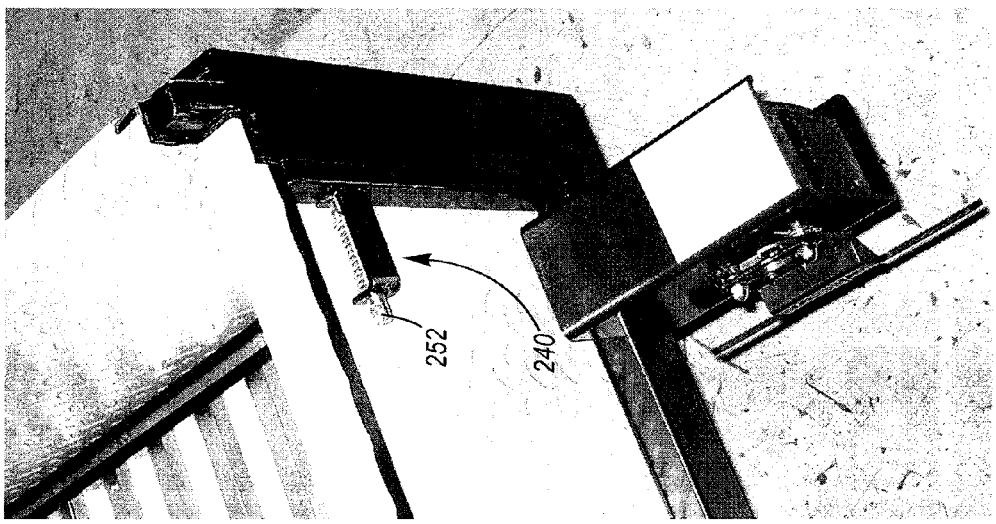
FIG. 63 is another enlarged perspective view of the left rear portion of the trailer shown in FIG. 51.

For example, as shown in FIGS. 51-64, the trailer 238 may include securing assemblies 240 that are sized and configured to removably secure one or more barriers to the trailer. In particular, the securing assemblies 240 may be used to selectively connect a front barrier 242 and a rear barrier 244 to front and rear portions of the trailer 238, as best seen in FIG. 54.

In greater detail, as best seen in FIGS. 55-60, the securing assembly 240 may include an engaging member 246 that is sized and configured to contact or engage a portion of the barrier to help secure the barrier in a desired position. The engaging member 246 may help secure the barrier so that at least a portion of the barrier is disposed underneath a protrusion, extension or lip 248, which may help better secure the barrier. As shown in FIGS. 59-60, the securing assembly 240 may also include a biasing member 250 that is sized and configured to bias the engaging member 246 to contact or engages the barrier. In particular, the securing assembly 240 may include a pin 252, which may be connected to the engaging member 246 and the biasing member 250, and the biasing member may bias the pin such that the engaging member is biased towards a position in as which the engaging member contacts or engages the barrier.

If the front and rear barriers 242, 244 are selectively connected to the trailer 238, then the securing assemblies 240 are preferably used to secure the barriers to the trailer 238. In particular, two securing assemblies 240 may be used to secure the front barrier 242 to the trailer 238 and two securing assemblies may be used to secure the rear barrier 244 to the trailer. Specifically, one securing assembly may be used to secure each side of the front and rear barriers 242, 244 to the trailer 238. In greater detail, as best seen in FIGS. 55-58, the trailer 238 may include left and right barriers 254, 256, respectively, and these barriers may include the protrusion, extension or lip 248. In addition, the left and right barriers 254, 256 may include slots 258 that are sized and configured to receive the ends of the front and rear barriers 242, 244. Desirably, the engaging members 246 help secure the ends of the front and rear barriers 242, 244 within the slots 258. Advantageously, the front and rear barriers 242, 244 may be interchangeably connected to the trailer 238.

Figure 61:
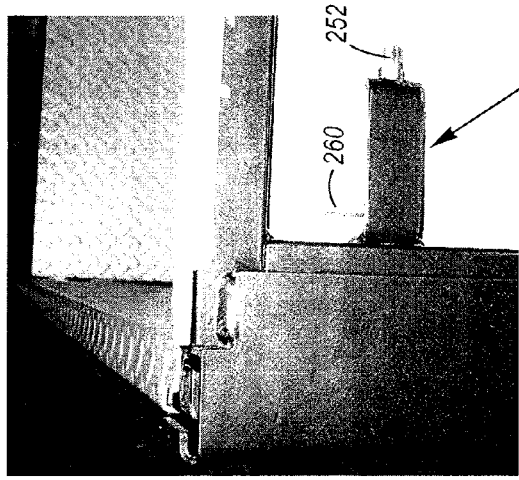
FIG. 61 is another enlarged perspective view of the right rear portion of the trailer shown in FIG. 51.
Figure 62:
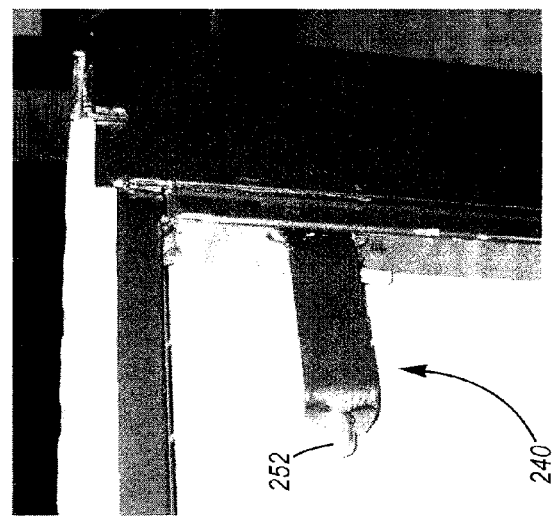
FIG. 62 is another enlarged perspective view of the left rear portion of the trailer shown in FIG. 51.

As shown in FIG. 61, the securing assembly 240 may include a handle 260. The handle 260 may be connected to the pin 252 and the handle may be gripped to move the engaging member 246 between engaged and disengaged positions. Desirably, as shown in the accompanying figures, the engaging member 246 includes angled sides that allow the barriers 242, 244 to be connected to the trailer 238 without requiring the user to manipulate the securing assemblies 240. In particular, the angled sides may allow the barriers 242, 244 to be inserted into the slots without the user manipulating the securing assemblies. When the barriers 242, 244 are in the desired positions, the engaging members 246 are biased into corresponding receiving portions in the barriers to secure the barriers in the desired positions.

Figure 64:
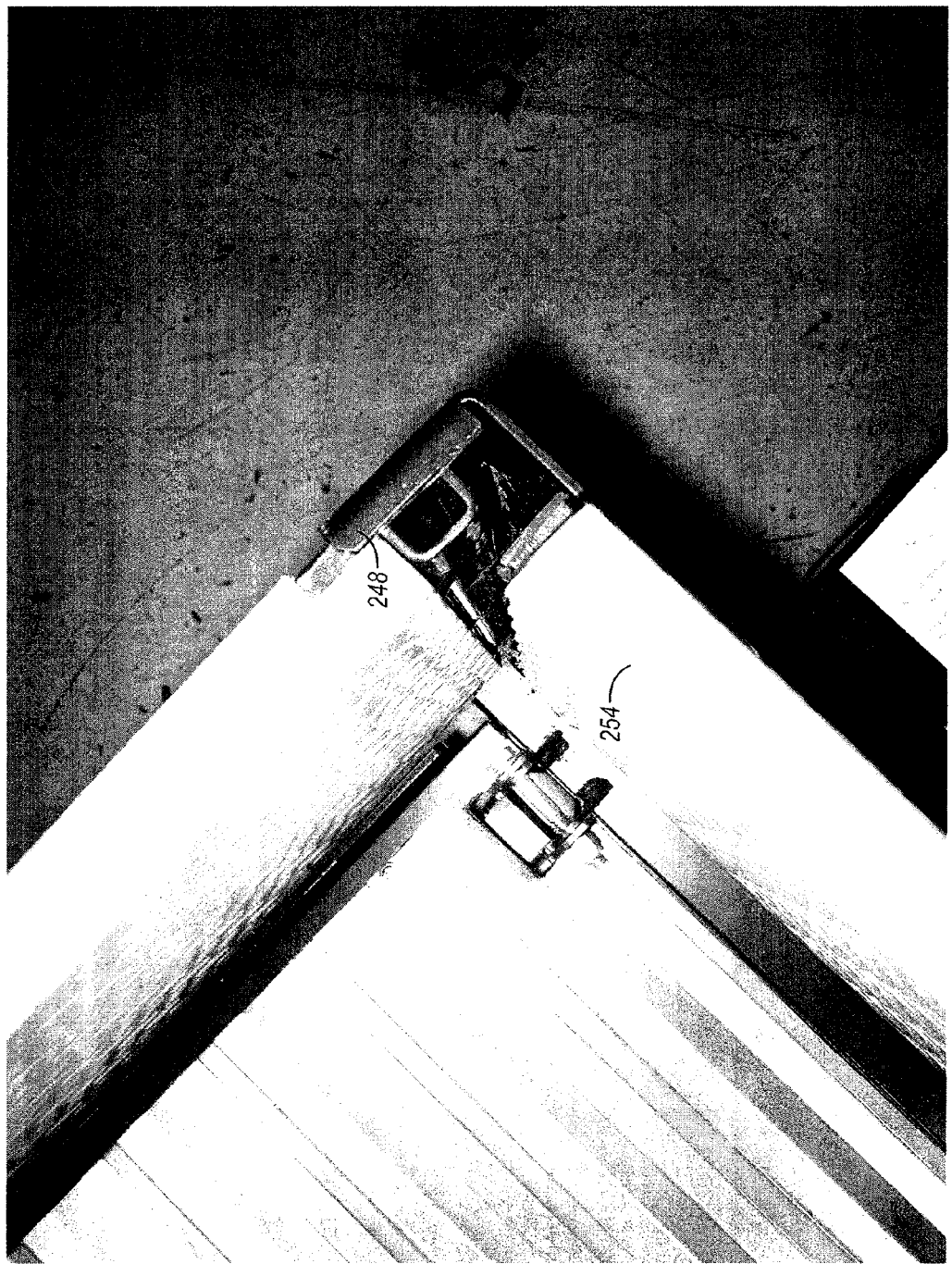
FIG. 64 is an enlarged top view of left rear portion of the trailer shown in FIG. 51.

The securing assemblies 240 may also help position the barriers 242, 244 in a generally vertical configuration, which may position at least a portion of the barrier underneath the protrusion, extension or lip 248. For example, as best seen in FIG. 64, the barrier may be disposed at least partially underneath the lip 248 and that may help prevent the barrier from being inadvertently removed from the trailer 238. In particular, the barrier may be initially inserted into the slot 258 at an angle. Once the barrier is in the desired position, the engaging member 246 of the securing assembly 240 may engage the barrier and the barrier may be disposed underneath the lip 248, which may secure the barrier in the desired position. It will be appreciated that the securing assembly 240 does not have to position the barrier underneath the lip 248 and another structure, such as a spring or pin, may be used to bias the barrier underneath the lip. It will also be appreciated that any suitable number and arrangements of securing assemblies 240 may be used to secure the barriers to the trailer. Further, it will be appreciated that the securing assemblies 240 may have other suitable shapes, sizes, configurations and arrangements depending, for example, upon the size, shape and intended use of the trailer.

As shown in FIGS. 65-66, the rear portion of the trailer 238 and the front and rear barriers 242, 244 may include attachment members 262, 264 that are sized and configured to attach the barriers to the rear portion of the trailer for use as a ramp. Thus, the front and rear barriers 242, 244 may be used as sidewalls when the trailer 238 is being used and these same barriers may be used as ramps to facilitate loading and unloading of the trailer. It will be appreciated that the front and rear barriers 242, 244 do not have to be used as ramps and, if desired, the left and right barriers could be used as ramps.

In greater detail, the rear portion of the trailer 238 may include two outwardly extending flanges 262 that are sized and configured to receive corresponding outwardly extending flanges 264 of the front and rear barriers 242, 244. The outwardly extending flanges 262, 264 may be connected by inserting the end of the flange 264 of the barrier into a receiving portion formed by the flange 262. Thus, the attachment members 262, 264 may be sized and configured to be interchangeably connected to the barriers 242, 244 to the trailer 238. The attachment members 262, 264 could also have other suitable shapes, sizes, configurations and arrangements depending, for example, upon the particular configuration of the trailer 238.

Figure 70:
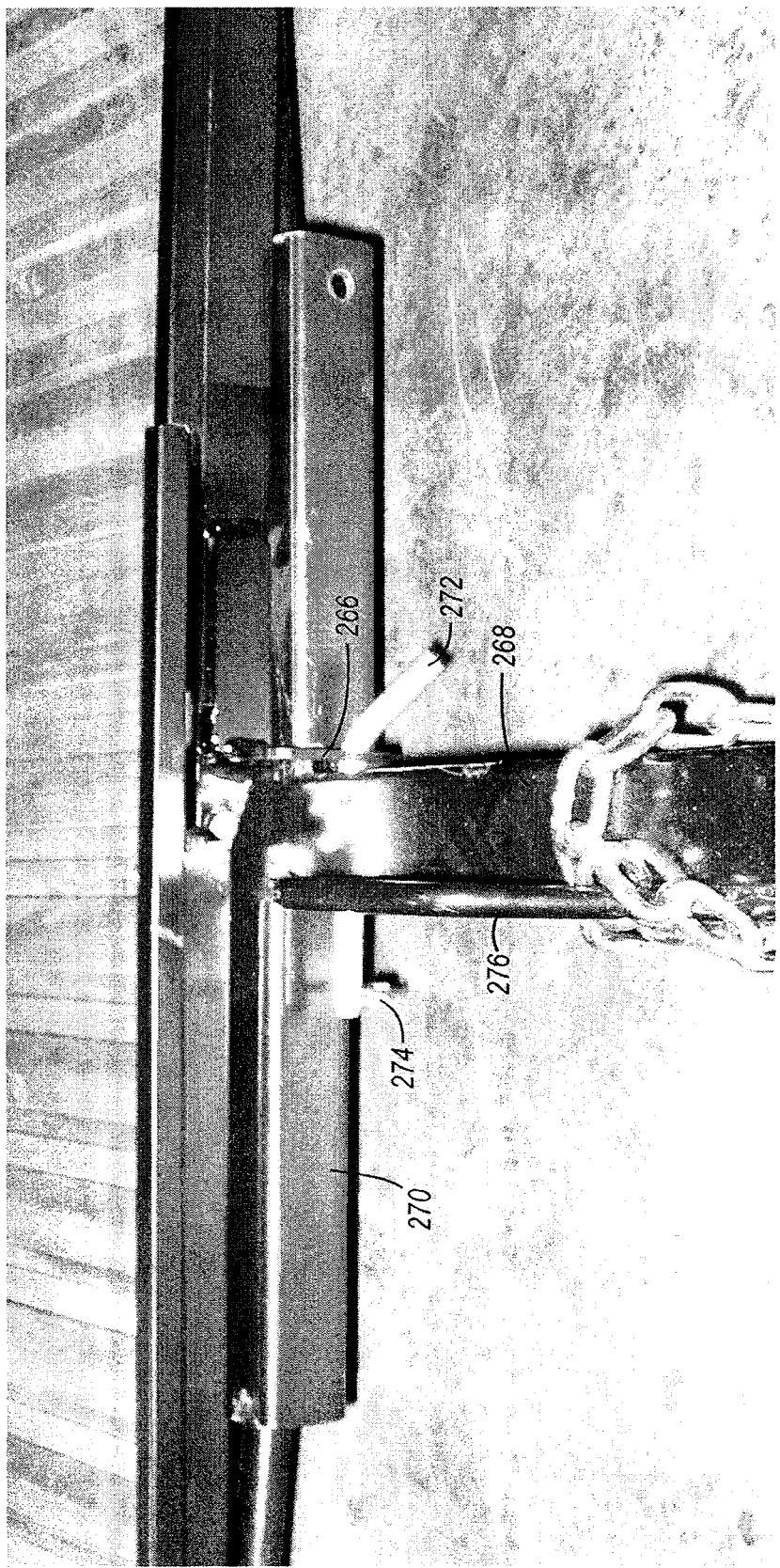
FIG. 70 is an enlarged front perspective view of the portion of the trailer shown in FIG. 69.
Figure 71:
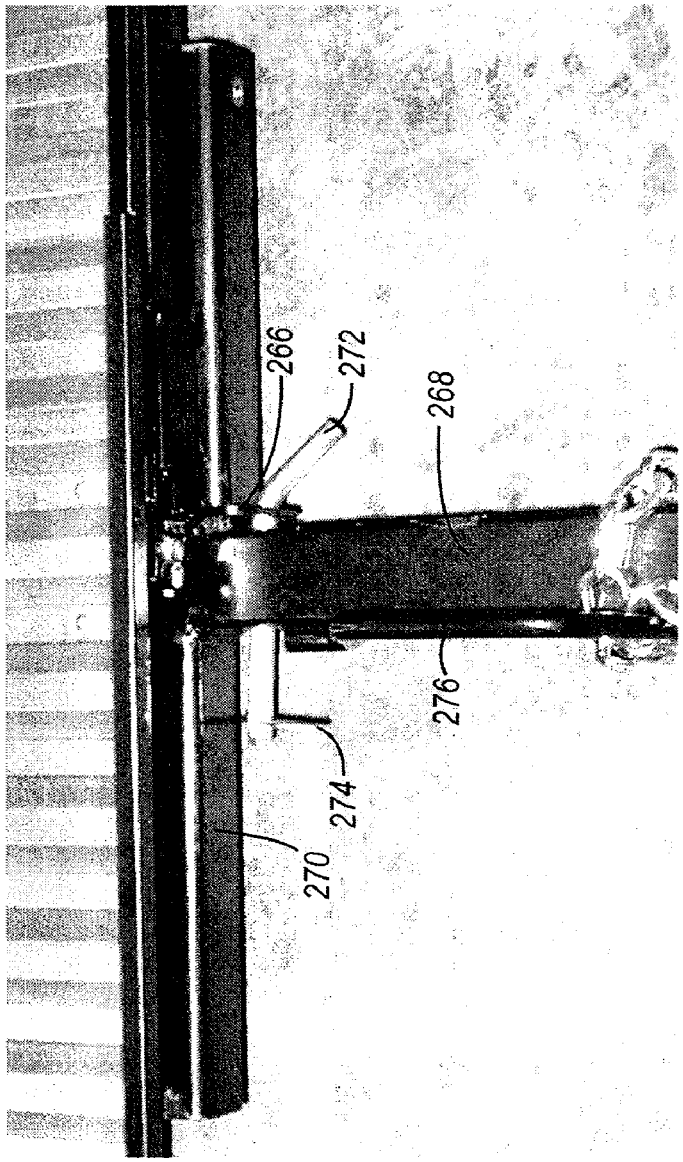
FIG. 71 is another enlarged front perspective view of the portion of the trailer shown in FIG. 69.
Figure 72:
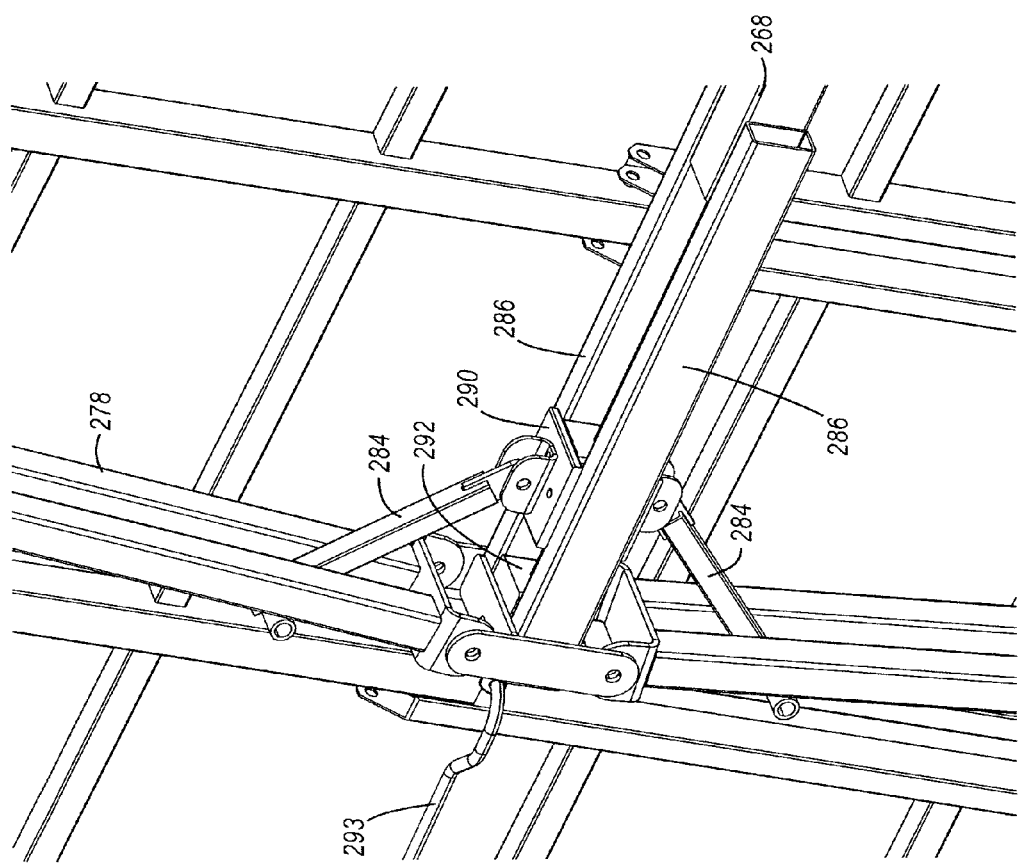
FIG. 72 is an enlarged bottom perspective view a portion of the trailer shown in FIG. 67.
Figure 73:
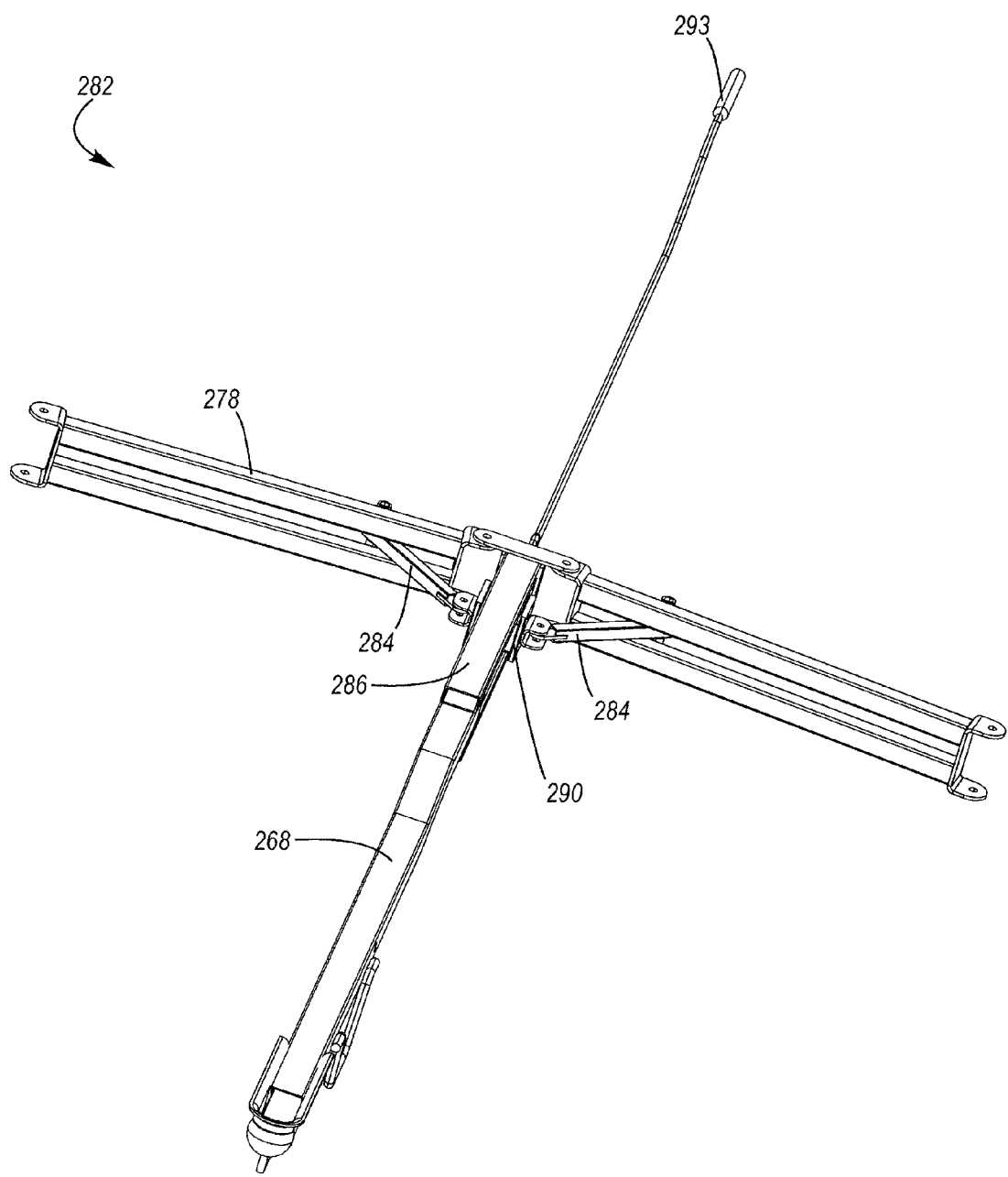
FIG. 73 is a bottom perspective view of a portion of the trailer shown in FIG. 51, illustrating an exemplary adjustment assembly.
Figure 74:
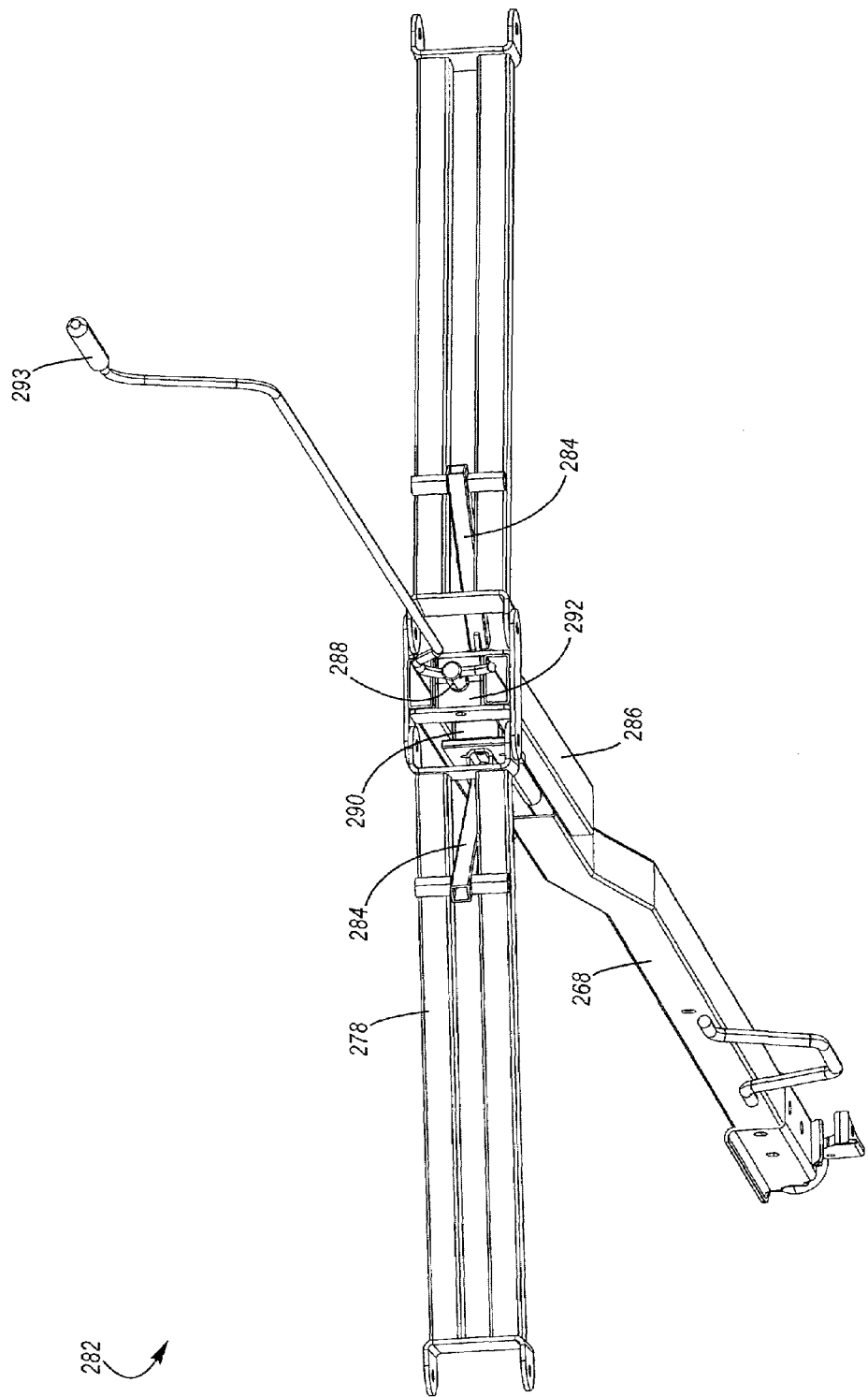
FIG. 74 is a rear perspective view of the adjustment assembly shown in FIG. 73.
Figure 75:
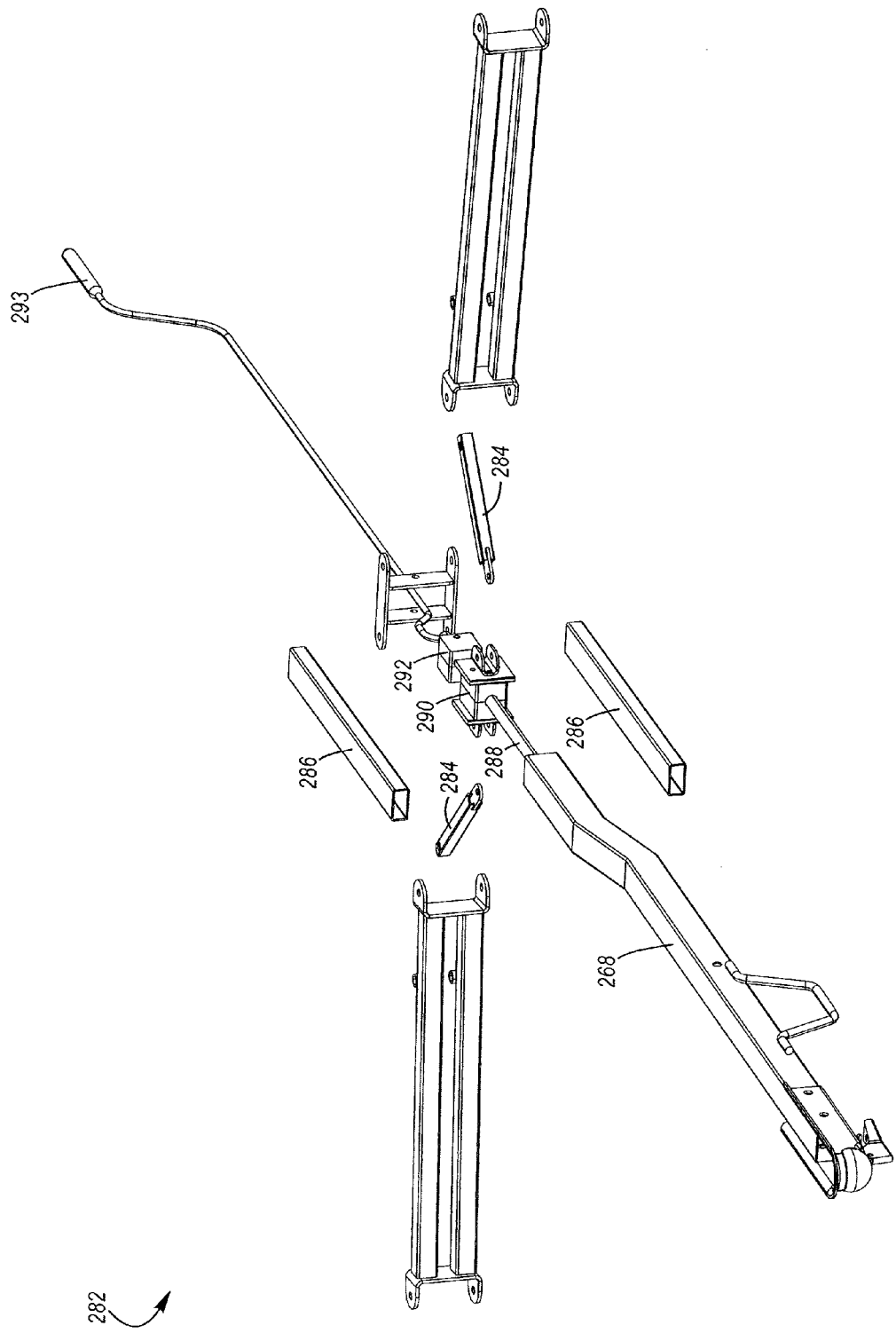
FIG. 75 is an exploded view of the adjustment assembly shown in FIG. 73.
Figure 76:
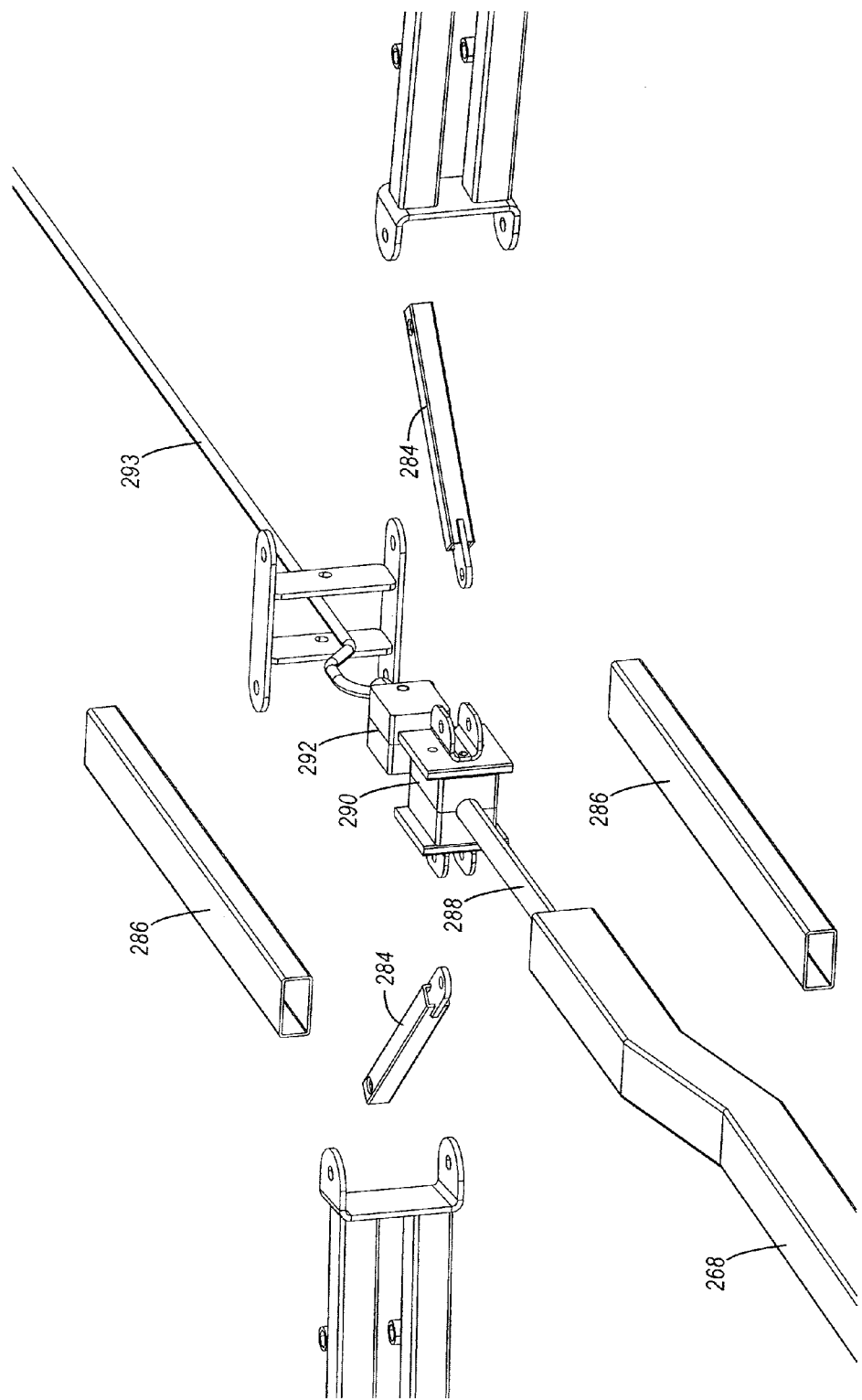
FIG. 76 is an enlarged, exploded view of a portion of the adjustment assembly shown in FIG. 75.
Figure 77:
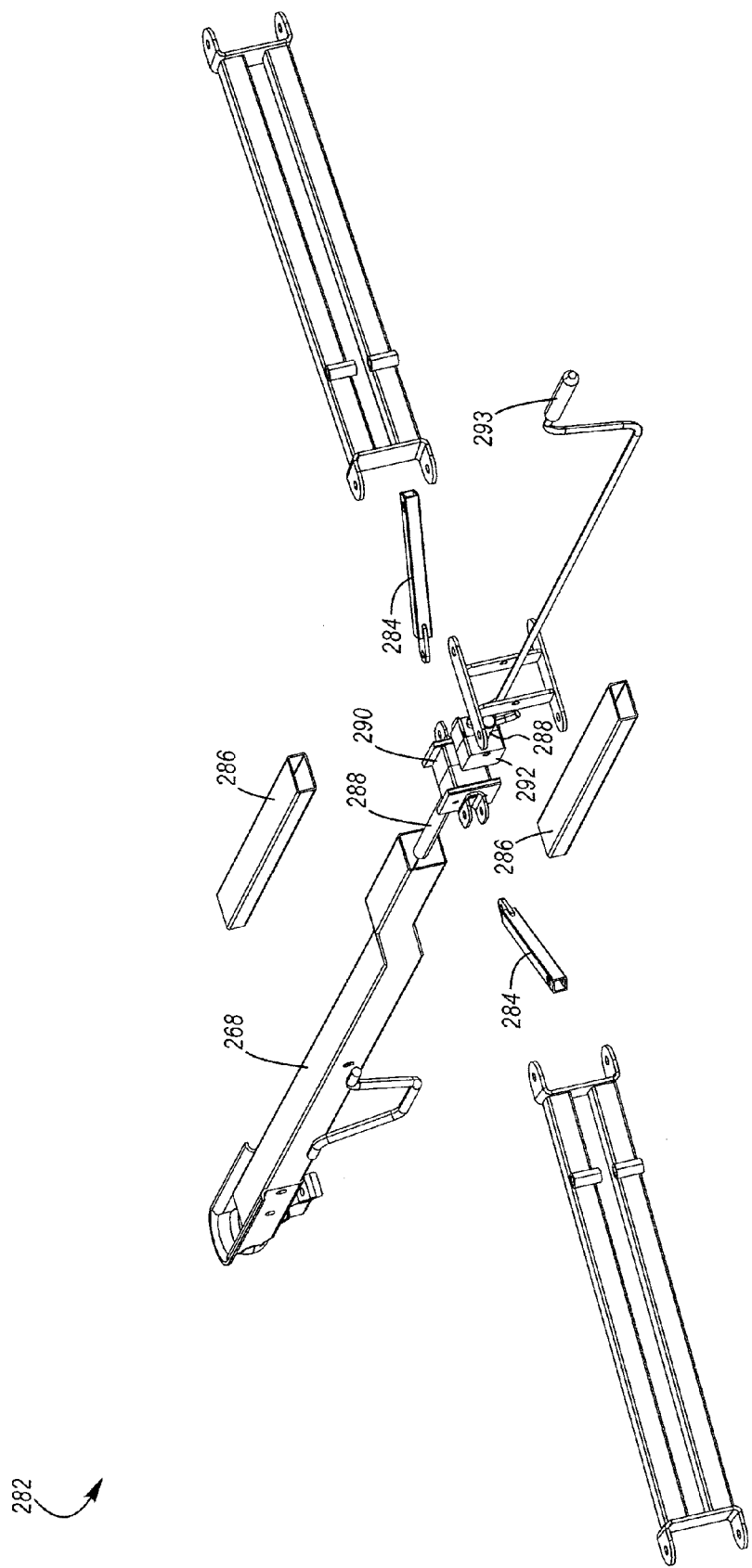
FIG. 77 is another enlarged, exploded view of the adjustment assembly shown in FIG. 73.
Figure 78:
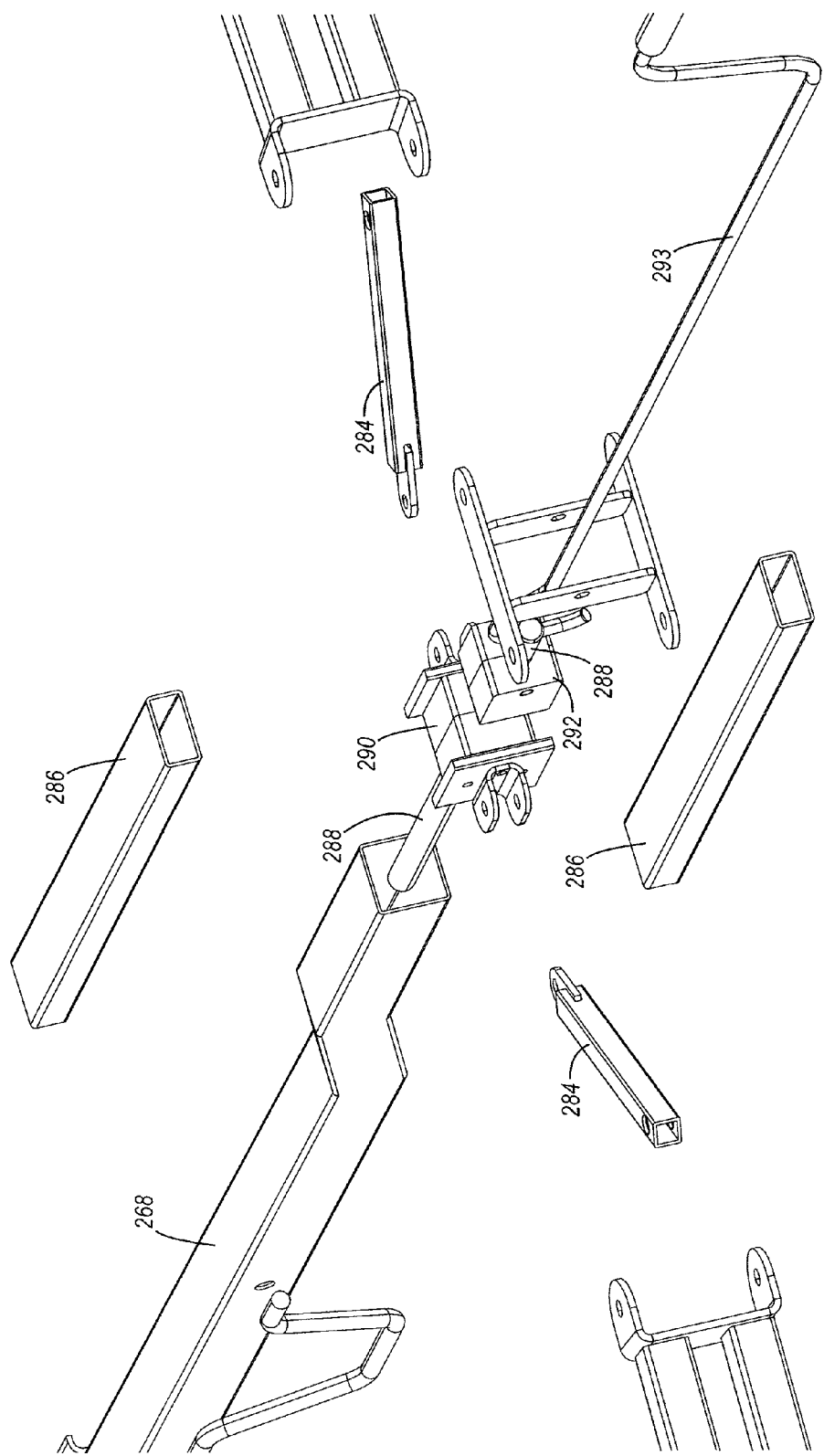
FIG. 78 is still another enlarged, exploded view of a portion of the adjustment assembly shown in FIG. 73.

While the trailer 238 is in the extended or use position, the trailer is preferably locked or secured in a fixed position. For example, as shown in FIGS. 68-71, the trailer 238 may include a latch 266 that is sized and configured to help secure the trailer in the extended position. The latch 266 may be connected to the frame and/or bed of the trailer 238, such as a towing arm 268 of the trailer 238. In particular, a portion of the latch 266 may be inserted into a receiving portion (such as a slot, opening or the like) in an elongated member 270. In addition, an opening in the latch 266 may be aligned with one or more openings in the arm 268 and a fastener 272 may be inserted through the openings to retain the portion of the latch within the receiving portion of the member 270. As shown in FIGS. 70-71, the fastener 272 may be secured using a ring, cotter pin or the like 274. Significantly, this may help retain the trailer in the use position. In addition, this may help prevent the trailer 238 from being inadvertently moved from the use position to the collapsed position. Therefore, the latch 266 may be used to secure the trailer 238 in the use position.

Figure 67:
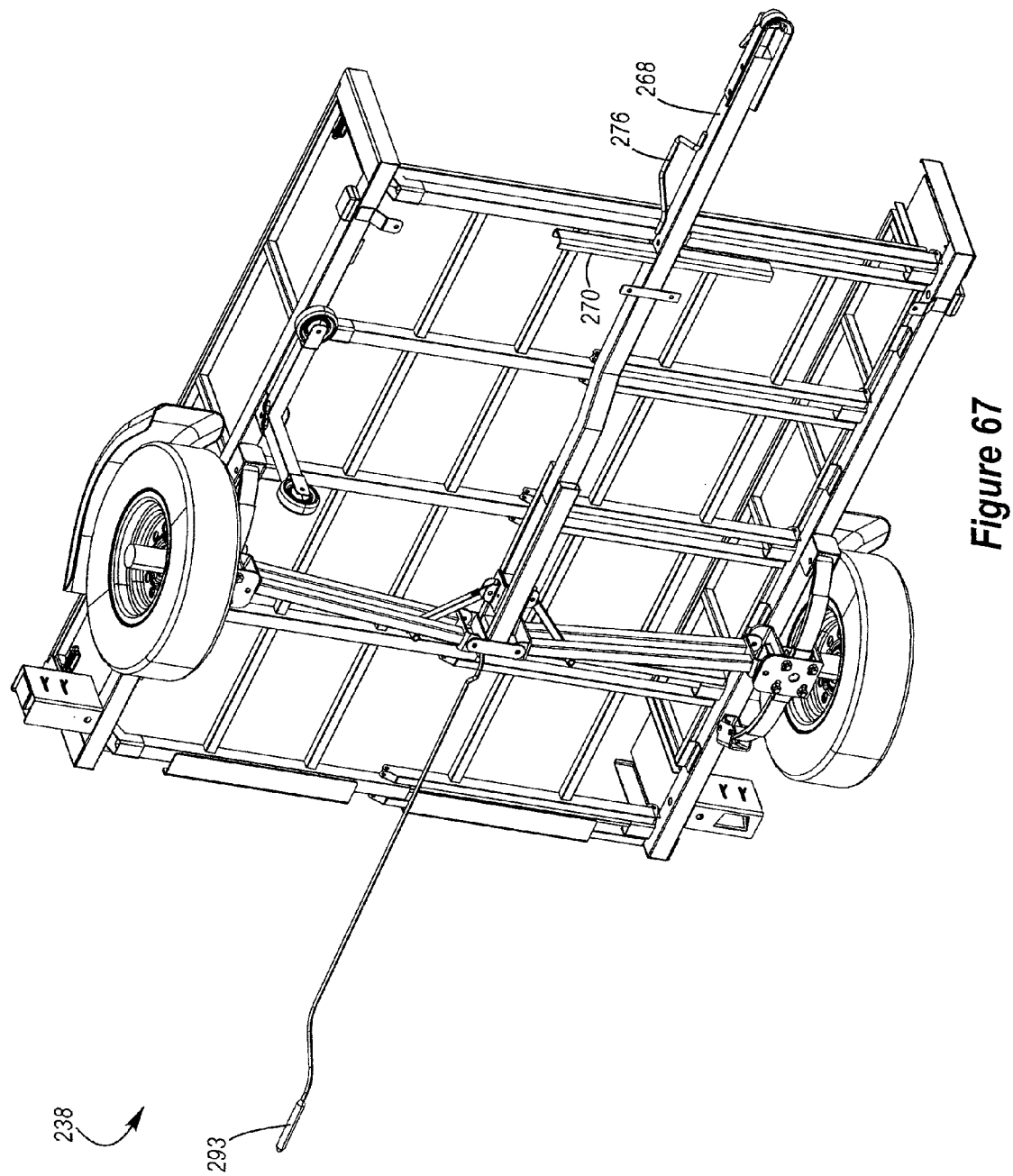
FIG. 67 is bottom perspective view of a portion of the trailer shown in FIG. 51.
Figure 68:
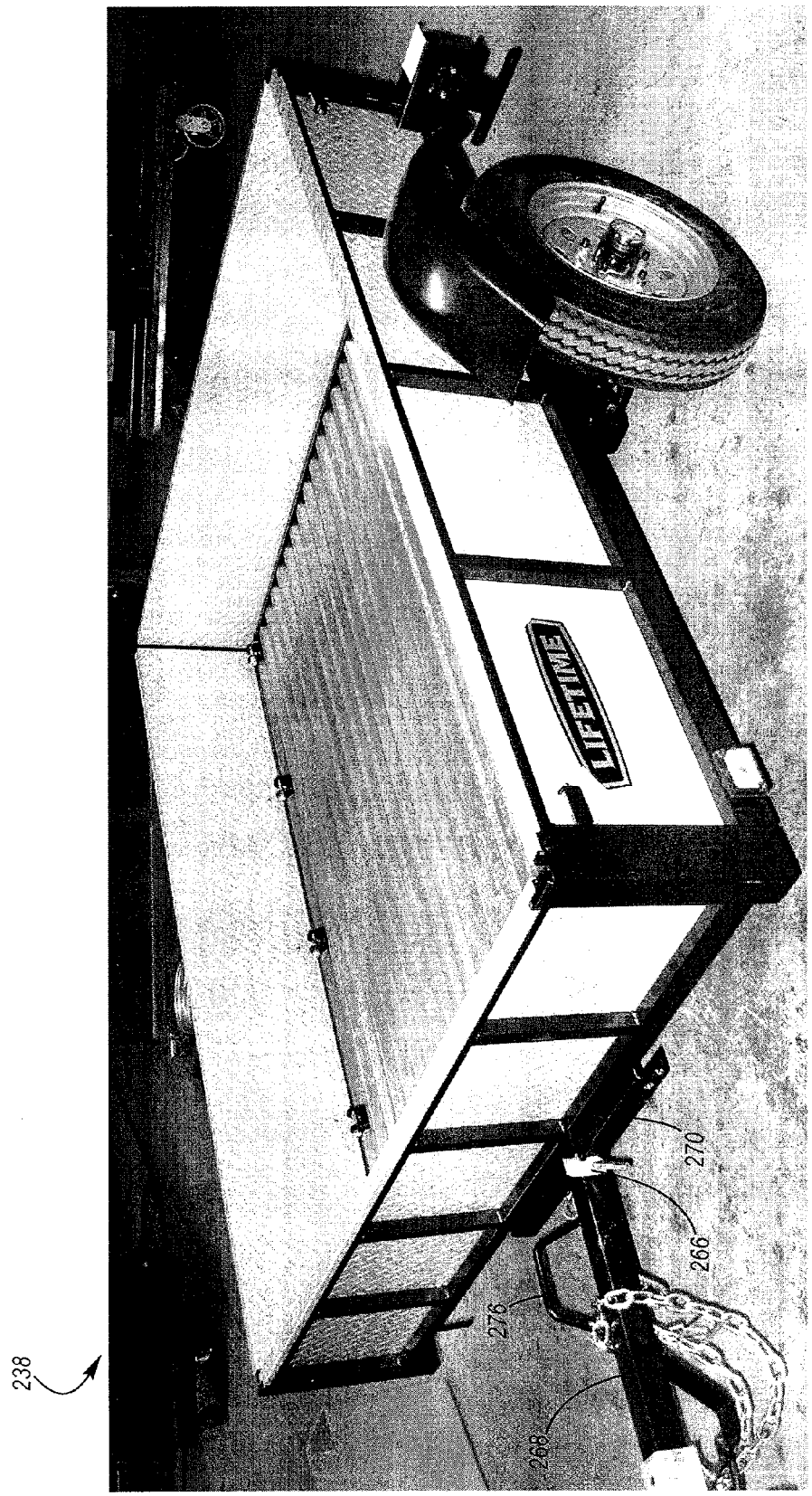
FIG. 68 is perspective view of still another exemplary trailer, illustrating an exemplary support connected to a towing arm.
Figure 69:
FIG. 69 is an enlarged perspective view of a portion of the trailer shown in FIG. 51, illustrating an exemplary locking member connecting an exemplary latch to the towing arm.

When it is desired to move the trailer 238 from the use to the collapsed position, the latch 266 may be removed. As discussed above, various mechanisms may be used to facilitate movement of the trailer from the use to the collapsed position. In order to assist in moving the trailer 238 from the use to the collapsed position, a guide 276 may be used. For example, as shown in FIG. 54, the guide 276 may be connected to the arm 268. Advantageously, if the arm 268 is moved rearwardly when the trailer 238 is being folded, then a portion of the trailer (such as the bed or frame) may contact the guide 276. In particular, as shown in FIG. 54, the guide 276 may include a sloped portion 280 that is sized and configured to contact the frame or the bed of the trailer 238 when the arm 268 moves rearwardly. In particular, as best seen in FIG. 67, the elongated member 270 may contact the guide 276 as the trailer 238 is being folded, but other suitable portions of the bed or frame may contact the guide. Because the frame or bed of the trailer 238 must move upwardly to travel over the guide 276, that may assist in the folding of the trailer.

Another suitable type of mechanism that may be used to facilitate movement of the trailer between the use and collapsed positions is shown in FIGS. 73-78. For example, the trailer 238 may include an adjustment assembly 282 that is sized and configured to adjust the position of the arm 268 and the axle 278. The adjustment assembly 282 may include connecting members 284, an upper track and a lower track 286, a shaft 288 and a sliding mechanism such as a carriage assembly 290. In particular, the connecting members 284 may be pivotally or movably connected to the axle 278 by fasteners, pins, brackets, connectors or the like. The connecting members 284 may also be pivotally or movably connected to the carriage assembly 290 by a fastener, pin, bracket, connector or the like. The carriage assembly 290 is preferably sized and configured to slide or move along the tracks 286. The carriage assembly 290 is also preferably coupled to the shaft 288. For example, the carriage assembly 290 and the shaft 288 may be threadably connected.

Additionally, the shaft 288 may be connected to the arm 268 using a mount 292 and the mount may be connected to the tracks 286. Specifically, the shaft 288 may be inserted through an opening in the mount 292 and the position of the mount along the shaft may be generally fixed using any suitable means. The shaft 288 may also be connected to a crank, handle and/or other device that may be used to rotate the shaft. Rotating the shaft 288 may help move the arm 268 and the axle 278 between the extended and collapsed positions. For example, as the shaft 288 is rotated in a first direction, the threads of the shaft may engage the threads of the carriage assembly 290 to move the carriage assembly along the tracks 286 away from the mount 292. As the carriage assembly 290 moves away from the mount 292, the connecting members 284 may move the axle 278 and the arm 268 toward the collapsed position and away from the extended position. On the other hand, if the shaft 288 is rotated in an opposing second direction, the threads of the shaft may engage the threads of the carriage assembly 290 to move the carriage assembly along the tracks 286 towards the mount 292. As the carriage assembly 290 moves towards the mount 292, the connecting members 284 may move the axle 278 and the arm 268 toward the extended position and away from the collapsed position. Advantageously, the shaft 288 may be rotated by a number of different types of devices such as a hand crank 293 or a motor. If a motor is used, that may allow the trailer to be automatically opened and closed.

Figure 79:
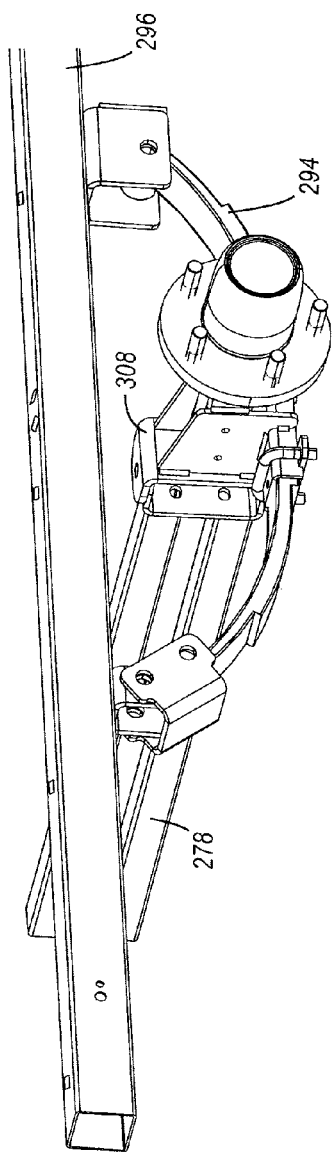
FIG. 79 is a right side perspective view of a portion of the trailer shown in FIG. 15, illustrating an exemplary suspension.
Figure 80:
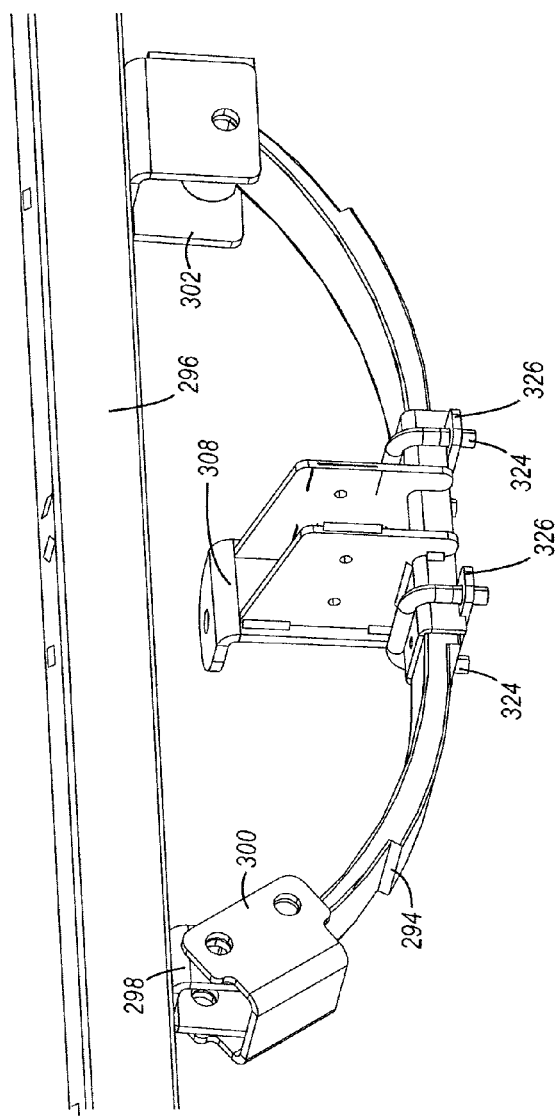
FIG. 80 is an enlarged perspective view of a portion of the trailer shown in FIG. 79.

In addition to the trailer being capable of being quickly and easily moved between the use and collapsed positions, the trailer may provide improved handling, riding characteristics and the like. In particular, the trailer may provide a more stable and sure ride because, for example, the wheels may remain in the desired positions while the trailer is being used. For example, as shown in FIGS. 79-80, the trailer may include a suspension system 294 that is connected to the frame. In greater detail, the suspension system 294 may include a leaf spring that is connected to the support member 296 of the frame and the axle may be connected to the leaf spring. It will be appreciated that the suspension system 294 may have include other suitable components and the suspension system may have other appropriate arrangements and configurations depending, for example, upon the intended use of the trailer.

In further detail, the leaf spring of the suspension system 294 may be connected to the support member 296 by brackets 298, 300, 302. In particular, the brackets 298, 302 may be generally U-shaped brackets that are connected to the support member 296 and the bracket 300, which may also have a generally U-shaped configuration, may be connected to the bracket 298 and the suspension system 294. The brackets 298, 302 are preferably connected to the support member 296 in a generally fixed position, and the bracket 300 is preferably pivotally or otherwise movably connected to the bracket 298 and the suspension system 294. The bracket 302 may also be pivotally or otherwise movably connected to the suspension system 294.

As shown in FIGS. 79-85, the brackets 298, 300, 302 may include a pair of flanges or walls that are generally aligned with opposing sides of the leaf spring of the suspension system 294. Preferably, the flanges of the brackets 300, 302 are disposed proximate to and/or abut the sides of the leaf spring, which may help prevent the leaf spring from undesirably twisting while allowing the leaf spring to move up and down or deflect as desired.

Figure 81:
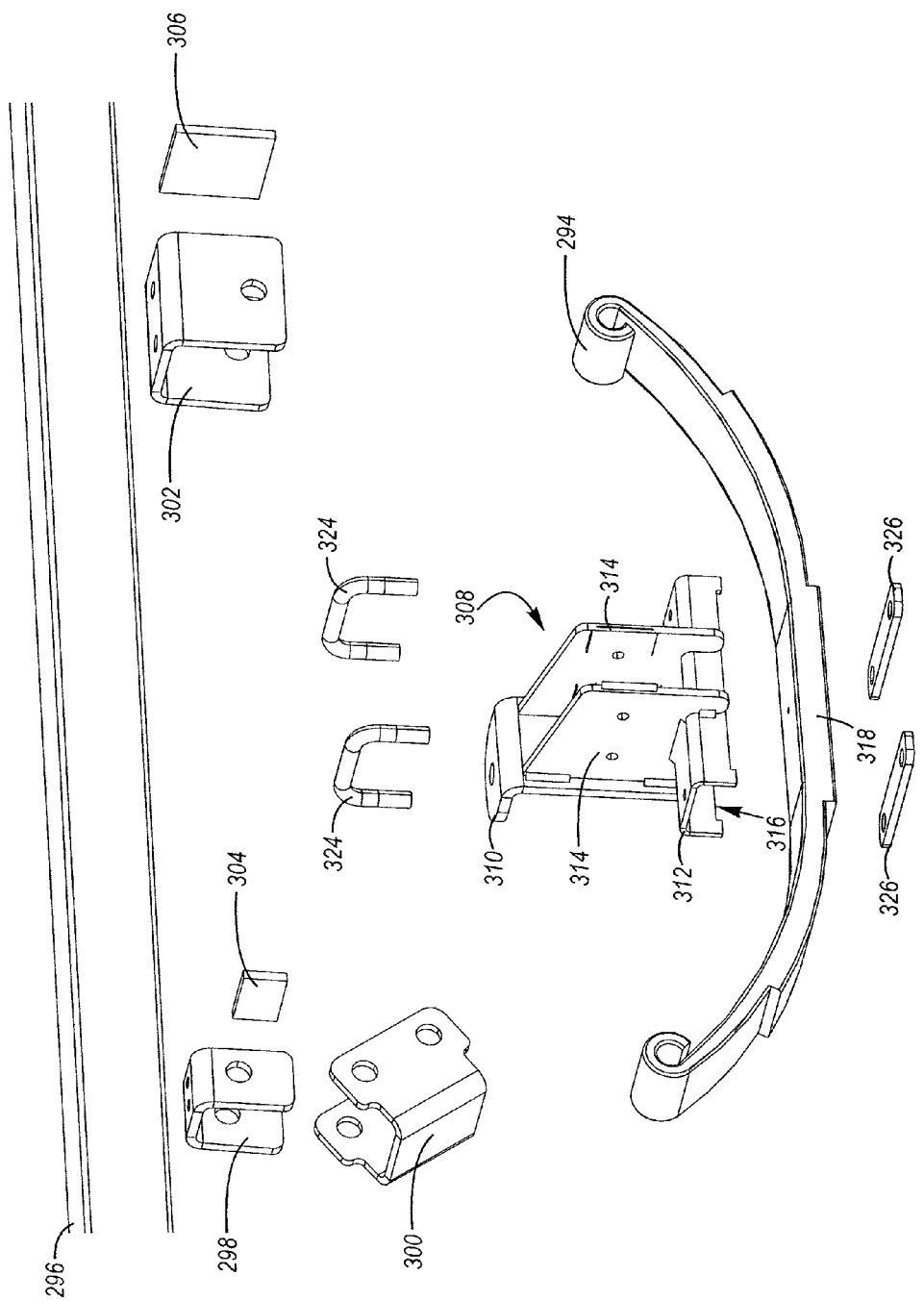
FIG. 81 is an exploded view of the portion of the trailer shown in FIG. 80.
Figure 85:
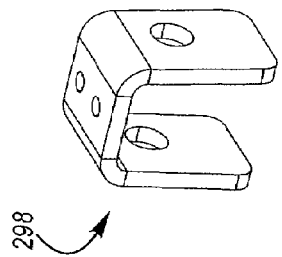
FIG. 85 is a perspective view of the bracket shown in FIG. 84.
Figure 83:
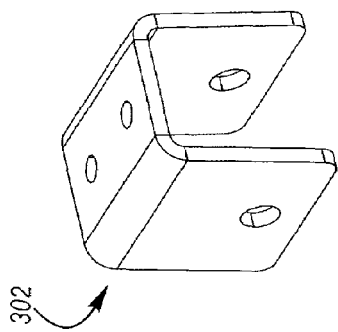
FIG. 83 is a perspective view of the bracket shown in FIG. 82.
Figure 84:
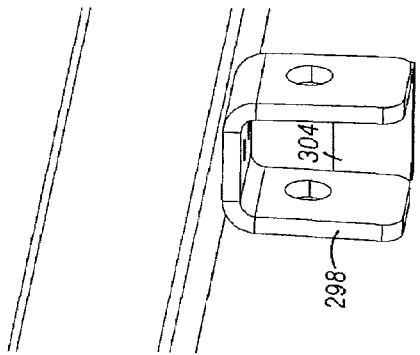
FIG. 84 is a perspective view of a portion of the trailer shown in FIG. 79, illustrating an exemplary bracket.
Figure 82:
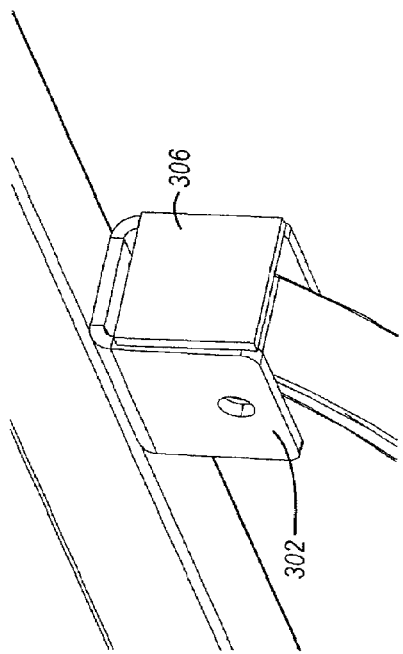
FIG. 82 is a perspective view of a portion of the trailer shown in FIG. 79, illustrating an exemplary bracket.
Figure 87:
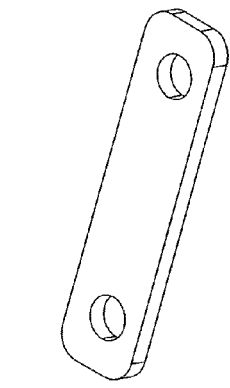
FIG. 87 is a perspective view of a portion of the trailer shown in FIG. 79, illustrating an exemplary plate.

As shown in FIGS. 81-82 and 84, reinforcing members 304, 306 may be connected to the brackets 298, 302. The reinforcing members 304, 306 may be sized and configured to retain the flanges or walls of the brackets 298, 302 in a desired position. In addition, the reinforcing members 304, 306 may help the brackets 298, 302 from undesirably twisting or deforming. The brackets 298, 302 and the reinforcing members 304, 306 may comprise separate components that may be interconnected, such as by welding. It will be appreciated that the brackets 298, 302 and reinforcing members 304, 306 may be integrally formed as part of a unitary, one-piece structure if desired. The brackets 298, 300, 302 and the reinforcing members 304, 306 are preferably constructed from metal, but the brackets and reinforcing members may be constructed from other materials and/or have other suitable shapes, sizes configurations and arrangements.

As shown in FIGS. 79-81 and 88-89, the axle 278 and/or a wheel assembly, which may include a spindle and a hub, may be connected to the suspension system 294 by a connector 308. For example, the connector 308 may include a first portion, such as a bracket 310, that is sized and configured to be connected to the axle 278 and a second portion, such as a bracket 312, that is sized and configured to be connected to the leaf spring of the suspension 294. The bracket 310 is preferably pivotally or movably connected to the axle 278 and the bracket 312 is preferably connected to the leaf spring of the suspension system 294 in a fixed position. It will be appreciated that the connector 308 and the brackets 310, 312 may be connected to other portions of the axle and suspension system using other suitable structures.

The connector 308 may also include braces 314 that are connected to the brackets 310, 312. The brackets 310, 312 and the braces 114 are preferably constructed from metal and the braces are preferably securely connected to the brackets by welding. It will be appreciated that the brackets 310, 312 and the braces 114 may be constructed from other suitable materials and may be connected by using fasteners, adhesives and the like, if desired.

Figure 89:
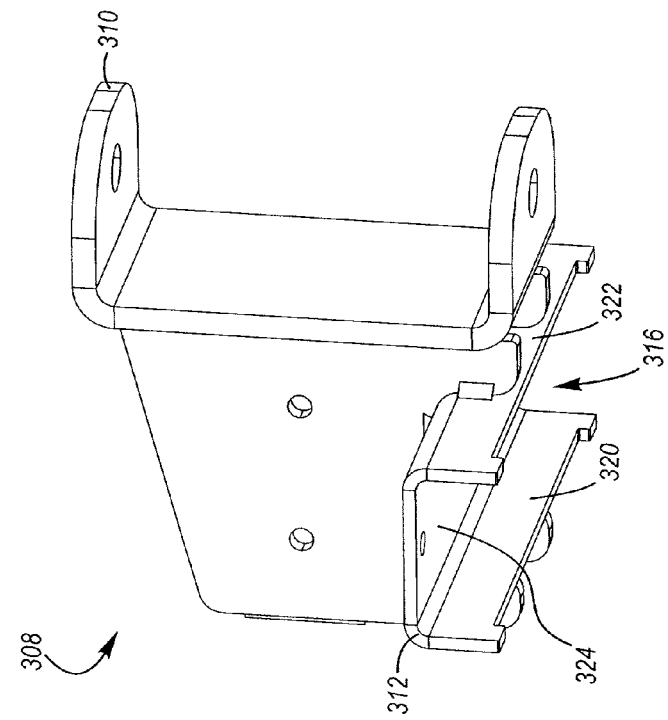
FIG. 89 is a perspective view of the connector shown in FIG. 88.
Figure 86:
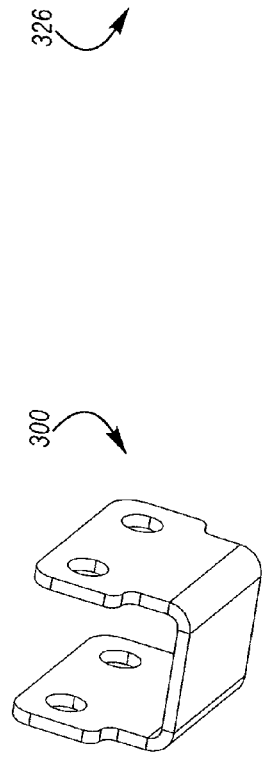
FIG. 86 is a perspective view of a portion of the trailer shown in FIG. 79, illustrating an exemplary bracket.
Figure 88:
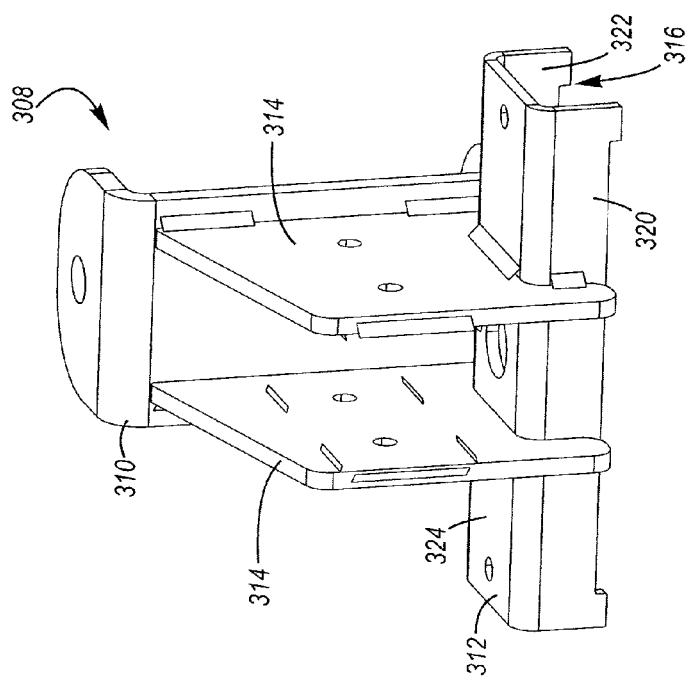
FIG. 88 is a perspective view of a portion of the trailer shown in FIG. 79, illustrating an exemplary connector.

As shown in FIGS. 80-81, the bracket 312 may include a receiving portion 316 that is sized and configured to receive a portion 318 of the leaf spring of the suspension system 294. In particular, as best seen in FIGS. 88-89, the bracket 312 may include a generally U-shaped portion with a pair of flanges or walls 320, 322. The leaf spring of the suspension system 294 may be secured in the desired position by U-bolts 324 and connecting members or plates 326, as discussed in more detail below.

As shown in FIGS. 79-81 and 88-89, the flanges 320, 322 of the bracket 312 may be generally aligned with opposing sides of the leaf spring of the suspension system 294. Preferably, the flanges 320, 322 are disposed proximate to and/or abut the sides of the leaf spring, which may help prevent the leaf spring from undesirably twisting while allowing the leaf spring to move up and down as desired. If desired, the flanges 320, 322 may be disposed generally parallel to each other and may be disposed proximate to and/or abut generally parallel opposing sides of the leaf spring. Of course, the flanges 320, 322 may be disposed in other relative positions and in other suitable locations depending, for example, upon the particular configuration of the bracket 312 or suspension system 294.

The bracket 312 and the flanges 320, 322 preferably have an elongated shape that is substantially larger than the thickness of the axle 278. For example, the bracket 312 and the flanges 320, 322 preferably have length that is at least two times the thickness of the axle 278. In addition, the bracket 312 and the flanges 320, 322 may have a length that is at least three times the thickness of the axle 278. The elongated shape of the bracket 312 and the flanges 320, 322 may advantageously help further prevent the leaf spring of the suspension system 294 from undesirably twisting. Of course, the bracket 312 and the flanges 320, 322 may have larger or smaller lengths if desired. In addition, the flanges 320, 322 may have different lengths and may have various suitable configurations and arrangements.

As shown in FIG. 80, the connector 308 may be secured to the leaf spring of the suspension system 294 by the U-shaped bolts 324 and the plates 326. It will be appreciated, however, that the connector 308 may be secured to the suspension using any other suitable means.

Figure 90:
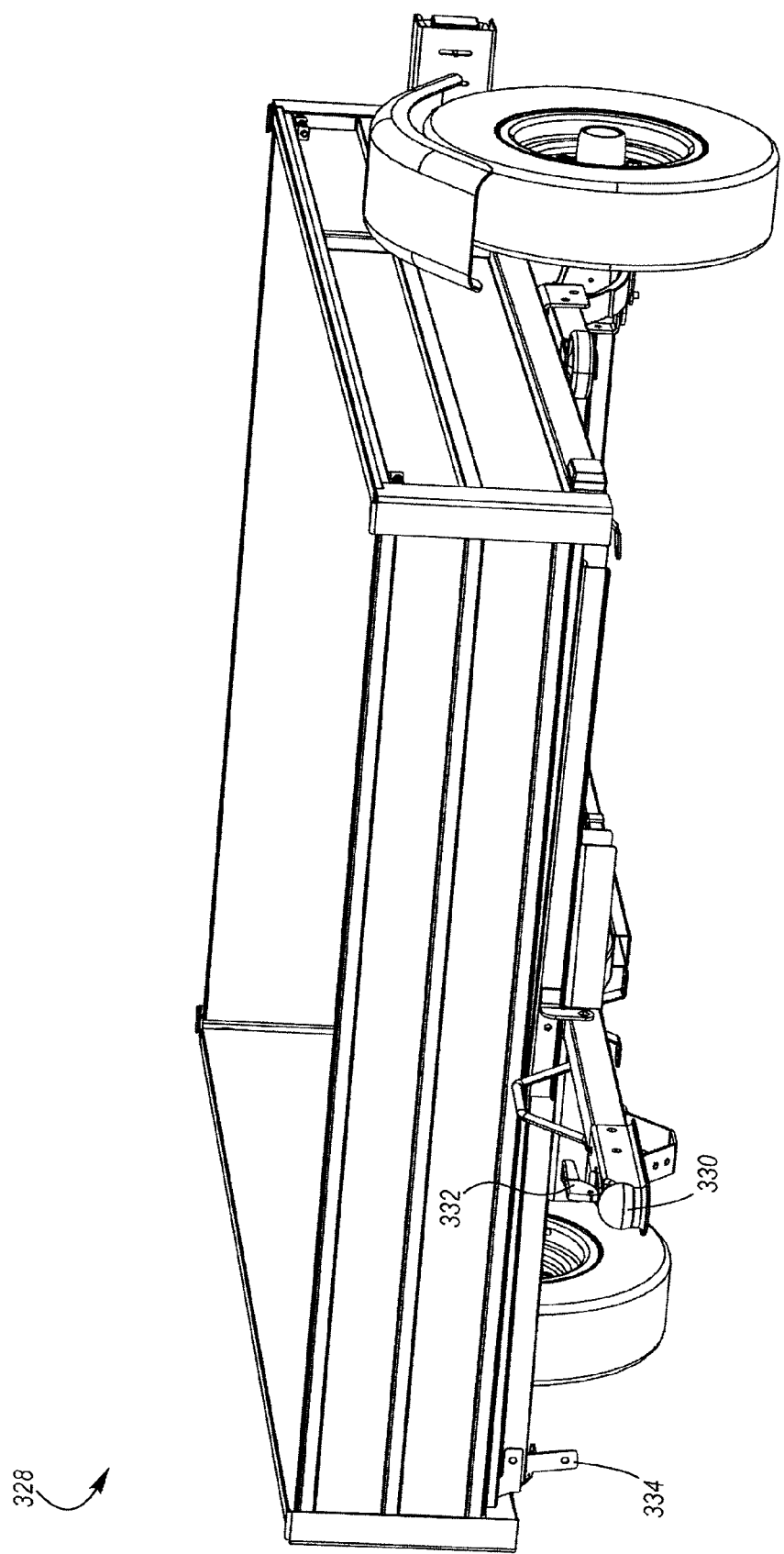
FIG. 90 is a perspective view of another exemplary trailer, illustrating the trailer in an extended or use position.

As shown in FIG. 90, a trailer 328 may include a hitch coupler that is sized and configured to be connected to a trailer hitch. In particular, the arm of the trailer 328 may include, or be connected to, a hitch coupler 330 that is sized and configured to be coupled to the hitch of a towing vehicle. The hitch coupler 330 may be sized and configured to be coupled to a variety of differently sized and/or configured hitches, if desired.

The hitch coupler 330 may include a switch 332 that may be configured to move between an opened position and a closed position. When the switch 332 is in the opened position, the hitch coupler 330 may be coupled to the hitch of the towing vehicle. After the hitch coupler 330 is coupled to the hitch, the switch 332 may be closed to secure the hitch coupler to the hitch. If the switch 332 is closed before the hitch coupler 330 has been coupled to the hitch, however, the switch may prevent the hitch coupler from being coupled to the hitch. Thus, the switch 332 must first be opened to allow the hitch coupler 330 to be coupled to the hitch and the switch may then be closed to secure the hitch coupler to the hitch. It will be appreciated that the hitch coupler 330 and the switch 332 may have other suitable shapes, sizes, configurations and arrangements, but neither the hitch coupler nor the switch is required.

Figure 91:
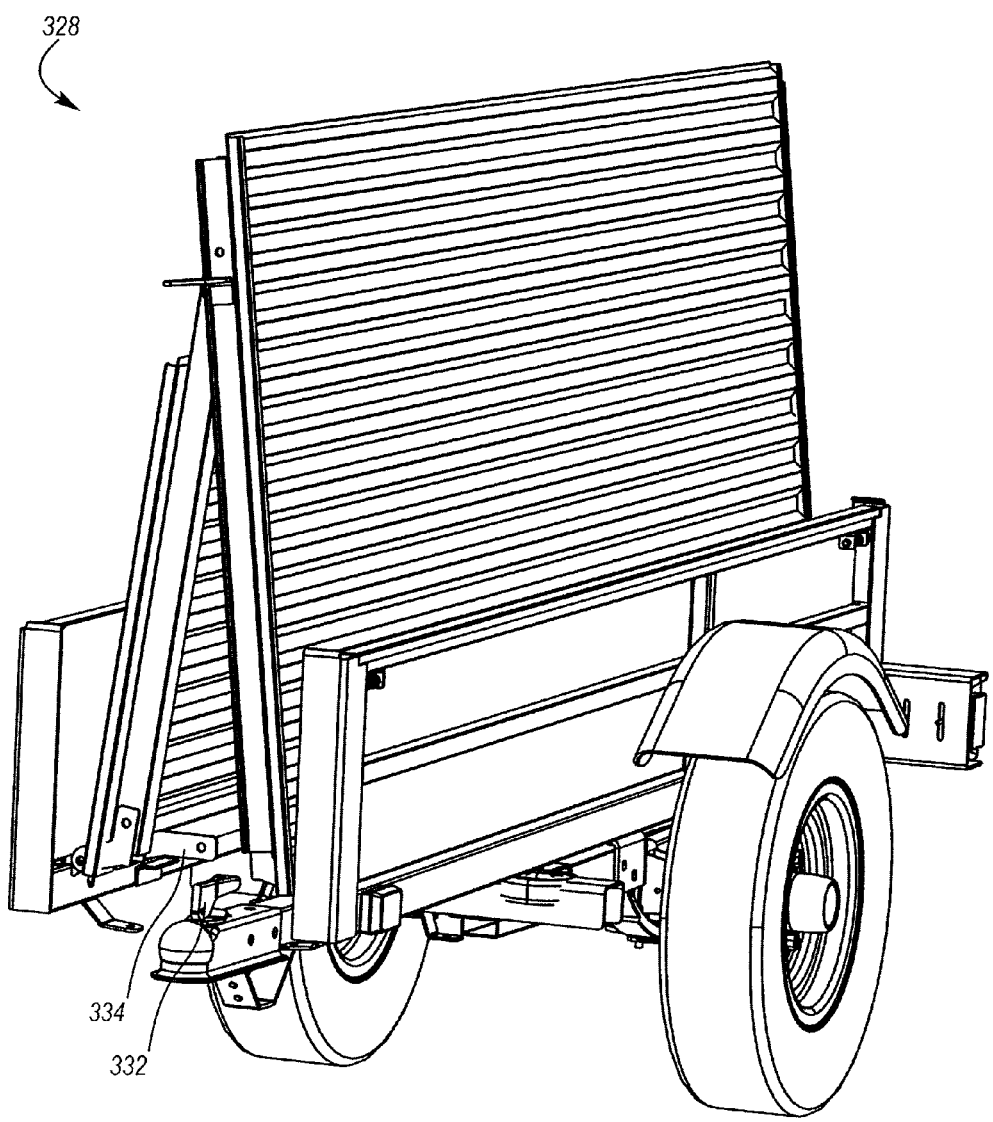
FIG. 91 is a perspective view of the trailer shown in FIG. 90, illustrating the trailer in a collapsed or storage position.

As shown in FIGS. 90-91, the trailer 328 may also include a coupling prevention device 334, which may include a protrusion, extension or the like. The coupling prevention device 334 is sized and configured to prevent the switch 332 from moving from the closed position to the opened position when the trailer 328 is in the storage position shown in FIG. 91. Accordingly, this may help to prevent a user from moving the switch 332 to the opened position and attaching the trailer 328 to a towing vehicle when the trailer is in the storage position. It will also be appreciated that coupling prevention device 334 may have other suitable shapes, sizes, configurations and arrangements, but the prevention device is not required.

Advantageously, as discussed above, the trailer may be used to carry various items. After using the trailer, one may move the trailer from the use position to the storage position to allow the trailer to be more efficiently stored. When use of the trailer is again desired, one may move the trailer from the storage position back to the use position.

In addition, as discussed above and shown in the accompanying figures, the trailer may include barriers that may be selectively connected to and disconnected from the trailer. For example, the barriers may be selectively connected to the trailer in a generally vertical position to help prevent items from leaving the trailer. One or more of the barriers may also be disconnected from the trailer, such as the front and rear barriers, to allow the trailer to be moved from the use position to the storage position. After storing the trailer, the trailer may be moved back to the extended position and the barriers may be reconnected to the trailer. If desired, one or more of barriers may be used as a ramp to facilitate loading and unloading of the trailer. It will be appreciated, however, that the barriers that need not be selectively connectable or disconnectable from the trailer and that the trailer does not require any barriers. Moreover, it will be appreciated that the trailer need not be movable between the use and storage positions.

Other suitable aspects, features, configurations and arrangements that may be used in connection with the trailer are shown and described in U.S. provisional patent application Ser. No. 60/749,775, filed Dec. 12, 2005 and entitled TRAILER; U.S. provisional patent application Ser. No. 60/752,194, filed Dec. 20, 2005 and entitled TRAILER; U.S. provisional patent application Ser. No. 60/777,760, filed Mar. 1, 2006 and entitled TRAILER; U.S. provisional patent application Ser. No. 60/810,088, filed Jun. 1, 2006 and entitled TRAILER; U.S. provisional patent application Ser. No. 60/840,849, entitled TRAILER and filed Aug. 29, 2006; U.S. provisional patent application Ser. No. 60/840,893, entitled TRAILER and filed Aug. 29, 2006; U.S. patent application Ser. No. 11/609,316, entitled TRAILER and filed Dec. 11, 2006, U.S. patent application Ser. No. 11/609,318, entitled TRAILER and filed Dec. 11, 2006, U.S. patent application Ser. No. 11/609,319, entitled TRAILER and filed Dec. 11, 2006, U.S. patent application Ser. No. 11/609,322, entitled TRAILER and filed Dec. 11, 2006, U.S. patent application Ser. No. 11/609,323, entitled TRAILER and filed Dec. 11, 2006, U.S. patent application Ser. No. 11/609,324, entitled TRAILER and filed Dec. 11, 2006, the disclosures of each of these applications are incorporated by reference in their entireties.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A folding trailer that is capable of moving between a use position and a storage position, the folding trailer comprising:
    a frame including a front portion, a rear portion, a right side and a left side;
    a wheel disposed proximate the frame;
    an axle connected to the wheel, the axle being movable between a first position in which the axle is generally aligned along an axis and a second position in which the axle is disposed in a folded configuration, the axle being located in generally the same plane in the first position and the second position, the axle moving in a generally rearward direction when the axle is moved from the first position to the second position; and
    a bed connected to the frame, the bed including a first portion and a second portion, the bed being movable between a first position in which the first and second portions of the bed are generally aligned with a first plane and a second position in which the first and second portions of the bed are disposed in a folded position and generally aligned with a second plane, the first plane and the second plane being disposed at substantially different angles;
    wherein the axle is disposed in the first position and the bed is disposed in the first position when the trailer is in the use position; and
    wherein the axle is disposed in the second position and the bed is disposed in the second position when the trailer is in the storage position.

2. The trailer as in claim 1, wherein the bed is folded in a generally upward direction when the trailer is moved from the use position to the storage position.

3. The trailer as in claim 1, wherein the axle is disposed in a generally horizontal plane in the first position and in a second position;
  wherein the first and second portions of the bed are disposed in a generally horizontal plane in the first position; and
  wherein the first and second portions of the bed are disposed in a generally vertical plane in the second position.

4. The trailer as in claim 1, wherein the axle folds generally rearwardly and the bed fold generally upwardly when the trailer is moved from the use position to the storage position.

5. The trailer as in claim 1, wherein the first portion of the bed includes a corrugated portion and the second portion of the bed includes a corrugated portion, the corrugated portions of the first and second portions of the bed being disposed in an overlapping and interlocking configuration when the bed is in the first position, the corrugated portions of the first and second portions of the bed being spaced apart when the bed is in the second position.

6. The trailer as in claim 1, further comprising a towing arm connected to the axle, the towing arm being positioned in an extended position that extends beyond the front portion of the frame when the axle is in the first position, the towing arm being positioned in a retracted position when the axle in the second position, the towing arm moving in a generally rearward direction as the axle folds from the first position to the second position.

7. The trailer as in claim 1, wherein the axle folds in a substantially horizontal plane and the bed simultaneously folds in a substantially vertical plane when the trailer is moved from the use position to the storage position.

8. The trailer as in claim 1, further comprising a hinge member interconnecting a first portion of the axle and a second portion of the axle, the hinge member connecting the first portion of the axle and the second portion of the axle in a substantially straight line when the axle is in the first position.

9. The trailer as in claim 1, further comprising a hinge member interconnecting a first portion of the axle and a second portion of the axle, the first portion of the axle and the second portion of the axle extending forwardly at an angle of approximately five degree or less when the axle is in the first position.

10. The trailer as in claim 1, further comprising a hinge member interconnecting a first portion of the axle and a second portion of the axle, the first portion of the axle and the second portion of the axle extending rearwardly at an angle of approximately five degree or less when the axle is in the first position.

11. A folding trailer that is capable of moving between a use position and a storage position, the folding trailer comprising:
  a frame including a front portion, a rear portion, a right side and a left side;
  a wheel disposed proximate the frame;
  an axle connected to the wheel, the axle being movable between a first position in which the axle is generally aligned along an axis and a second position in which the axle is disposed in a folded configuration, the axle being located in generally the same plane in the first position and the second position, the axle moving in a generally rearward direction when the axle is moved from the first position to the second position; and
  a towing arm connected to the axle, the towing arm being positioned in an extended position when the axle is in the first position, the towing arm being positioned in a retracted position when the axle in the second position, the towing arm moving in the generally rearward direction when the axle is moved from the first position to the second position.

12. The trailer as in claim 11, further comprising a bed connected to the frame, the bed including a first portion and a second portion, the bed being movable between a first position in which the first and second portions of the bed are generally aligned with a first plane and a second position in which the first and second portions of the bed are disposed in a folded position and generally aligned with a second plane, the first plane and the second plane being disposed at substantially different angles, the bed being disposed in the first position when the trailer is in the use position, the bed being disposed in the second position when the trailer is in the storage position.

13. The trailer as in claim 12, wherein the axle is disposed in a generally horizontal plane in the first position and in the second position;
  wherein the first and second portions of the bed are disposed in a generally horizontal plane in the first position; and
  wherein the first and second portions of the bed are disposed in a generally vertical plane in the second position.

14. The trailer as in claim 12, wherein the axle folds generally rearwardly and the bed fold generally upwardly when the trailer is moved from the use position to the storage position.

15. The trailer as in claim 12, wherein the first portion of the bed includes a corrugated portion and the second portion of the bed includes a corrugated portion, the corrugated portions of the first and second portions of the bed being disposed in an overlapping and interlocking configuration when the bed is in the first position, the corrugated portions of the first and second portions of the bed being spaced apart when the bed is in the second position.

16. The trailer as in claim 12, wherein the axle folds in a substantially horizontal plane and the bed simultaneously folds in a substantially vertical plane when the trailer is moved from the use position to the storage position.

17. The trailer as in claim 11, further comprising a hinge member interconnecting a first portion of the axle and a second portion of the axle, the hinge member connecting the first portion of the axle and the second portion of the axle in a substantially straight line when the axle is in the first position.

18. The trailer as in claim 11, further comprising a hinge member interconnecting a first portion of the axle and a second portion of the axle, the first portion of the axle and the second portion of the axle extending forwardly at an angle of approximately five degree or less when the axle is in the first position.

19. The trailer as in claim 11, further comprising a hinge member interconnecting a first portion of the axle and a second portion of the axle, the first portion of the axle and the second portion of the axle extending rearwardly at an angle of approximately five degree or less when the axle is in the first position.

* * * * *

UNITED STATES PATENT AND TRADEMARK OFFICE
CERTIFICATE OF CORRECTION

PATENT NO.       : 7,452,000 B2
APPLICATION NO.  : 11/609317
DATED            : November 18, 2008
INVENTOR(S)      : Winter et al.

It is certified that error appears in the above-identified patent and that said Letters Patent is hereby corrected as shown below:

Page 2
(56) References Cited, change "6,605,778 B2    8/2003    Dorfler et al." to --6,604,778 B2    8/2003    Doshi--

Column 2
Line 12, remove "move"

Column 5
Line 13, remove "an"

Column 6
Line 54, change "is perspective" to --is a perspective--

Column 7
Line 17, change "15" to --51--
Line 61, change "that" to --than--

Column 11
Line 66, change "second" to --first--

Column 12
Line 25, change "96 in" to --96 is in--

Column 14
Line 20, change "end" to --and--

Column 15
Line 23, change "moved" to --move--
Line 58, change "of the" to --of--

Column 16
Line 51, change "interconnect" to --interconnects--

Column 17
Line 44, remove "10"

UNITED STATES PATENT AND TRADEMARK OFFICE
CERTIFICATE OF CORRECTION

PATENT NO.         : 7,452,000 B2
APPLICATION NO.    : 11/609317
DATED              : November 18, 2008
INVENTOR(S)        : Winter et al.

It is certified that error appears in the above-identified patent and that said Letters Patent is hereby corrected as shown below:

Column 18
Line 61, change "having" to --have--

Column 19
Line 62, change "used may" to --used to--

Column 20
Line 19, change "trailers" to --trailer--

Column 21
Line 4, change "engages" to --engage--
Line 8, change "in as which" to --in which--
Line 66, change "members" to --members or flanges--

Column 24
Line 38, change "114" to --314--
Line 41, change "114" to --314--

Column 26
Line 31, change "2006," to --2006;--

Column 27
Claim 4, line 14, change "fold" to --folds--
Claim 6, line 28, change "axle in" to --axle is in--
Claim 9, line 45, change "degree" to --degrees--
Claim 10, line 51, change "degree" to --degrees--

UNITED STATES PATENT AND TRADEMARK OFFICE
CERTIFICATE OF CORRECTION

PATENT NO. : 7,452,000 B2
APPLICATION NO. : 11/609317
DATED : November 18, 2008
INVENTOR(S) : Winter et al.

It is certified that error appears in the above-identified patent and that said Letters Patent is hereby corrected as shown below:

Column 28
Claim 11, line 6, change "axle in" to --axle is in--
Claim 14, line 32, change "fold" to --folds--
Claim 18, line 56, change "degree" to --degrees--
Claim 19, line 62, change "degree" to --degrees--

Signed and Sealed this

First Day of September, 2009

David J. Kappos
*Director of the United States Patent and Trademark Office*